(12) United States Patent
Buser et al.

(10) Patent No.: US 11,684,849 B2
(45) Date of Patent: Jun. 27, 2023

(54) DISTRIBUTED SAMPLE-BASED GAME PROFILING WITH GAME METADATA AND METRICS AND GAMING API PLATFORM SUPPORTING THIRD-PARTY CONTENT

(71) Applicant: GOOGLE LLC, Mountain View, CA (US)

(72) Inventors: Jack Buser, Alameda, CA (US); Gregory Canessa, Fairfax, CA (US); Garret Kelly, Kitchener (CA); Paul Leventis, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 166 days.

(21) Appl. No.: 16/844,937

(22) Filed: Apr. 9, 2020

(65) Prior Publication Data

US 2020/0230499 A1 Jul. 23, 2020

Related U.S. Application Data

(63) Continuation of application No. PCT/US2018/055055, filed on Oct. 9, 2018.
(Continued)

(51) Int. Cl.
*A63F 13/358* (2014.01)
*A63F 13/355* (2014.01)
*G06F 9/455* (2018.01)

(52) U.S. Cl.
CPC .......... *A63F 13/358* (2014.09); *A63F 13/355* (2014.09); *G06F 9/45558* (2013.01); *G06F 2009/45595* (2013.01)

(58) Field of Classification Search
CPC .. A63F 13/358; A63F 13/355; G06F 9/45558; G06F 2009/45595
See application file for complete search history.

(56) References Cited

U.S. PATENT DOCUMENTS

| 5,892,897 A | 4/1999 | Carlson et al. |
| 6,855,058 B2 | 2/2005 | Kubota et al. |
| (Continued) | | |

FOREIGN PATENT DOCUMENTS

| CN | 1556958 A | 12/2004 |
| CN | 101068258 A | 11/2007 |
| (Continued) | | |

OTHER PUBLICATIONS

Notice of Allowance dated Dec. 30, 2020 for U.S. Appl. No. 16/380,831, 72 pages.
(Continued)

*Primary Examiner* — William H McCulloch, Jr.
*Assistant Examiner* — Ankit B Doshi

(57) ABSTRACT

This application is directed to real-time game profiling and analysis. While a game server executes multiple game instances for a gaming title in parallel, a profiling server generates a game profiling instruction to collect data samples associated with a subset of the game instances and sends the game profiling instruction to the game server. In response to the game profiling instruction, the game server identifies the subset of the plurality of game instances, and collects data samples associated with each game instance in the identified subset. Each collected data sample includes at least game state data and system performance data associated with synchronous gaming sessions corresponding to the respective game instance. The game server sends the collected data samples associated with each game instance in the identified subset to the profiling server, which provides the plurality of data samples to an analytics server for further analysis.

19 Claims, 25 Drawing Sheets

Related U.S. Application Data

(60) Provisional application No. 62/570,648, filed on Oct. 10, 2017.

(56) References Cited

U.S. PATENT DOCUMENTS

| | | |
|---|---|---|
| 7,015,909 B1 | 3/2006 | Morgan, III et al. |
| 7,401,150 B2 | 7/2008 | Shea et al. |
| 7,774,440 B1 | 8/2010 | Bagrodia |
| 8,171,145 B2 | 5/2012 | Allen et al. |
| 8,619,588 B2 | 12/2013 | Karacali-Akyamac |
| 8,621,585 B2 | 12/2013 | Danieli et al. |
| 8,641,531 B2 | 2/2014 | Patil |
| 9,208,642 B2 | 12/2015 | Merari |
| 9,295,915 B2 | 3/2016 | Bruno, Jr. et al. |
| 9,339,733 B2 | 5/2016 | Boudville |
| 9,393,486 B2 | 7/2016 | George |
| 9,396,702 B2 | 7/2016 | Colenbrander |
| 9,498,711 B2 | 11/2016 | Assa |
| 9,526,989 B2 | 12/2016 | Oh |
| 9,592,446 B2 | 3/2017 | Bono et al. |
| 9,628,332 B2 | 4/2017 | Bruno, Jr. et al. |
| 9,675,874 B1 | 6/2017 | Park |
| 9,912,562 B2 | 3/2018 | Callahan et al. |
| 10,016,689 B2 | 7/2018 | Lucas et al. |
| 10,166,471 B2 | 1/2019 | Vincent et al. |
| 10,244,765 B2 | 4/2019 | Pierce et al. |
| 10,255,765 B2 | 4/2019 | Washington et al. |
| 10,456,672 B2 | 10/2019 | Champy |
| 10,486,066 B2 | 11/2019 | Perry et al. |
| 11,128,636 B1 | 9/2021 | Jorasch et al. |
| 11,369,873 B2 | 6/2022 | Smullen et al. |
| 2002/0144177 A1 | 10/2002 | Kondo et al. |
| 2004/0198403 A1 | 10/2004 | Pedersen et al. |
| 2005/0074063 A1 | 4/2005 | Nair et al. |
| 2006/0154710 A1 | 7/2006 | Serafat |
| 2006/0287096 A1 | 12/2006 | O'Kelley et al. |
| 2006/0287099 A1* | 12/2006 | Shaw ............... H04L 67/38 463/42 |
| 2007/0018980 A1 | 1/2007 | Berteig et al. |
| 2007/0203768 A1 | 8/2007 | Adra |
| 2007/0293319 A1 | 12/2007 | Stamper et al. |
| 2008/0102955 A1 | 5/2008 | D'Amora et al. |
| 2008/0220878 A1 | 9/2008 | Michaelis |
| 2009/0008404 A1 | 1/2009 | Kim et al. |
| 2009/0111576 A1 | 4/2009 | Ostergren et al. |
| 2009/0119730 A1 | 5/2009 | Perlman et al. |
| 2009/0125961 A1 | 5/2009 | Perlman et al. |
| 2009/0271656 A1 | 10/2009 | Yokota et al. |
| 2010/0016081 A1* | 1/2010 | Prochnow ........... G07F 17/3223 463/43 |
| 2010/0073712 A1 | 3/2010 | Cain |
| 2010/0167809 A1 | 7/2010 | Perlman et al. |
| 2010/0203952 A1 | 8/2010 | Zalewski |
| 2010/0306813 A1 | 12/2010 | Perry et al. |
| 2011/0124417 A1 | 5/2011 | Baynes et al. |
| 2011/0145635 A1 | 6/2011 | Buckler et al. |
| 2012/0004042 A1 | 1/2012 | Perry et al. |
| 2012/0079080 A1 | 3/2012 | Pishevar |
| 2012/0209571 A1* | 8/2012 | Peterson ............ G06F 11/3616 702/186 |
| 2012/0270644 A1 | 10/2012 | Buhr |
| 2012/0306877 A1 | 12/2012 | Rosasco |
| 2013/0017443 A1 | 1/2013 | Yamazaki |
| 2013/0034160 A1 | 2/2013 | Schmit |
| 2013/0198642 A1 | 8/2013 | Carney et al. |
| 2013/0221923 A1 | 8/2013 | Robertson |
| 2013/0274000 A1* | 10/2013 | Novotny ............ A63F 13/358 463/25 |
| 2014/0006517 A1 | 1/2014 | Hsiao et al. |
| 2014/0019582 A1 | 1/2014 | Kim |
| 2014/0032670 A1 | 1/2014 | Ellingson et al. |
| 2014/0043333 A1 | 2/2014 | Narayanan et al. |
| 2014/0066195 A1 | 3/2014 | Matsui et al. |
| 2014/0179426 A1 | 6/2014 | Perry et al. |
| 2014/0179434 A1 | 6/2014 | Xu |
| 2014/0221087 A1 | 8/2014 | Huang et al. |
| 2014/0274380 A1 | 9/2014 | Kazama |
| 2014/0274384 A1 | 9/2014 | Boswell et al. |
| 2014/0323230 A1 | 10/2014 | Wakitani et al. |
| 2014/0342819 A1* | 11/2014 | Bruno, Jr. ............... A63F 13/30 463/29 |
| 2014/0359156 A1 | 12/2014 | Manber |
| 2015/0009222 A1 | 1/2015 | Diard et al. |
| 2015/0024842 A1 | 1/2015 | Imai et al. |
| 2015/0087414 A1 | 3/2015 | Chen et al. |
| 2015/0109185 A1 | 4/2015 | Shimamura et al. |
| 2015/0194136 A1 | 7/2015 | Diard et al. |
| 2015/0297998 A1 | 10/2015 | Karamilov et al. |
| 2016/0001184 A1 | 1/2016 | Sepulveda et al. |
| 2016/0028854 A1 | 1/2016 | Leeb et al. |
| 2016/0171757 A1 | 6/2016 | Panneer et al. |
| 2016/0279523 A1 | 9/2016 | Altagar et al. |
| 2016/0293134 A1 | 10/2016 | Fortin |
| 2016/0317921 A1 | 11/2016 | Schmitz et al. |
| 2016/0354688 A1 | 12/2016 | Harkham |
| 2017/0007659 A1 | 1/2017 | Wadhwa et al. |
| 2017/0034234 A1 | 2/2017 | Zimring et al. |
| 2017/0050111 A1 | 2/2017 | Perry et al. |
| 2017/0083396 A1 | 3/2017 | Bishop et al. |
| 2017/0087460 A1 | 3/2017 | Perry |
| 2017/0097816 A1 | 4/2017 | Joshi |
| 2017/0124812 A1 | 5/2017 | Washington et al. |
| 2017/0142201 A1 | 5/2017 | Holmes |
| 2017/0185464 A1 | 6/2017 | Lipinski et al. |
| 2017/0246544 A1 | 8/2017 | Agarwal et al. |
| 2017/0354878 A1 | 12/2017 | Posin |
| 2017/0354893 A1 | 12/2017 | Benedetto et al. |
| 2018/0176282 A1 | 6/2018 | Benguerah |
| 2018/0229128 A1 | 8/2018 | Chandrasekaran et al. |
| 2018/0250591 A1 | 9/2018 | Prado Rojas et al. |
| 2018/0253880 A1 | 9/2018 | Yeh et al. |
| 2018/0256981 A1 | 9/2018 | Enomoto |
| 2018/0290061 A1 | 10/2018 | Payzer et al. |
| 2019/0199722 A1 | 6/2019 | Pennarun et al. |
| 2019/0259130 A1 | 8/2019 | Yeh et al. |
| 2019/0262723 A1 | 8/2019 | Trombetta et al. |
| 2019/0272707 A1 | 9/2019 | Washington et al. |
| 2019/0308099 A1 | 10/2019 | Lalonde et al. |
| 2019/0321725 A1 | 10/2019 | Zimring et al. |
| 2019/0321727 A1 | 10/2019 | Rodgers |
| 2019/0321732 A1 | 10/2019 | Zimring et al. |
| 2020/0001177 A1 | 1/2020 | Champy |
| 2020/0111317 A1 | 4/2020 | Oberberger et al. |
| 2021/0146240 A1 | 5/2021 | Colenbrander |

FOREIGN PATENT DOCUMENTS

| | | |
|---|---|---|
| CN | 101887485 A | 11/2010 |
| CN | 102195935 A | 9/2011 |
| CN | 104598292 A | 5/2015 |
| CN | 104866699 A | 8/2015 |
| CN | 105749551 A | 7/2016 |
| CN | 106328855 A | 1/2017 |
| CN | 107050858 A | 8/2017 |
| CN | 107666943 A | 2/2018 |
| CN | 107670275 A | 2/2018 |
| EP | 1374959 A2 | 1/2004 |
| EP | 2546811 A1 | 1/2013 |
| EP | 2621594 B1 | 8/2016 |
| EP | 3610933 | 2/2020 |
| GB | 2525437 A | 10/2015 |
| JP | 2014130589 A | 7/2014 |
| JP | 2015139565 A | 8/2015 |
| KR | 20070082395 | 8/2007 |
| WO | 2004004857 A1 | 1/2004 |
| WO | 2005010680 A2 | 2/2005 |
| WO | 2005074063 A2 | 8/2005 |
| WO | 2007033005 A2 | 3/2007 |
| WO | 2007044908 A2 | 4/2007 |
| WO | 2008104221 A1 | 4/2008 |
| WO | 2012161102 A1 | 11/2012 |
| WO | 2012170437 A1 | 12/2012 |
| WO | 2013151748 A2 | 10/2013 |

(56) References Cited

FOREIGN PATENT DOCUMENTS

| WO | 2014085717 | A1 | 6/2014 |
|---|---|---|---|
| WO | 2014120369 | A1 | 8/2014 |
| WO | 2014186858 | A1 | 11/2014 |
| WO | 2015098165 | A2 | 7/2015 |
| WO | 2015164397 | A2 | 10/2015 |
| WO | 2015175231 | A2 | 11/2015 |
| WO | 2015191965 | A2 | 12/2015 |
| WO | 2016014603 | A1 | 1/2016 |
| WO | 2016183253 | A1 | 11/2016 |
| WO | 2017007659 | A1 | 1/2017 |
| WO | 2017201472 | A1 | 11/2017 |
| WO | 2019182752 | A1 | 9/2019 |
| WO | 2019195300 | A2 | 10/2019 |
| WO | 2020102493 | A1 | 5/2020 |

OTHER PUBLICATIONS

English Translation of Korean Office Action dated Aug. 18, 2018 for KR Application No. KR 10-2020-7002403, 5 pages.
Final Office Action dated Oct. 16, 2020 for U.S. Appl. No. 16/566,607, 18 pages.
International Preliminary Report on Patentability dated Oct. 15, 2020 for International Application No. PCT/US2019/025182, 18 pages.
International Preliminary Report on Patentability dated Oct. 15, 2020 for International Application No. PCT/US2019/025185, 7 pages.
International Preliminary Report on Patentability dated Oct. 15, 2020 for International Application No. PCT/US2019/022472, 8 pages.
Notice of Allowance dated Sep. 17, 2020 for U.S. Appl. No. 16/373,558, 9 pages.
First Action Interview Office Action dated Sep. 2, 2020 for U.S. Appl. No. 16/380,831, 4 pages.
Final Office Action dated Nov. 26, 2021 for U.S. Appl. No. 16/566,607, 18 pages.
Non-Final Office Action dated Nov. 26, 2021 for U.S. Appl. No. 15/734,275, 24 pages.
English Translation of Chinese Office Action dated Oct. 18, 2021, 10 pages.
Non-Final Office Action dated Nov. 29, 2021 for U.S. Appl. No. 17/123,523, 7 pages.
English Translation of Korean Notice of Allowance dated Nov. 5, 2021 for KR Application No. 10-2020-7015094, 3 pages.
Ikeda, Takatoshi et al., "An Instruction Allocation Method for Accelerating GPU Applications", Journal of Information Processing, Aug. 15, 2005, vol. 46, SIG12(ACS11), p. 140-149.
Non-Final Office Action dated Mar. 31, 2021 for U.S. Appl. No. 16/566,607, 19 pages.
First Examination Report dated Jun. 26, 2021 for Indian Application No. 202047027952, 6 pages.
Notice of Allowance dated Aug. 11, 2021 for U.S. Appl. No. 16/849,805, 54 pages.
Extended European Search Report dated Jan. 3, 2020 for EP Application No. EP 19199853.3, 10 pages.
Notice of Grant dated Nov. 5, 2019 for JP Application No. JP 2019220516, 7 pages. English machine translation included.
English Translation of Korean Notice of Allowance dated Jan. 28, 2020 for KR Application No. KR 10-2018-7023961, 3 pages.
English Translation of Korean Office Action dated Apr. 15, 2019 for KR Application No. KR 10-2018-7023961, 2 pages.
International Preliminary Report on Patentability dated May 9, 2018 for International Application No. PCT/US2017/033642, 13 pages.
International Search Report and Written Opinion dated Apr. 24, 2018 for International Application No. PCT/US2017/033642, 28 pages.
First Action Interview Office Action Summary dated Feb. 26, 2019 for U.S. Appl. No. 15/599,408, 3 pages.
First Action Interview Pilot Program Pre-Interview Communication dated Jan. 8, 2019 for U.S. Appl. No. 15/599,408, 4 pages.
Notice of Allowance dated Jun. 19, 2019 for U.S. Appl. No. 15/599,408, 6 pages.
Non-Final Office Action dated Jun. 12, 2020 for U.S. Appl. No. 16/566,607, 23 pages.
International Search Report and Written Opinion dated Feb. 26, 2019 for International Application No. PCT/US2018/066844, 13 pages.
Non-Final Office Action dated May 15, 2020 for U.S. Appl. No. 15/851,610, 15 pages.
International Search Report and Written Opinion dated Feb. 24, 2020 for International Application No. PCT/US2019/061407, 13 pages.
International Preliminary Report on Patentability dated Apr. 14, 2020 for International Application No. PCT/US2018/055055, 13 pages.
International Search Report and Written Opinion dated Apr. 26, 2019 for International Application No. PCT/US2018/055055, 21 pages.
International Search Report and Written Opinion dated Oct. 4, 2019 for International Application No. PCT/US2019/025182, 23 pages.
First Action Interview Pilot Program Pre-Interview Communication dated Apr. 9, 2020 for U.S. Appl. No. 16/368,801, 4 pages.
Notice of Allowance dated Jun. 10, 2020 for U.S. Appl. No. 16/368,801, 12 pages.
International Search Report and Written Opinion dated Jun. 18, 2019 for International Application No. PCT/US2019/025185, 11 pages.
Notice of Allowance dated May 5, 2020 for U.S. Appl. No. 16/368,806, 8 pages.
International Search Report and Written Opinion dated Jun. 18, 2019 for International Application No. PCT/US2019/022472, 13 pages.
Non-Final Office Action dated Jun. 22, 2020 for U.S. Appl. No. 16/373,558, 6 pages.
International Search Report and Written Opinion dated Sep. 20, 2019 for International Application No. PCT/US2019/026611, 26 pages.
First Action Interview Pilot Program Pre-Interview Communication dated May 21, 2020 for U.S. Appl. No. 16/380,831, 4 pages.
International Search Report and Written Opinion dated Aug. 1, 2019 for International Application No. PCT/US2019/020935, 23 pages.
International Search Report and Written Opinion dated Oct. 7, 2019 for International Application No. PCT/US2019/025400, 13 pages.
Bernier, Yahn W., "Latency Compensating Methods in Client/Server In-game Protocol Design and Optimization", Game Developers Conference Proceedings, Mar. 20, 2001, 13 pages.
Herrscher et al., "A Dynamic Network Scenario Emulation Tool", Proceedings of the IEEE Eleventh International Conference on Computer Communications and Networks, Oct. 16, 2002; pp. 262-267.
Noble et al., "Trace-Based Mobile Network Emulation", Proceedings of the ACM SIGCOMM'97 Conference on Applications, Technologies, Architectures, and Protocols for Computer Communication; Oct. 1, 1997; pp. 51-61.
Ra-Qin, "Ra-Qin Review of the Activision Decathlon—Gamespot," Sep. 2, 2006; XP055625157; retrieved from www.gamespot.com/the-activision-decathlon/user-reviews/2200-128501/ on Sep. 23, 2019; 3 pages.
Slivar, Ivan et al., "Empirical QoE Study of In-Home Streaming of Online Games", 2014 13th Annual Workshop on Network and Systems Support for Games, IEEE, Dec. 4, 2014, 6 pages.
Yoneda, Satoshi, "Completed Understanding of Windows 8 as a Game Environment (6) Windows Store App Version Game and Xbox Smart Glass," 30 Oct. 30, 2012; 22 pages; accessed on Aug. 5, 2020 from https://www.4gamer.net/games/126/G012689/20121029010/.
Office Action dated Feb. 19, 2021 for European Patent Application No. 18797260.9, 5 pages.
Yadav, Himanshu, et al., "Adaptive GPU Resource Scheduling on Virtualized Servers in Cloud Gaming", Conference an Information and Communication Technology, Nov. 2017, 6 pages.

(56) References Cited

OTHER PUBLICATIONS

English Translation of Japanese Office Action dated May 18, 2021 for JP Application No. 2019-220516, 7 pages.
Notice of Allowance dated May 17, 2021 for U.S. Appl. No. 15/851,610, 23 pages.
English Translation of Chinese Office Action dated May 21, 2021 for CN Application No. 20198029685.3, 15 pages.
Extended European Search Report dated May 21, 2021 for EP Application No. EP 21169156.3, 9 pages.
IT Media News, "Google launches new "Chromecast" and "Chromecast Audio" in Japan for JPY4,980"], Feb. 18, 2016, search date Apr. 30, 2021, URL https://www.itmedia.co.jp/news/articles/1602/18/news101.html.
Weekly ASCII, "Angry Birds Friends, a smartphone game to compete for high score with Facebook friends", May 31, 2013, URL https://weekly.ascii.jp/elem/000/002/615/2615748/.
Notice of Allowance dated Feb. 14, 2022 for U.S. Appl. No. 16/566,607, 11 pages.
Malfatti, Silvano Maneck et al., "Using Mobile Phones to Control Desktop Multiplayer Games," 2010 Brazilian Symposium on Games and Digital Entertainment, IEEE Computer Society; Nov. 8, 2010; pp. 230-238.
Veljkovic, Nikola et al., "TV-Centric Multiplayer Gaming over the Cloud for Consumer Electronic Devices," 2013 IEEE Third International Conference on Consumer Electronics, Berlin; Sep. 1, 2013; pp. 1-3.
English Translation of Chinese Office Action dated Aug. 11, 2021 for CN Application No. 201980007131.3, 21 pages.
International Preliminary Report on Patentability dated Apr. 24, 2018 for International Application No. PCT/US2017/033642, 13 pages.
International Search Report and Written Opinion dated Sep. 18, 2017 for International Application No. PCT/US2017/033642, 28 pages.
Notice of Allowance dated Jun. 19, 2019 for U.S. Appl. No. 15/599,408, 6 pp. 2014130589.
International Search Report and Written Opinion dated Oct. 4, 2019 for International Application No. PCT/US2019/025182, 22 pages.
Yoneda, Satoshi, "Completed Understanding of Windows 8 as a Game Environment (6) Windows Store App Version Game and Xbox Smart Glass," Oct. 30, 2012; 22 pages; accessed on Aug. 5, 2020 from https://www.4gamer.net/games/126/G012689/20121029010/.
Final Office Action dated Nov. 30, 2020 for U.S. Appl. No. 15/851,610, 33 pages.
Notice of Allowance dated Mar. 22, 2022 for U.S. Appl. No. 17/123,523, 9 pages.
Final Office Action dated May 16, 2022 for U.S. Appl. No. 15/734,275, 27 pages.
English Translation of Korean Office Action dated Apr. 14, 2022 for KR Application No. 10-2020-7030955, 19 pages.
European Office Action dated Jun. 14, 2022 for EP Application No. 21175400.7, 7 pages.
Notice of Allowance dated Sep. 14, 2022 for U.S. Appl. No. 17/223,226, 62 pages.
Non-Final Office Action dated Sep. 9, 2022 for U.S. Appl. No. 15/734,275, 26 pages.
Nourani, Mehrdad, et al., "Coping with physical failures, soft errors, and reliability issues," System-on-Chip Test Architectures. Morgan Kaufmann, 2008, pp. 351-422.
Emmerson, Richard et al., "Fault tolerance achieved in VLSI," IEEE Micro 4.6, Dec. 1984, pp. 34-43.
Non-Final Office Action dated Oct. 26, 2022 for U.S. Appl. No. 17/402,761, 21 pages.
Translation of Chinese Office Action dated Nov. 17, 2022 for Chinese Application No. 201880033465.3, 24 pages.
Extended European Search Report dated Dec. 16, 2022 for European Application No. 22202122.2, 10 pages.
Non-Final Office Action dated Nov. 1, 2022 for U.S. Appl. No. 17/216,115, 13 pages.
Non-Final Office Action dated Dec. 8, 2022 for U.S. Appl. No. 17/521,133, 6 pages.

\* cited by examiner

| Game Event 1 | Timestamp 1 | Game State 1 | Game State 2 | System Performance 1 | System Performance 2 | Tag 1 |
|---|---|---|---|---|---|---|
| | Timestamp 2 | Game State 1 | Game State 2 | System Performance 1 | System Performance 2 | |
| Game Event 2 | Timestamp 3 | Game State 1 | Game State 2 | System Performance 1 | System Performance 2 | |
| | Timestamp 4 | Game State 1 | Game State 2 | System Performance 1 | System Performance 2 | |
| Game Event 3 | Timestamp 5 | Game State 1 | Game State 2 | System Performance 1 | System Performance 2 | Tag2 |
| | Timestamp 6 | Game State 1 | Game State 2 | System Performance 1 | System Performance 2 | |
| | Timestamp 7 | Game State 1 | Game State 2 | System Performance 1 | System Performance 2 | Tag3 |
| | Timestamp 8 | Game State 1 | Game State 2 | System Performance 1 | System Performance 2 | |

While the game server is executing the plurality of game instances: 1406

Compare two of the plurality of data samples, wherein two of the plurality of data samples correspond to a first time and a second time subsequent to the first time; in accordance with a comparison result, identify an anomalous profile event; and generate an alert message indicating an occurrence of the anomalous profile event 1462

Identify a frame drop rate increase based on the game state data of the two of the plurality of data samples; identify a processor error based on the system performance data of the two of the plurality of data samples; and associate a root cause of the frame drop rate increase with the processor error 1464

Identify an increase of a frame drop rate and a game action rate of a specific game action based on the game state data of the two of the plurality of data samples; and associate the increase of the frame drop rate with the specific game action 1466

Determine that the increase of the frame drop rate is caused by L blocks in the Tetris game based on the plurality of data samples 1468

Figure 14E

DISTRIBUTED SAMPLE-BASED GAME PROFILING WITH GAME METADATA AND METRICS AND GAMING API PLATFORM SUPPORTING THIRD-PARTY CONTENT

RELATED APPLICATIONS

This application claims priority to and is a continuation application of International Patent Application No. PCT/US18/55055, filed Oct. 9, 2018, titled "Distributed Sample-Based Game Profiling with Game Metadata and Metrics and Gaming API Platform Supporting Third-Party Content," which claims priority to U.S. Provisional Patent Application No. 62/570,648, titled "Gaming API Platform Supporting Third Party Content," filed Oct. 10, 2017, which is incorporated by reference herein in its entirety.

This application is related to U.S. patent application Ser. No. 15/599,408, titled "Method and Systems for Facilitating Participation in a Game Session," filed May 18, 2017, which claims the benefit of U.S. Provisional Patent Application No. 62/339,052, titled "Method and Systems for Facilitating Participation in a Game Session," filed May 19, 2016, each of which is incorporated by reference herein in its entirety.

This application is related to U.S. patent application Ser. No. 15/851,610, titled "Network Impairment Simulation Framework for Verification of Real Time Interactive Media Streaming," filed Dec. 21, 2017, which is incorporated by reference herein in its entirety.

This application is related to U.S. Provisional Patent Application No. 62/651,662, titled "Detecting and Compensating for Display Lag in Gaming Systems," filed on Apr. 2, 2018, which is incorporated by reference herein in its entirety.

This application is related to U.S. Provisional Patent Application No. 62/651,665, titled "Temporary Game Control by User Stimulation Following Loss of Active Control," filed on Apr. 2, 2018, which is incorporated by reference herein in its entirety.

This application is related to U.S. Provisional Patent Application No. 62/651,542, titled "Methods, Devices, and Systems for Interactive Cloud Gaming," filed on Apr. 2, 2018, which is incorporated by reference herein in its entirety.

This application is related to U.S. Provisional Patent Application No. 62/655,688, titled "Memory Management in Gaming Rendering," filed on Apr. 10, 2018, which is incorporated by reference herein in its entirety.

This application is related to U.S. Provisional Patent Application No. 62/646,824, titled "Methods and Systems for Rendering and Encoding Content for Online Interactive Gaming Sessions," filed on Mar. 22, 2018, which is incorporated by reference herein in its entirety.

TECHNICAL FIELD

This application relates generally to computer technology, including but not limited to methods and systems for creating a gaming environment to enable real-time game profiling and analysis.

BACKGROUND

Internet-connected electronic devices can support a variety of cloud-based media and entertainment applications. These applications include media streaming applications in which a server streams content to user devices, gaming applications in which a user interacts from a user device with a game that executes on a server, and a variety of social media and communication applications that allow large numbers of users to interact concurrently with each other and with cloud-hosted content and applications via their Internet-connected devices. Among cloud-based applications, cloud gaming presents some unique challenges due to: the widely varying hardware demands of gaming titles; the diverse topologies in which cloud-based games can be played (e.g., by a single player, by multiple players in a single location, or by multiple players in multiple locations); the need to transmit reliably and without latency player inputs to a gaming server that executes a gaming session and gaming session outputs from the gaming server to the players' devices/displays; widely varying player expectations as to speed and responsiveness of gameplay; and the desire in some situations to provide near-real time gaming content to spectators. Other challenges of cloud based gaming relate to providing a consistent gameplay experience for players regardless of where they are located (e.g., close or far from the server), how they connect to the gaming service (e.g., via a fast or slow Internet connection), and what type of device(s) they use to play the game (e.g., a generic personal device or a dedicated game controller) and view gameplay outputs (e.g., a personal device or a media device connected to a media streaming device).

Specifically, there is a need for a cloud gaming system that supports multiple gaming sessions for multiple gaming titles, where the games can execute concurrently with acceptable latency and responsiveness, including for multiple players who are playing the same gaming title from the same or different locations, with a wide variety of input and output devices and network connections. In addition, there is a need for a cloud gaming system that, upon receiving a player input (e.g., a gaming input entered on an end use gaming device/controller) in a gaming session, processes the user input promptly and outputs high-definition images reflecting the outcome of the player input action for all of the game players simultaneously and with acceptable latency. There is also a need to track statuses of different gaming titles, instances and sessions at a micro-level and understand causes of their performance improvement or degradation at a macro-level. As such, it would be beneficial to provide a cloud gaming system hosting online interactive gameplay for multiple users from different locations with efficient game profiling and analysis mechanisms without compromising game processing and outputting or gaming experience at the cloud gaming system.

SUMMARY

Implementations described in this specification are directed to providing a gaming application programming interface (API) and cloud gaming platform to enable efficient game profiling and performance analysis of online interactive gameplay of a selected gaming title hosted by one or more game servers. Specifically, game profiling and analysis is performed in real time while one or more game instances of the gaming title are executed on the game servers to enable gameplay in multiple synchronous gaming sessions for multiple users from different locations. Computation, storage and communication resources of the cloud gaming platform are allocated among game processing, game profiling and performance analysis to bring efficient and concurrent gameplay, game profiling and performance analysis. For example, processing capabilities of the game servers are substantially reserved for game processing (e.g., gaming content rendering) by allocating tasks of game profiling control and performance analysis to servers distinct from the game servers, e.g., a dedicated game profiling server and an offline analytics server. In some situations, a game profiling and analysis application is hosted and executed by the game profiling server and/or analytics server, independently of execution of a game application managing gameplay on the game servers. By these means, gameplay can be conducted efficiently with the processing capabilities conserved on the game servers, and more importantly, can benefit from performance feedback provided by real-time game profiling and performance analysis.

In one aspect of this application, a method is implemented at a distributed real-time game profiling system. The method includes executing by a game server a plurality of game instances for a gaming title in parallel. Each of the plurality of game instances includes one or more synchronous gaming sessions, and each of the one or more gaming sessions is executed at a game application of a client device. The method further includes while the game server is executing the plurality of game instances, generating by a profiling server a game profiling instruction to collect a plurality of data samples for each of a subset of the plurality of game instances. The profiling server is coupled to the game server over one or more wireless communication networks. The method further includes sending the game profiling instruction to the game server by the profiling server. The method further includes in response to the game profiling instruction, identifying by a local orchestrator module of the game server the subset of the plurality of game instances according to the game profiling instruction and collecting by a collection module of the game server the plurality of data samples associated with each game instance in the identified subset. Each of the plurality of data samples includes at least game state data and system performance data associated with the one or more synchronous gaming sessions corresponding to the respective game instance. The method further includes sending by the game server the plurality of data samples associated with each game instance in the identified subset to the profiling server, and providing the plurality of data samples to an analytics server, thereby allowing the analytics server to analyze the plurality of data samples to improve gaming performance and/or user experience associated with the gaming title.

In some implementations, the game state data includes game context data associated with a gaming session, e.g., a timestamp corresponding to a specific instant of time, a game level, a weapon level, a costume type and a number of objects in a game scene. In some implementations, the game state data includes one of more of game settings including a sliding window frame rate, and a frame resolution of image frames rendered for the corresponding gaming session. In some implementations, for each game instance, the system performance data includes performance data of a CPU, a GPU, a memory, an operating system, one or more input/output ports and/or a data bus, which are assigned to execute each of the one or more gaming sessions of the respective game instance. In some implementations, the system performance data are stored in at least one of CPU performance counters, GPU performance counters, a stack trace, and architectural counters.

In some implementations, the method further includes visualizing by the analytics server a subset of the game state data and system performance data in the plurality of data samples. Alternatively, the method further includes at the analytics server, comparing two of the plurality of data samples corresponding to a first time and a second time subsequent to the first time, identifying an anomalous profile event based on a comparison result, and generating an alert message indicating occurrence of the anomalous profile event. Alternatively, in some implementations, the game server includes a plurality of processors, and the method further includes one or more of: conducting hotspot analysis of the plurality of processors based on the plurality of data samples, profiling the plurality of processors based on the plurality of data samples, and profiling the plurality of game instances and the one or more synchronous gaming sessions corresponding to each game instance.

In another aspect of the invention, a distributed real-time game profiling system includes one or more processors, and memory having instructions stored thereon, which when executed by the one or more processors cause the distributed real-time game profiling system to perform any of the methods described above.

In another aspect of the invention, a non-transitory computer-readable medium has instructions stored thereon, which when executed by one or more processors cause processors of a distributed real-time game profiling system to perform any of the methods described above.

Other embodiments and advantages may be apparent to those skilled in the art in light of the descriptions and drawings in this specification.

BRIEF DESCRIPTION OF THE DRAWINGS

FIG. 12 is an example trace recorded for a game instance in accordance with some implementations.

FIGS. 14A-14E are a flow diagram illustrating another example method for profiling and analyzing a gaming title at a distributed real-time game profiling system in accordance with some implementations.

Like reference numerals refer to corresponding parts throughout the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, and networks have not been described in detail so as not to unnecessarily obscure aspects of the implementations.

In various implementations described in this application, a gaming environment includes a plurality of media devices (e.g., a casting device) each of which is optionally coupled to an output device, a plurality of client devices communicatively coupled to the media devices, and a server system coupled to the media devices and the client devices. The server system executes a plurality of game instances for a gaming title in parallel, and each of the plurality of game instances includes one or more synchronous gaming sessions. Each of the one or more gaming sessions is executed at a game application of a client device to enable gameplay via the client device and optionally via a corresponding media device and/or output device. Optionally, the server system is configured to manage a virtual game domain in which the plurality of media devices and the plurality of client devices are linked to each other via a user account of the game application.

Gameplay activities in the gaming environment is monitored and analyzed by a distributed real-time profiling system including at least a profiling server in addition to one or more game servers. While the one or more game servers are executing the plurality of game instances, the profiling server instructs the game servers to collect a plurality of data samples for a subset of the game instances. In response, the game servers identify the subset of game instances and collects the plurality of data samples each of which includes at least game state data and system performance data associated with the one or more synchronous gaming sessions corresponding to each of the subset of game instances. Optionally, the plurality of data samples is provided to the profiling server or an analytics server to allow the profiling or analytics server to analyze the plurality of data samples to improve gaming performance and/or user experience associated with the gaming title. By these means, the game instances are monitored and analyzed in real time by the profiling server and/or the analytics server that are distinct from the game servers, allowing gameplay to occupy a substantial portion of resources of the game servers while still benefiting from performance improvement enabled by real-time analysis results.

Online Gaming Environment

Figure 1:
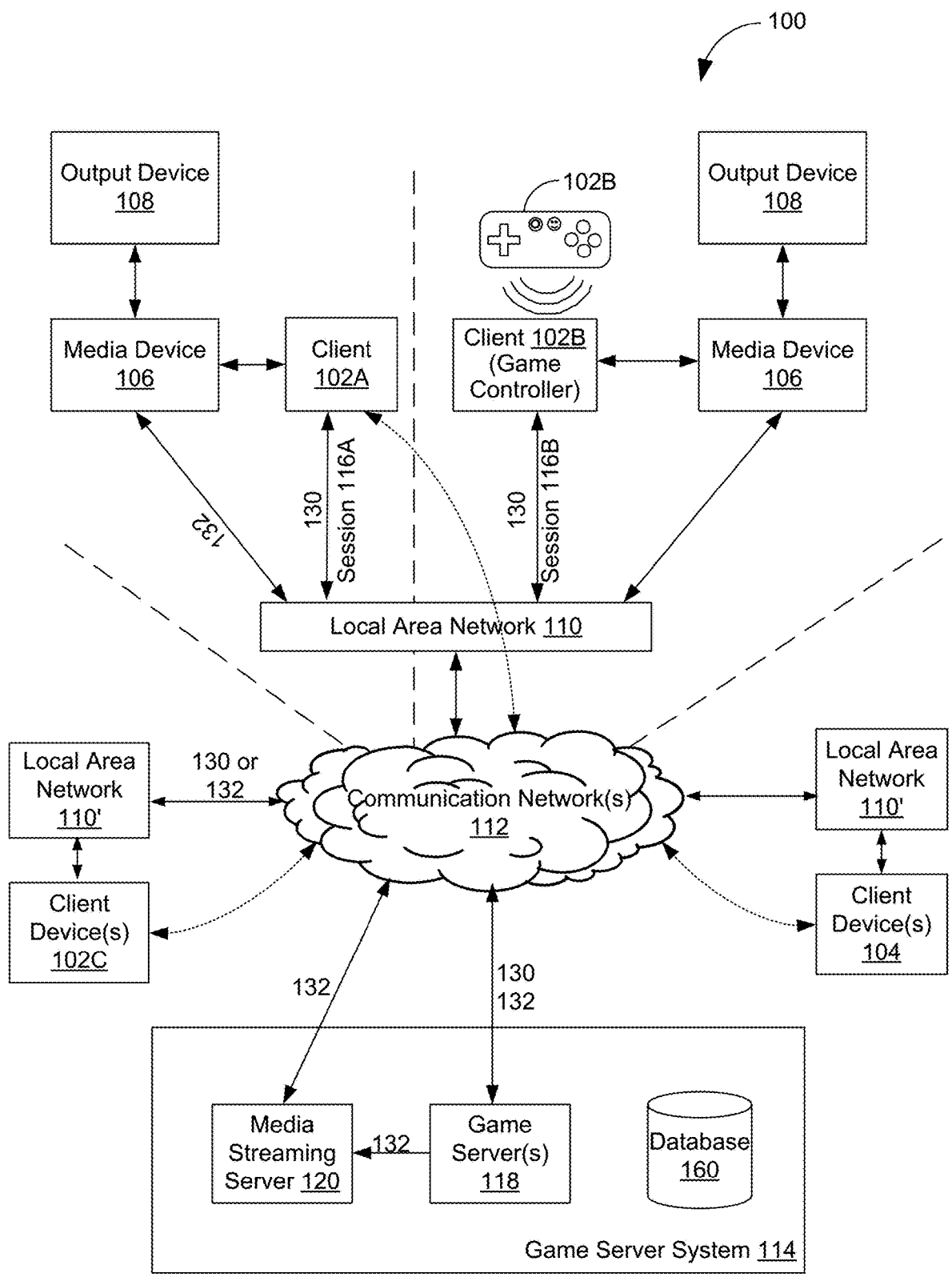
FIG. 1 is an example online gaming environment in accordance with some implementations.

FIG. 1 is an example online interactive gaming environment 100 in accordance with some implementations. The online interactive gaming environment 100 includes one or more client devices (e.g., client devices 102 and 104). Each of the client devices 102 executes one or more game applications. An online gaming session can be initiated and run on a specific game application to allow a user of the client device 102 to play an online interactive game (also called "gaming title") hosted by a server system 114. In some implementations, the client device 102 (e.g., a host client) is configured to invite one or more other client devices 102 to join a game scene of the online interactive game. Gaming sessions of these client devices 102 are synchronized to display the same game scene of the online interactive game, optionally with distinct perspectives corresponding to their respective users. These synchronous gaming sessions are collectively called a game instance. That said, in some implementations, the server system 114 hosts a plurality of gaming titles each of which includes a plurality of game instances, and each game instance includes a plurality of synchronous gaming sessions executed at a game application of a client device 102.

The server system 114 hosts an online interactive game platform to support the client devices 102 to play the one or more game applications including the specific game application. Specifically, the server system 114 includes a plurality of user accounts associated with the client devices 102, and authenticates the users of the client devices 102 in association with each of the one or more game applications. The server system 114 renders and refreshes a game scene of a gaming title for the client devices 102 that join corresponding gaming sessions associated with the scene in a substantially synchronous manner. In some implementations, the server system 114 may assess the capabilities of the client devices 102 and/or a quality of the communicative connection between the server system 114 and each of the client devices 102, and adaptively generates synchronous data streams for the gaming sessions associated with the client devices 102. By these means, the server system 114 is configured to facilitate synchronous gaming sessions of an online interactive game on two or more client devices 102 simultaneously and with substantially low latencies.

In some implementations, a client device 102 (e.g., client device 102A or 102B) is coupled to a media device 106. The media device 106 is further coupled to one or more output devices 108 that can output visual and/or audio content (e.g., a television, a display monitor, a sound system, speakers, etc.), and thereby configured to output content to the output device(s) 108. The client device 102 is configured to control gameplay, and the media device 106 is configured to receive gaming content from the server system 114 via communication networks 112 and casts the received gaming content onto the output device 108. Specifically, the client device 102 can be communicatively coupled to the media device 106 directly (e.g., via a wire, Bluetooth or other wireless communication links), via a local network 110 (e.g., a Wi-Fi network), or via one or more communication networks 112. In some implementations, the client device 102 and the media device 106 are local to each other (e.g., in the same room, in the same house, etc.). In some implementations, the media device 106 is a casting device (e.g., Chromecast by Google Inc.) or a device that otherwise includes casting functionality. Alternatively, in some implementations, a client device 102 (e.g., client device 102C) has a display screen integrated therein for displaying media or gaming content associated with a respective online gaming session directly without casting the content onto an output device 108 via a media device 106.

In some implementations, the online interactive gaming environment 100 further includes an administrator/developer client device 104 configured to provide a graphic user interface (GUI) in a game profiling and analysis application. The GUI is displayed on the client device 104, and an administrator or developer can enter user inputs on the GUI to request specific game profiling or analysis to monitor game and system performance of one or more game instances while a corresponding gaming title is being executed in the online interactive gaming environment 100. The client device 104 is optionally connected with the communication networks 112 directly via a cellular communication network, or indirectly via a local area network 110'.

In some implementations, the server system 114 includes one or more game servers 118 and a media streaming server 120. The server system 114 is configured to provide two or more media streams 130 and 132 concurrently for an online interactive gaming session running on a first client device 102A. The two or more media streams include a low latency stream 130 and a normal latency stream 132 that are provided to the first client device 102A and a reviewer device via one or more communication network 112, respectively. While a user of the first client device 102A plays the gaming session on the first client device 102A, the gaming session is recorded and broadcast to one or more spectators via the normal latency stream 132, i.e., the spectators can review the gaming session on the reviewer client device. The low latency stream 130 corresponds to gameplay of the online interactive gaming session, and has a faster response rate and lower transmission latency than the normal latency stream 132 that corresponds to an associated review session. Optionally, the reviewer device is located in the same venue as the first client device 102A. Optionally, the reviewer device (e.g., the client device 102C) is remote from the first client device 102A. In some implementations, the reviewer device is another client device like the first client device 102A, and optionally has an integrated or external display. In some implementations, the reviewer device is a media device 106 (e.g., a device having casting functionality) coupled to one or more output devices 108 that can output visual and/or audio content. In some implementations, both the low latency stream 130 and the normal latency stream 132 are concurrently displayed on a screen (e.g., on a split screen, using an embedded window).

In some implementations, the game server 118 provides the normal latency stream 132 to the review device while providing the low latency stream 130 to the first client device 102A. In some implementations, the game server 118 provides the normal latency stream 132 to a media streaming server 120 while providing the low latency stream 130 to the first client device 102A. The media streaming server 120 provides the normal latency stream 132 to the review device. The media streaming server 120 optionally hosts a media streaming site (e.g., YouTube) to provide media content to subscribers. In some implementations, the media content (e.g., the normal latency stream 132) may be provided to a subset of the subscribers based on a membership level.

Each client device 102 or 104 is capable of data communication and information sharing with a central server or cloud-computing system (e.g., the server system 114), and/or other devices (e.g., another client device 102 or 104, a media device 106 and an output device 108) that are network-connected. Data communication may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document. In some embodiments, the online interactive gaming environment 100 includes a conventional network device (e.g., a router associated with a local area network 110) via which a set of client devices 102 and their corresponding media and output devices (if any) are communicatively coupled to each other on a local area network 110. The local area network is communicatively coupled to other part of the communication networks 112 (e.g., wide-area networks and the Internet). In some embodiments, each of the client devices 102 optionally communicates with one or more other client devices 102, a respective media device 106, or a respective output device 108 using one or more radio communication networks (e.g., ZigBee, Z-Wave, Insteon, Bluetooth, Wi-Fi, and/or other radio communication networks). In an example, the client device 102A or 102C is optionally connected with the communication networks 112 directly via a cellular communication network, or indirectly via a local area network 110'.

In some implementations, the client devices 102 are remote from each other, i.e., they are not located in the same room or even structure. A gaming title may be started on a client device 102 by launching a game application (e.g., game application 732, FIG. 7) for execution at each client device 102. In some implementations, for each client device 102, the game application establishes an online gaming session 116 with the server system 114 independently. The online gaming sessions 116 of two or more client devices 102 (e.g., 102A and 102B) are related to each other (e.g., because they are played in the same game domain/instance of the gaming title), and therefore, share a game scene in the game application. The related online gaming sessions 116 are synchronized with each other, and each online gaming session 116 optionally shows the same game scene with a unique player perspective corresponding to the respective client device 102. A user of each client device 102 can therefore play the game on the respective client device and influence the output from the online gaming sessions 116 on the other client device(s) 102 of the same gaming instance. For example, in some implementations, server-side game applications 628 are configured to maintain consistent game states among and between users who are concurrently playing the same game instance. In some implementations, the server system 114 and server-side game applications 628 maintain individual sessions for each user playing a game that might result in a rendered view of a scene that is particular to that user's individual game play state and view, but each of those sessions are consistent with other sessions of users who are playing the same game instance and interacting with and viewing the same scene.

Alternatively, in some other implementations, after the game application of a first client device 102A establishes an online gaming session 116A, one or more second client devices 102B are invited to join the online gaming session 116A by an invitation message, and for example, a message with the link (e.g., a URL address) to join the online gaming session 116A is sent to each of the second client devices 102B. An appropriate controller configuration is provided to each second client device 102B that is invited to join the online gaming session 116A. When the second clients 102B join an online gaming session 116A, the server system 114 creates a separate gaming session 116B for each individual second client device 102B and associates the gaming sessions 116A and 116B with a game instance. In the game instance, each separate gaming session 116B of the respective second client device 102B is synchronized with and shares the same scene with the gaming session 116A of the first client device 102A, but can have a unique player perspective corresponding to the respective second client device 102B. After each second client device 102B has joined the online gaming session 116A (more accurately, started its related online gaming session 116B), a user can play the game on the respective second client device 102B and influence the output of the online gaming sessions 116A running on the other client device(s) 102 in the same game instance.

The client device 102 is a device that includes, and can run, one or more distinct user applications (e.g., game applications 628 in FIG. 6A) including the game application. In some implementations, the client device 102 is a smartphone, a tablet device, a laptop computer, a desktop computer, a multimedia device or a remote control. In some implementations, the client device 102 includes a dedicated game controller device (e.g., game controller 102B). In some implementations, the client device 102 includes one or more user applications that are configured to operate in conjunction with the media device 106. In some implementations, the applications include a media device application for pairing the client device 102 with the media device 106 and configuring the media device 106. The applications also include one or more applications that can cast associated content to the media device 106. In some implementations, an application casts data and/or content to the media device 106 by sending the data/content directly to the media device 106 (e.g., via the local network) and/or by directing the media device 106 to a remote location (e.g., a URL or other link to a location at the server system 114 or a gaming content host) from which the media device 106 can stream or otherwise receive data/content. The media device 106 receives data/content from the application and/or the remote location and outputs visual and/or audio content corresponding to the received data/content to the output device 108. Thus, an online gaming session 116 is established between the game application running on the client device 102, the remote server system 114, and the media device 106.

In some implementations, as part of the process of linking related online gaming sessions 116 in a game instance, the server system 114 assesses the capabilities of each corresponding client device 102 and/or a quality of the communicative connection between the server system 114 and the client device 102. In some implementations, the server system 114 measures network latency between the client device 102 and the server system 114. If the measured latency is above a threshold and a lower-latency connection is available, the server system 114 can suggest that the client device 102 change to the lower latency connection, or invite a user of the client device 102 to change the client device 102 to the lower latency connection. For example, if the client device 102 is on a cellular wireless connection, and a local network is available, the server system 114 can suggest that the client device 102 should connect through the available local network. In some implementations, the latency threshold requirements differ between games. For example, some games (e.g., action games) are best experienced on lower latency connections, and some other games (e.g., online board games or card games) are not as demanding with respect to latency. The server system 114 may make connection recommendations in view of these different requirements associated with different types of games.

As part of a client device 102 starting or joining the gaming session 116, the server system 114 communicates with the client device 102 to set up a controller on the client device 102. In some implementations, this includes the server system 114 assessing whether the client device 102 has the needed resources and communication capability for the controller. Depending on available resources at the client device 102, connection quality, and requirements for the game, the controller may be implemented differently at the client device 102. In some implementations, a gaming title can be played with a webpage-based controller interface. For example, a controller interface for the game may be embedded in a webpage, and the webpage is rendered in a web browser on the client device 102. Alternatively, in some implementations, a standardized controller is implemented in a predefined application not specific to the game or directly associated with the game (e.g., a casting device application, such as Chromecast or Google Cast by Google Inc., or other media device application), or in the operating system of the client device 102. For example, the device operating system or a predefined application on the client device 102 may have a controller sub-module. The controller sub-module includes one or more standardized controller configurations, templates, or the like. Each of the standardized controller configurations configures the controller sub-module to utilize input devices and/or sensors on the client device 102 in some way to implement a virtual controller. The standardized controller configuration is used may vary with the game and/or with the type of client device.

Further, in some implementations, a game has a specific controller configuration that may be implemented on the controller sub-module. Such a configuration may be stored at the server system 114 and transmitted to the client devices 102, as part of the process of the client devices 102 joining or starting the online gaming session 116. In some implementations, a specific controller configuration can be an entirely custom controller or a mix of standard controller and a custom controller. Additionally, in some implementations, a game requires a specific application associated with the game. For example, a game may require a controller application associated specifically with the game. In some implementations, the client device 102 may be directed to download the specific application or the predefined application as part of starting or joining the session 116. For example, if the client device 102 does not already have the predefined application (with the controller sub-module) or the specific application associated with game, and such an application is required for play, the server system 114 instructs the client device 102 to prompt its user that a download is needed and to ask the user for permission to proceed.

The server system 114 further includes a database 160. The database 160 stores at least user information associated with user accounts of each of one or more game applications (e.g., game applications 732, FIG. 7) that are hosted on the server system 114. Examples of the user information include, but are not limited to, user account information (e.g., identification and passwords), membership type, preference, and activity history. In some implementations, the database 160 stores session data (also called game state data) associated with the online gaming sessions that are played on the client devices 102. Examples of the session data for each online gaming session 116 include, but are not limited to, a frame rate, a rendering specification, a normal latency requirement, information of GPU allocation, information of encoder allocation, identifications of related sessions, shader pipeline identification, and latest status information. The session data is accessed more frequently than the user information. In some implementations, memory storing the user information and the session data is made of a flash memory and random-access memory (RAM), respectively. In some implementations, a subset of the user information and session data is stored in each game server 118 corresponding a respective gaming title.

After the client devices 102 log onto their respective user accounts and start/join their online gaming sessions 116, the game servers 118 set up the gaming sessions 116, and manage each specific gaming session 116 for a respective client device 102 by obtaining gaming contents from content servers (e.g., content servers 450 in FIG. 4), sending the gaming contents to the game applications executed on the client devices 102 or designated media devices 106, identifying user requests or actions, rendering gameplay outputs for the client devices 102 or media devices 106 in response to the user requests or actions, and storing game state data during the respective gaming session 116. In some implementations, the content servers provide third party gaming content, e.g., sports games, racing games, role playing games (RPG) and first person shooter (FPS) games. Different instances of these games may have widely varying cloud hardware requirements and network (e.g., to ensure an optimal user gaming experience—consistent in some instances with different subscription performance tiers) based on different associated latency requirements and expectations, output video resolution, and gaming server computational workload and video encoding/streaming resources, and network bandwidth.

In some implementations, the game servers 118 dynamically allocate cloud gaming hardware resources (e.g., GPUs 406 and encoder 408 in FIG. 4) and monitor and utilize network bandwidth available to individual end users to provide optimal cloud gaming experience. In some implementations, the game servers 118 provide multiple performance tiers, including a tier that supports high performance, real time gaming sessions with high definition video/media streams and another tier that supports review media streams that has correspond with little or no latency to one or more actual gaming streams.

Figure 2:
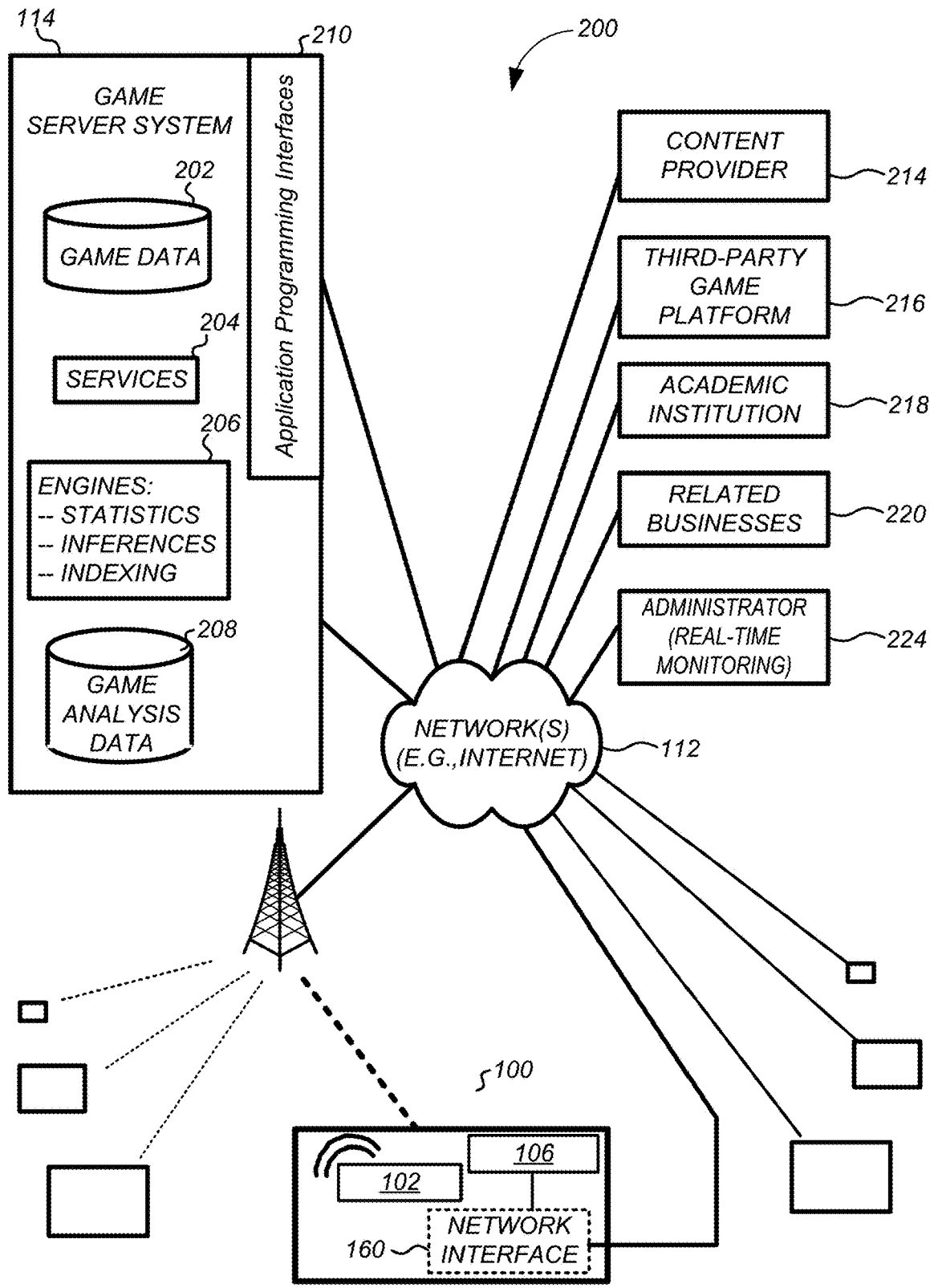
FIG. 2 illustrates a network-level view of an extensible devices and services platform with which the online gaming environment of FIG. 1 is integrated in accordance with some implementations.

FIG. 2 illustrates a network-level view of an extensible devices and services platform 200 with which the online interactive gaming environment 100 of FIG. 1 is integrated in accordance with some implementations. The extensible devices and services platform 200 includes remote servers or cloud computing system 114 (i.e., a server system 114 in FIG. 1). Each client device 102 or media device 106 may communicate with the remote servers or cloud computing system 114. For example, a connection to the one or more networks 112 may be established either directly (e.g., using 3G/4G connectivity to a wireless carrier), or through a network interface 110 (e.g., via a router, switch, gateway, hub, or an intelligent, dedicated whole-home control node), or through any combination thereof.

In some implementations, the devices and services platform 200 communicates with and collects data from the client devices 102 of the online gaming environment 100. In addition, in some implementations, the devices and services platform 200 communicates with and collects data from a plurality of online gaming environments across the world. For example, the server system 114 collects game data 202 from the client devices of one or more online gaming environments, where the client devices may routinely transmit game data or may transmit game data in specific instances (e.g., when a device queries the game data 302). Example collected game data 202 includes, without limitation, game context, game settings and image frames data of different online gaming sessions of different gaming titles, and performance data of hardware and software systems that execute the corresponding gaming titles.

In some implementations, the server system 114 provides one or more services 204 to the online gaming environments. Example services 204 include, without limitation, software updates, customer support, game data collection/logging, remote access, remote or distributed control, and/or use suggestions (e.g., based on the collected game data 202) to improve performance, reduce utility cost, increase safety, etc. In some implementations, data associated with the services 204 is stored at the server system 114, and the server system 114 retrieves and transmits the data at appropriate times (e.g., at regular intervals, upon receiving a request from a user, etc.).

In some implementations, the extensible devices and the services platform 200 includes a processing engine 206, which may be concentrated at a single server or distributed among several different computing entities without limitation. In some implementations, the processing engine 206 includes engines configured to receive data from the client devices of online gaming environments (e.g., via the Internet and/or a network interface), to index the data, to analyze the data and/or to generate statistics based on the analysis or as part of the analysis. In some implementations, the analyzed data is stored as game analysis data 208.

Results of the analysis or statistics may thereafter be transmitted back to the client devices 102 that has provided game data 202 used to derive the results, to other devices, to a server providing a webpage to a user of the device, or to other non-gameplay device entities (e.g., game developers, researchers, policymakers). In some implementations, use statistics, use statistics relative to use of other devices, use patterns, and/or statistics summarizing game data 202 are generated by the processing engine 206 and transmitted. The results or statistics may be provided via the one or more networks 112. In this manner, the processing engine 206 may be configured and programmed to derive a variety of useful information from the game data 202. A single server may include one or more processing engines.

The game analysis data 208 may be used at different granularities for a variety of useful purposes, ranging from explicit programmed control of the client devices 102 on a per-session, per-instance, or per-gaming title basis, to the generation of inferential abstractions that may assist on a session, instance or gaming title basis (for example, an inference may be drawn that the game player has seen frame drops and register overflow when a L block appears in Tetris and so more computational and register resources has to be allocated to a corresponding session when L blocks appear), to the generation of statistics and associated inferential abstractions that may be used for other purposes. For example, the processing engine 206 may generate statistics about frame drops across a population of client devices and send the statistics to device users, game providers/developers, system administrators, or other entities (e.g., entities that have requested the statistics and/or entities that have provided monetary compensation for the statistics).

In some implementations, to encourage innovation and research and to increase products and services available to users, the devices and services platform 200 exposes a range of application programming interfaces (APIs) 210 to third parties, such as gaming content providers 214, third party game platforms 216, academic institutions 218 (e.g., university researchers), related businesses 220 (e.g., providing device warranties or service to related equipment, targeting advertisements based on game data), game administrators 224, and other third parties. The APIs 210 are coupled to and permit third-party systems to communicate with the server system 114, including the services 204, the processing engine 206, the game data 202, and the game analysis data 208. In some implementations, the APIs 210 allow applications executed by the third parties to initiate specific data processing tasks that are executed by the server system 114, as well as to receive dynamic updates to the game data 202 and the game analysis data 208.

For example, third parties (e.g., a third party game platform) may develop programs and/or applications, such as web applications or mobile applications, that integrate with the server system 114 to provide services and information to users. Such programs and applications may be, for example, designed to manage different subscription models, to identify faults and bottlenecks in game programs, to prepare for high gaming demands, to track past game service performance, to provide gaming assistance, to support social networking service, etc., and/or to perform other beneficial functions or tasks.

Figure 3:
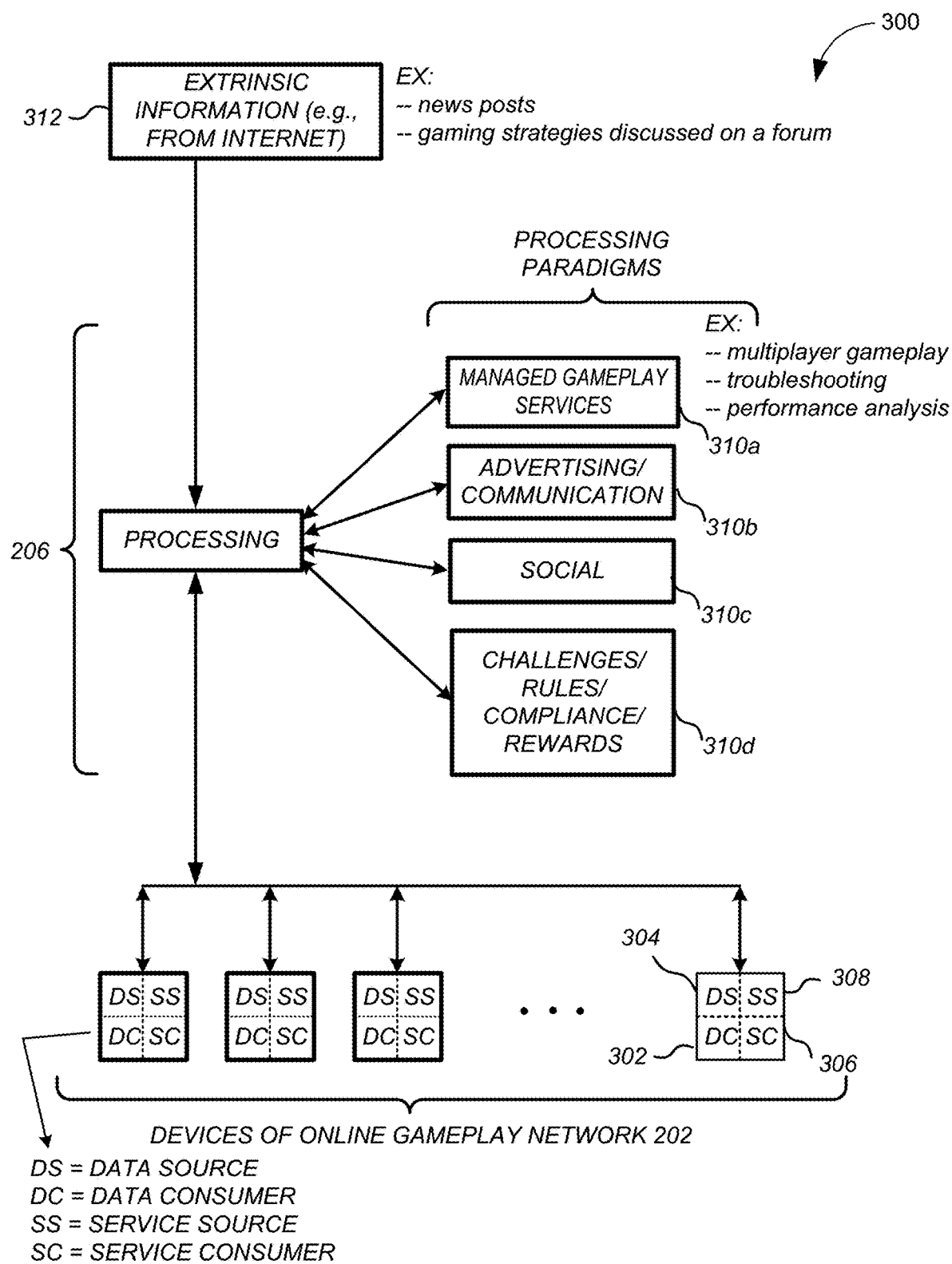
FIG. 3 illustrates an abstracted functional view of the extensible devices and services platform of FIG. 2, with reference to a processing engine as well as devices of the online gaming environment, in accordance with some implementations.

FIG. 3 illustrates an abstracted functional view 300 of the extensible devices and services platform 200 of FIG. 2, with reference to a processing engine 206 as well as devices of the online gaming environment 100, in accordance with some implementations. Even though devices situated in online gaming environments will have a wide variety of different individual capabilities and limitations, the devices may be thought of as sharing common characteristics in that each device is a data consumer 302 (DC), a data source 304 (DS), a services consumer 306 (SC), and a services source 308 (SS). Advantageously, in addition to providing game information (e.g., gaming content and context information concerning other players in the same game scene/instance) used by the client devices 102 to achieve their gaming objectives, the extensible devices and services platform 200 may also be configured to use the large amount of game-related data that is generated by these client devices 102 during their gaming sessions. In addition to implementing or optimizing the actual operation of the devices themselves with respect to their immediate game functions, the extensible devices and services platform 200 may be directed to "repurpose" that data in a variety of automated, extensible, flexible, and/or scalable ways to achieve a variety of useful objectives. These objectives may be predefined or adaptively identified based on, e.g., usage patterns, device efficiency, and/or user input (e.g., requesting specific functionality).

The processing engine 206 includes a number of processing paradigms 310. In some implementations, the processing engine 206 includes a managed gameplay services paradigm 310a that monitors and manages gameplay functions of the client devices 102. The gameplay functions may include ensuring proper multiplayer gameplay associated with a game instance given user inputs, troubleshooting problems that occur during gameplay, monitoring and analyzing performance of gaming sessions, and other game-related functions. In some implementations, the processing engine 206 includes an advertising/communication paradigm 310b that estimates characteristics (e.g., demographic information), desires and/or features of interest of a user based on gameplay activities. Services, promotions, products or upgrades may then be offered or automatically provided to the user. In some implementations, the processing engine 206 includes a social paradigm 310c that uses information from a social network, provides information to a social network (for example, based on gameplay activities), and/or processes data associated with user, gaming session and/or interactions with the social network platform. For example, a user's status or level in a gaming title is reported and updated to their trusted contacts on the social network. As another example, a user may be able to share gameplay tricks with other users. In yet another example, a user may arrange a gameplay competition related to a specific gaming title on the social network.

In some implementations, the processing engine 206 includes a challenges/rules/compliance/rewards paradigm 310d that informs a user of challenges, competitions, rules, compliance regulations and/or rewards and/or that uses operation data to determine whether a challenge has been met, a rule or regulation has been complied with and/or a reward has been earned. The challenges, rules, and/or regulations may relate to a specific gaming title. For example, one challenge may involve participants reaching an advanced skill level of a specific gaming title within a predetermined period of time (e.g., within one week). Those game players who successfully complete the challenge are rewarded, such as with coupons, virtual currency, virtual equipment or weapon, virtual game territory, status, etc.

In some implementations, the processing engine 206 integrates or otherwise uses extrinsic information 312 from extrinsic sources to improve the functioning of one or more processing paradigms. The extrinsic information 312 may be used to interpret data collected in association with a gaming session, to determine game states, to evaluate hardware and software performance, to identify a social network or social-network information, to determine contact information of a gaming content provider, to collect information concerning game tricks and trends associated with the gaming title, and so forth.

Figure 4:
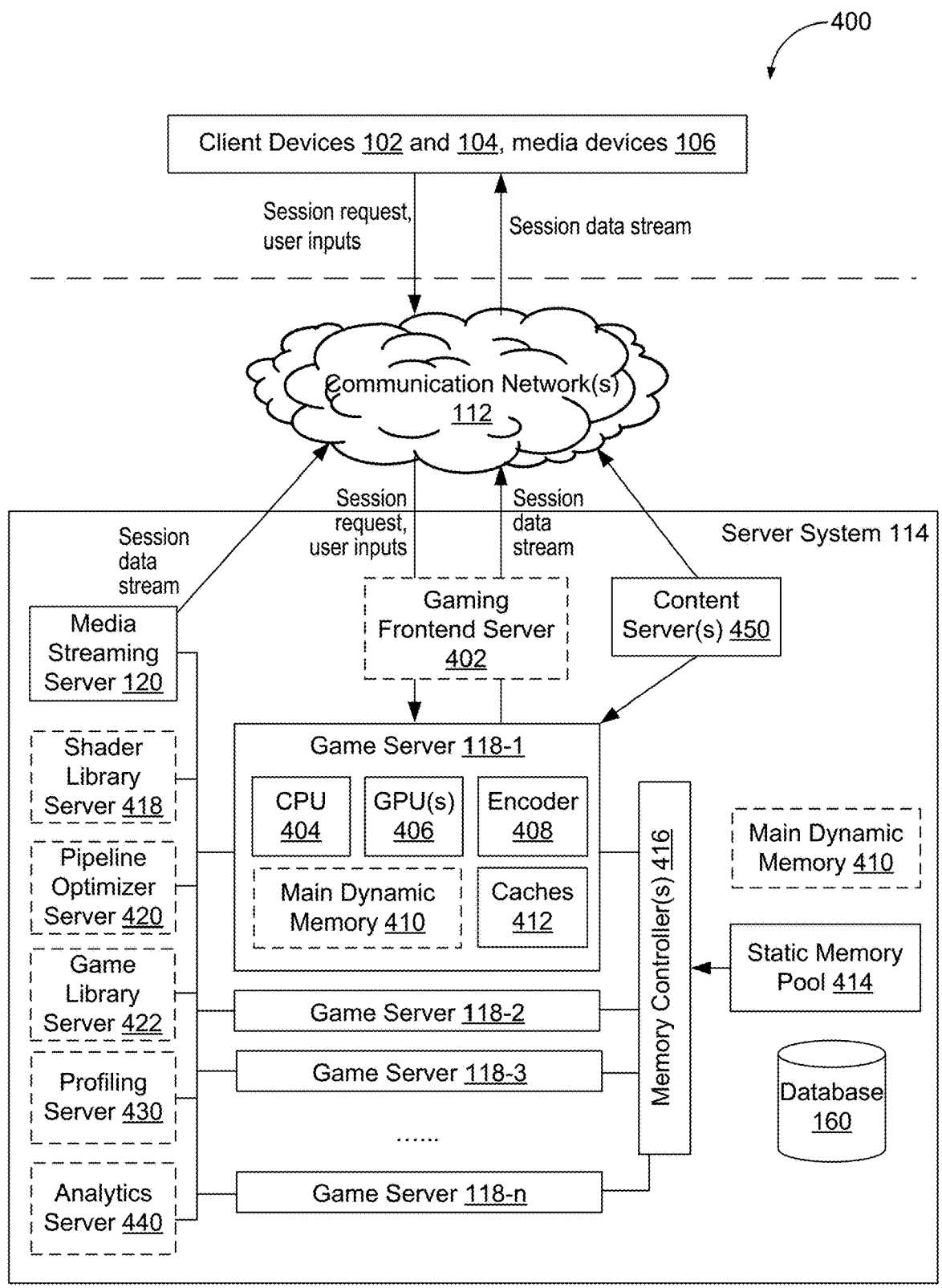
FIG. 4 is an example online interactive gaming environment supported by a server system that includes a plurality of servers in accordance with some implementations.

FIG. 4 is an example online interactive gaming environment 400 supported by a server system 114 that includes a plurality of servers in accordance with some implementations. The server system 114 includes at least one or more game servers 118, and is configured to host one or more gaming titles. That said, the server system 114 is communicatively coupled to a plurality of client devices 102 over one or more communication networks 112, and executes a plurality of online gaming sessions corresponding to a gaming title in parallel, thereby allowing each of the plurality of client devices 102 to participate in gameplay under the gaming title via a respective online gaming session. The game servers 118 receive session requests from the plurality of client devices 102, and initiate, join or terminate the online gaming sessions accordingly. In response to each session request, one of the game servers 118 is assigned to execute a corresponding online gaming session. During the course of executing each online gaming session, the game server 118 assigned to execute the respective online gaming session renders a plurality of image frames (i.e., a session data stream) for a client device that has requested the online gaming session. In some situations, the plurality of image frames are rendered in response to receiving a user input (e.g., a command to jump, shoot or turn) from any of a subset of online gaming sessions that share a game instance or scene of the gaming title.

In some implementations, the server system includes a game library server 422 configured to provide executable gaming programs (e.g., game applications 628 in FIG. 6A) that correspond to one or more gaming titles loaded to the game server 118 for executing the gaming titles. The server system 114 also includes a gaming content server 450 configured to provide gaming content to the client devices 102 and the game servers 118 to initiate an online gaming session and render the image frames of the online gaming session. Optionally, in some situations, the gaming content server 450 is managed by a third party distinct from the server system 114, and provides third party gaming content to the server system 114. Examples of third party gaming content include, but are not limited to sports games, racing games, role playing games (RPG) and first person shooter (FPS) games. Different gaming titles may have widely varying cloud hardware requirements and network (e.g., to ensure an optimal user gaming experience—consistent in some instances with different subscription performance tiers) based on different associated latency requirements and expectations, output video resolution, and gaming server computational workload and video encoding/streaming resources, and network bandwidth.

Optionally, the game server 118 assigned to execute an online gaming session also generates a review media stream, and provides it directly or indirectly, via the media streaming server 120, to a spectator who wants to review the gameplay in real time. In some implementations, the media streaming server 120 is configured to host a media streaming website or application, and the review media stream is provided via the media streaming website or application to the spectator concurrently with gameplay.

In some implementations, the game servers 118 manage user accounts associated with the client devices 102, e.g., subscriptions to membership of one or more online interactive games by the user accounts. Alternatively, in some implementations, the server system 114 includes a frontend server 402 configured to manage the user accounts associated with the client devices 102. Optionally, the frontend server 402 is owned by a third party entity. After the client devices 102 log onto their respective user accounts and start/join their online gaming sessions 116, the game servers 118 set up and manage the gaming sessions 116 by obtaining gaming contents from content servers 450, sending the gaming contents to the game applications executed on the client devices 102 or designated media devices 106, identifying user requests or actions, rendering gameplay outputs for the client devices 102 in response to the user requests or actions, and storing game state data during the respective gaming session 116.

In some implementations, the game servers 118 dynamically allocate cloud gaming hardware resources (e.g., GPU 406 and encoder 408) and monitor and utilize network bandwidth available to individual end users to provide optimal cloud gaming experience. In some implementations, the game servers 118 provide multiple performance tiers, including a tier that supports high performance, real time gaming sessions with high definition video/media streams and another tier that supports review media streams that has correspond with little or no latency to one or more actual gaming streams. Optionally, such review media streams are provided via a media streaming site, such as YouTube, to one or more users, and the media streaming site is optionally managed by the media streaming server 120.

Each game server 118 includes one or more processing units (e.g., CPU 404, GPU 406 and encoder 408), main dynamic memory 410, and one or more local caches 412. The main dynamic memory 410 is configured to store programs and data for use by the CPU 404 and the GPU 406 during execution of the programs. Optionally, each game server 118 has its own main dynamic memory 410. Optionally, a subset or all of the game servers 118 share a main dynamic memory 410. The local caches 412 are configured to temporarily store data, e.g., media content that has completed a vertex post-processing and waits for a primitive assembly in the GPU 406, and media content that is generated by the GPU 406 and will be provided to the encoder 408 for further encoding.

In some implementations, the server system 114 further includes a static memory pool 414 in addition to the main memory 410 and the caches 412. The static memory pool 414 is shared among a subset or all of the game servers 118 (e.g., 118-1, 118-2, . . . 118-n), and configured to store one or more static data items used in the plurality of online gaming sessions of the same gaming title. The server system 114 further includes a memory controller 416 configured to manage the static memory pool 414. In some implementations, each of the plurality of gaming sessions is associated with a specific static data item and requires a specific graphics operation executable by a respective GPU 406 using the specific static data item, and the specific static data item is stored in the static memory pool 414. The respective GPU 406 is configured to access the static memory pool 414 via the memory controller 416 in order to extract the specific static data item.

It is noted that in some implementations, the static data items stored in the static memory pool 414 can be stored in the main dynamic memory 410. The main dynamic memory 410 is accessed by the GPU 406 at a faster rate than the static memory pool 414. However, the main dynamic memory 410 needs to be refreshed or given a new electronic charge every few milliseconds to compensate for charge leaks from the memory, and therefore is not efficient in power performance. If the static data items are moved to the static memory pool 414, part of the main dynamic memory 410 in the game servers 118 can be freed up and used to store more programs and dynamic data, or a smaller main dynamic memory 410 can be used to reduce power consumption.

The server system 114 has a multilevel storage scheme including the local caches 412, the main dynamic memory 410 and the static memory pool 414. The local caches 412 includes at least one cache level (e.g., L1, L2). Compared with the main dynamic memory 410 and the static memory pool 414, the local caches 412 have a smaller size, is physically closer to the CPUs and GPUs, and can be accessed at a faster rate. The local caches 412 stores copies of instructions and data retrieved from the main dynamic memory 410 or the static memory pool 414 for direct use by the CPUs 404 and GPUs 406. The main dynamic memory 410 is also called primary memory. Every program executed by the CPUs 404 and GPUs 406 is loaded into the main dynamic memory 410, and moved to the caches on a block or instruction basis prior to execution. The size of the main dynamic memory 410 is crucial because it determines how many programs can be executed at one time and how much data can be readily available to a program. The static memory pool 414 is additional to the caches 412 and the main dynamic memory 410. In some implementations, the static memory pool 414 is also called a level 4 cache that can be accessed by both the CPUs 404 and GPUs 406, but is shared among the plurality of game servers 118. The static memory pool 414 has a larger latency than the local caches 412 and the main dynamic memory 410, and therefore, is used to store the static data items that are less frequently used in the online gaming sessions. In the server system 114, this multilevel storage scheme enables multiple online gaming sessions of a gaming title to be executed efficiently with respect to at least power consumption.

In some implementations, gaming content corresponding to a gaming title are rendered by the GPUs 406 for online gaming sessions according to a graphics pipeline process (e.g., an OpenGL rendering pipeline). The graphics pipeline process includes an ordered sequence of graphics operations, and each graphics operation is implemented based on one or more user-defined shader programs. A shader library server 418 is coupled to the game servers 118, and configure to provide standard shader programs as needed by different gaming titles. If a shader program is selected for use by a gaming title, it is retrieved from the shader library server 418, compiled by the game server 118, and stored locally in the game servers 118 for use to render the plurality of image frames for each online gaming session. In some implementations, each image frame of an online gaming session is rendered by an ordered sequence of compiled shaders (e.g., including a vertex shader, a tessellation shader, a geometry shader and a fragment shader) each of which implements one or more specific image rendering operations during the course of creating the respective image frame.

In some implementations, while the GPUs execute the plurality of online gaming sessions, a shader pipeline optimizer optimizes a sequence of shader programs used to implement the ordered sequence of graphics operations. Stated another way, the CPUs 404 allocate an unused subset of the CPUs and GPUs in the server system 114 to identify an alternative sequence of shaders or another version of the ordered sequence of shaders with respect to one or more performance criteria. Optionally, the game servers 118 includes both the unused subset of the CPUs and GPUs allocated for shader pipeline optimization and the active CPUs and GPUs that execute the online gaming sessions. Optionally, a pipeline optimizer server 420, distinct from the game servers 118, includes the subset of the CPUs and GPUs allocated for shader pipeline optimization.

In some implementations of this application, the server system 114 further includes a profiling server 430 and an analytics server 440 that are optionally separated as two distinct servers or integrated in one server. The profiling server 430 and analytics server 440 are configured to collect data samples associated with a subset of game instances of a gaming title and analyze the collected data samples, respectively. Specifically, the profiling server 430 sends a game profiling instruction (e.g., instruction 538 in FIG. 5) to the game servers 118 to collect a plurality of data samples for the subset of game instances corresponding to the gaming title, while the game servers 118 are executing a plurality of game instances. In response to the game profiling instruction, the game servers 118 identify the subset of the plurality of game instances, collect the plurality of data samples including at least game state data and system performance data associated with the one or more synchronous gaming sessions corresponding to each of the subset of game instances, and return the plurality of data samples to the profiling server 440. The profiling server 430 then provides the plurality of data samples to the analytics server 440, thereby allowing the analytics server 440 to analyze the plurality of data samples to improve gaming performance and/or user experience associated with the gaming title. As such, data collection and analysis is conducted at the profiling server 430 and analytics server 440 concurrently with execution of the online gaming sessions at the game servers 118.

Figure 5:
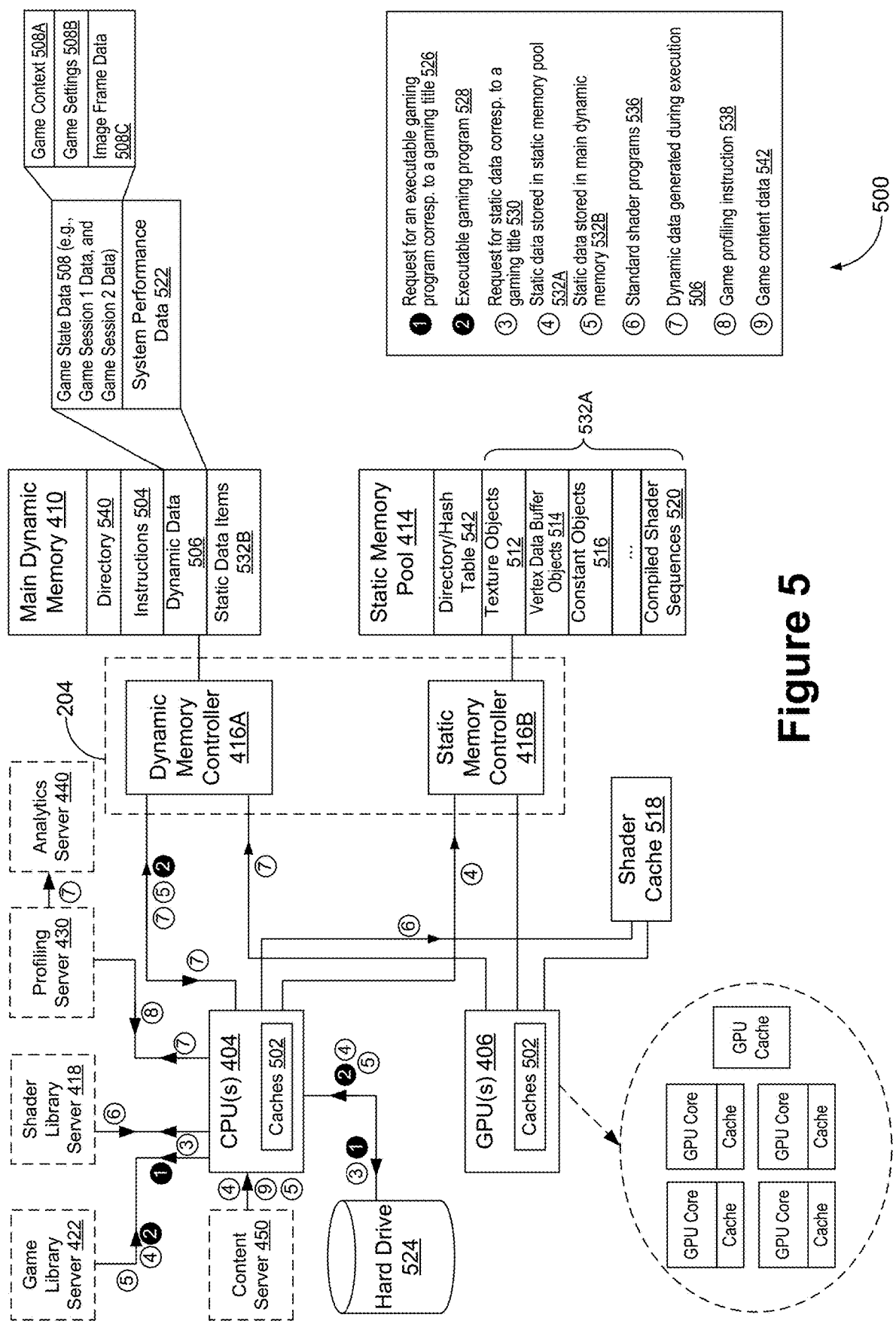
FIG. 5 is an example memory system configured to store data in a server system in accordance with some implementations.

FIG. 5 is an example memory system 500 having a multilevel storage scheme that is configured to store data in a server system 114 in accordance with some implementations. In accordance with the multilevel storage scheme, the memory system 500 of the server system 114 includes a plurality of caches 502 that are disposed directly within each individual server (e.g., a game server 118). More specifically, each of the plurality of caches 502 is directly associated with a processor of an individual server, e.g., a CPU 404 and a GPU 406 of a game server 118, and configured to provide both instructions that are executed by the processor of the individual server and data that are used during execution of the instructions. The memory system 500 of the server system 114 further includes a main dynamic memory 410 that is configured to store programs executed by one or more processors of a server (e.g., game server 118) and data used during execution of the programs. Each program includes a plurality of instructions, and during execution, the instructions are sequentially loaded to the caches 502 of a corresponding processor and wait to be executed by the respective processor. In some implementations, a subset of or all servers of the server system 114 share a main dynamic memory 410. A data bus couples the subset of or all servers of the server system 114 to the main dynamic memory 410 to enable write and read accesses to the main dynamic memory 410. Optionally, the data bus includes a high speed data bus via which the main dynamic memory 410 is accessed with a substantially small latency less than a threshold bus latency. In some implementations, each server of the server system 114 has a respective main dynamic memory 410 accessible only to one or more processors of the respective server. For example, a game server 118 includes a main dynamic memory 410 accessible to both the CPU 404 and the GPU 406 of the game server 118. The main dynamic memory 410 of the game server 118 stores instructions 504 configured to execute one or more gaming titles, e.g., those of a server-side game module 626 in FIG. 6A, and collect data samples during execution of the gaming titles.

The main dynamic memory 410 of the game server 118 also stores dynamic data 506 associated with online gaming sessions of each game instance, including game state data 508 (e.g., first gaming session data, second gaming session data) and system performance data 522. Specifically, the game state data 508 for each gaming session optionally include game context data 508A (e.g., a game level, a weapon type and a costume, objects in a corresponding game scene), game settings 508B (e.g., a sliding window frame rate, frame resolution), and image frame data 508C (e.g., texture pages, vertex page, constant pages and frame data) for a corresponding online gaming session of the respective gaming title. Further, in some implementations, the system performance data 522 is stored in at least one of CPU performance counters, GPU performance counters, a stack trace, and architectural counters. Also, each of the game state data 508 and the system performance data 522 is associated with a timestamp indicating an instant of time at which the corresponding data sample is collected.

In accordance with the multilevel storage scheme, the memory system 500 of the server system 114 further includes a static memory pool 414 that is centralized for and shared by the one or more game servers 118 in the server system 114. The static memory pool 414 is configures to store one or more static data items used to render image frames of online gaming sessions of a gaming title. Examples of the one or more static data items include, but are not limited to, texture objects 512, vertex data buffer objects 514, and constant data objects 516. When the one or more game servers 118 are assigned to execute a plurality of online gaming sessions, each game server 118 obtains one or more static data items from the static memory pool 414, and one or more dynamic data items 506 from its corresponding main dynamic memory 410.

Further, in some implementations, a game server 118 further includes a shader cache 518 coupled to its GPU 406. The shader cache 518 is configured to store at least one sequence of compiled shaders such that instructions of the compile shaders can be directly loaded to the GPU 406 to render gaming content via a graphics pipeline process. In some implementations, the server system 114 includes a plurality of compiled shader sequences 520 each of which is configured according to a performance criterion, and each compiled shader sequence 520 optionally includes a plurality of versions corresponding to different user input conditions. Optionally, the plurality of compiled shader sequences 520 are stored in the shader cache 518. Optionally, the plurality of compiled shader sequences 520 are stored in the static memory pool 414, and moved to the shader cache 518 or directly to a cache of the GPU 406 if selected for use in gaming content rendering.

Further, in accordance with the multilevel storage scheme, the memory system 500 of the server system 114 includes a hard drive 524 that stores one or more executable gaming programs corresponding to one or more gaming titles. During the course of configuring the server system 114 to host a gaming title, the CPUs 404 of the server system sends a program request 526 for an executable gaming program 528 corresponding to the gaming title. In response to the program request 526, the hard drive 524 returns the executable gaming program 528 corresponding to the gaming title to the CPUs 404. In some implementations, the hard drive 524 does not store the requested executable gaming program 528, and the CPUs 404 send the program request 526 to request the executable gaming program 528 from a remoter server (e.g., a game library server 422, a content server 450 or another third party game provider). The CPUs 404 store the executable gaming program 528, returned from the hard drive 524 or the remote server, into the main dynamic memory 410 as a server-side game module 626.

Further, in some implementations, the hard drive 524 also stores static data items of one or more gaming titles. During the course of loading a gaming title, the CPUs 404 of the server system sends a data request 530 for the static data items of the gaming title. In response to the data request 526, the hard drive 524 returns a subset or all of the static data items 532 corresponding to the gaming title to the CPUs 404. In some implementations, the hard drive 524 does not store a specific static data item, and the CPUs 404 send a data request 530 to request the specific static data item from a remoter server (e.g., a content server 450 or a shader library server 418). One or more static data items 532A returned from the hard drive 524 or the remote server are stored in the static memory pool 414. Alternatively, in some implementations, one or more static data items 532B are stored in the main dynamic memory 410 for direct access by the CPUs 404 and GPUs 406 of the game servers 118.

Additionally, the CPUs 404 also send a shader request to the shader library server to obtain one or more standard shader programs 536 used in association with the gaming title, and the returned shader programs 536 are stored locally in the shader cache 518. While executing online gaming sessions corresponding to the gaming title, the CPUs 404 and GPUs 406 generate a plurality of dynamic data items 506 including at least game state data 508 and system performance data 522 corresponding to the online gaming sessions. The plurality of dynamic data items 506 are stored into the main dynamic memory 410 of the server system 114. In some implementations, the game state data 508 and system performance data 522 are selectively collected and stored in the main dynamic memory 410 in accordance with a game profiling request 538 sent by a profiling server 430. The game state data 508 and system performance data 522 are returned to the profiling server 430 periodically, according to a predefined schedule or in response to a query, and forwarded to the analytics server 440 for further analysis.

In some implementations, the server system 114 includes a dynamic memory controller 416A and a static memory controller 416B that are configured to manage write/read accesses to the main dynamic memory 410 and the static memory pool 414, respectively. Alternatively, in some implementations, the server system 114 includes a single memory controller 416 configured to manage write and read accesses to the main dynamic memory 410 and the static memory pool 414. The main dynamic memory 410 includes a directory 540 that identifies locations of the instructions 204, dynamic data items 506 and static data items 532B (if any) in the main dynamic memory 410. In some implementations, the static memory pool 414 includes a hash table 542 that identifies locations of the static data items 532A in the static memory pool 414. Optionally, the static data items 532 are identified based on context information. In an example, the static memory pool 414 stores a plurality of compiled shader sequences 520, and their addresses in the static memory pool 414 are identified using performance criteria, user inputs and/or usage statistics of a corresponding graphics pipeline process in the hash table. Optionally, such context based mapping in the hash table 542 is applied to other static data items as well. The hash table protects the static memory pool 414 from storing a static data item repeatedly in association with different situations, thereby causing a waste of its memory resources.

In some implementations, each CPU 404 includes a plurality of CPU cores. Each CPU core has a cache storing both instructions executed by the respective CPU core and data used during execution of the instructions. The cache is directly coupled with the respective CPU core and can provide the instructions and data immediately and directly to the respective CPU core. In some implementations, the CPU core further includes a CPU cache that is shared by the plurality of CPU cores of the CPU 404. The CPU cache stores data that are used during execution of the instructions stored in the CPU cores. The CPU cache feeds its data to the caches 352 directly coupled with the CPU cores.

Similarly, in some implementations, each GPU 406 includes a plurality of GPU cores. Each GPU core has a cache storing both instructions executed by the respective GPU core and data used during execution of the instructions. The cache is directly coupled with the respective GPU core and can provide the instructions and data immediately and directly to the respective GPU core. In some implementations, the GPU core further includes a GPU cache that is shared by the plurality of GPU cores of the GPU 406. The GPU cache stores data that are used during execution of the instructions stored in the GPU cores. The GPU cache feeds its data to the caches directly coupled with the GPU cores. To render gaming content of a gaming title, writes and reads in the memory system 300 are managed by page (i.e., by an array of image pixels corresponding to an image frame of gaming content). Page-sized reads are cached in the local GPU memory hierarchy (L1-L3 caches).

Server System, Client Device and Media Device in Online Gaming Environment

Figure 6A:
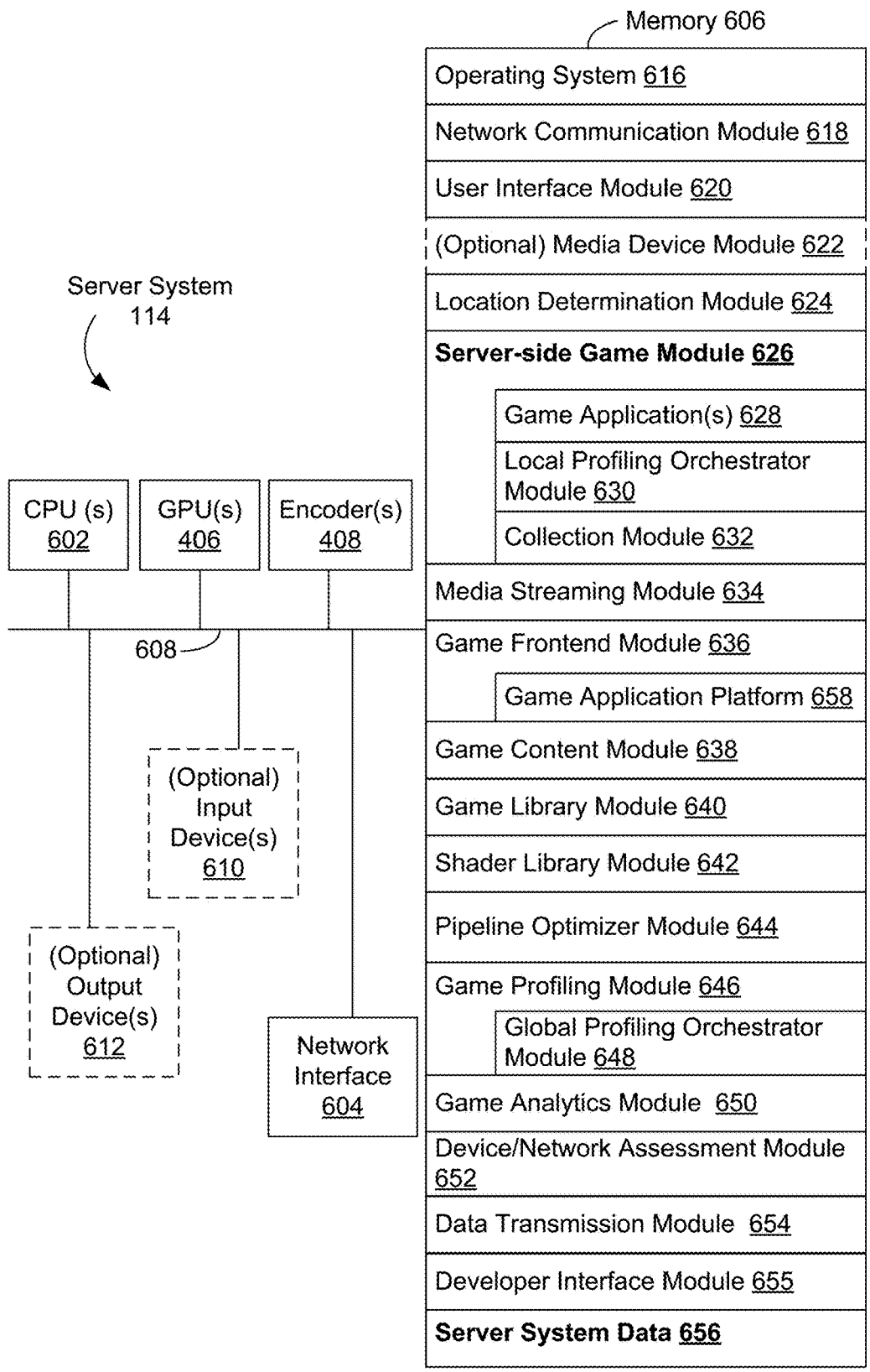
FIG. 6A is a block diagram illustrating a server system in accordance with some implementations.
Figure 6B:
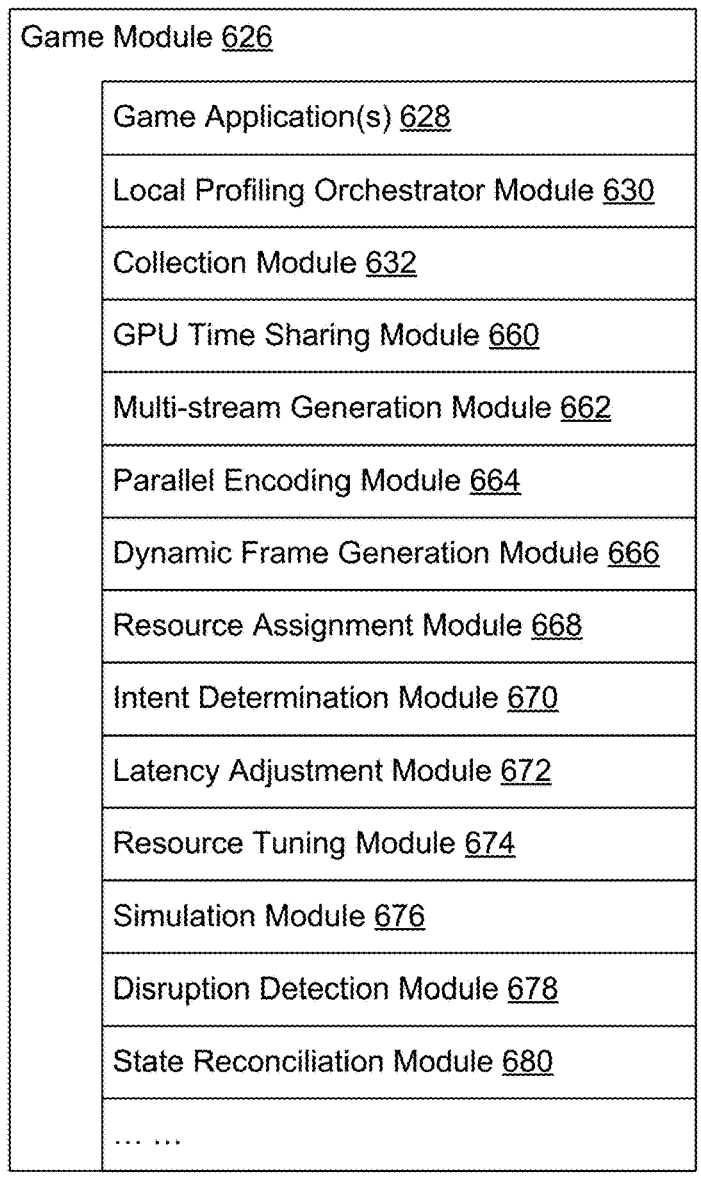
FIG. 6B is a block diagram illustrating a server-side game module that is executed at a game server 118 of the server system in accordance with some implementations.
Figure 6C:
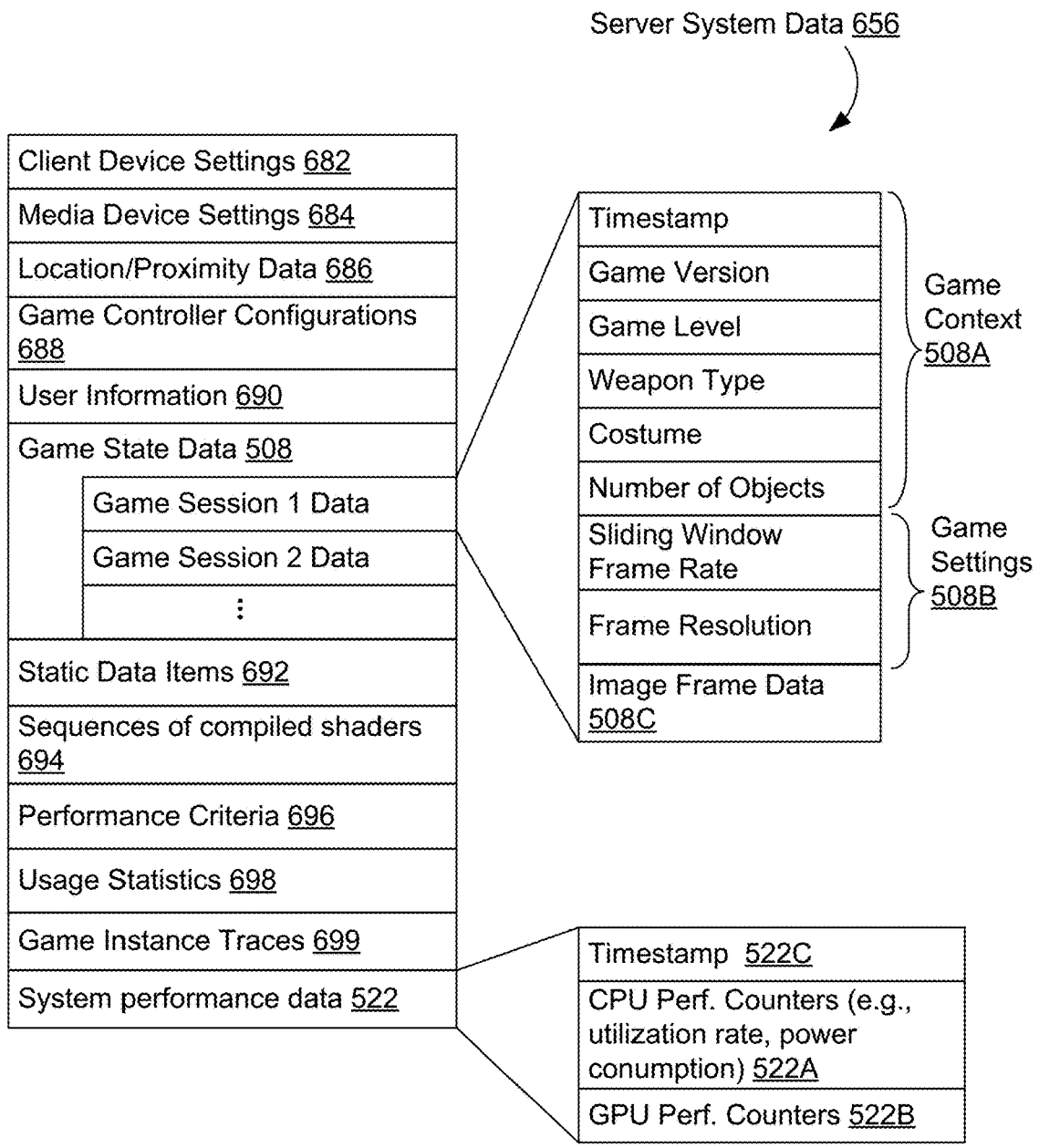
FIG. 6C is a block diagram illustrating data stored in the server system in accordance with some implementations.

FIG. 6A is a block diagram illustrating a server system 114 in accordance with some implementations, and FIG. 6B is a block diagram illustrating a server-side game module 626 that is executed at a game server 118 of the server system 114 in accordance with some implementations. FIG. 6C is a block diagram illustrating data stored in the server system 114 in accordance with some implementations. The server system 114, typically, includes one or more processing units (e.g., CPU(s) 602, GPU(s) 406 and encoder 408), one or more network interfaces 604, memory 606, and one or more communication buses 608 for interconnecting these components (sometimes called a chipset). The server system 114 may optionally include one or more input devices 610 that facilitate user input, such as a keyboard, a mouse, a voice-command input unit or microphone, a touch screen display, a touch-sensitive input pad, a gesture capturing camera, or other input buttons or controls. Furthermore, the server system 114 may use a microphone and voice recognition or a camera and gesture recognition to supplement or replace the keyboard. In some implementations, the server system 114 optionally includes one or more cameras, scanners, or photo sensor units for capturing images, for example, of graphic series codes printed on electronic devices. The server system 114 may also include one or more output devices 612 that enable presentation of user interfaces and display content, including one or more speakers and/or one or more visual displays.

Memory 606 includes high-speed random-access memory, such as DRAM, SRAM, DDR RAM, or other random-access solid state memory devices; and, optionally, includes non-volatile memory, such as one or more magnetic disk storage devices, one or more optical disk storage devices, one or more flash memory devices, or one or more other non-volatile solid state storage devices. Memory 606, optionally, includes one or more storage devices remotely located from one or more processing units. Memory 606, or alternatively the non-volatile memory within memory 606, includes a non-transitory computer readable storage medium. In some implementations, memory 606 includes a subset or all of a main dynamic memory 410, a static memory pool 414 and a shader cache 518. In some implementations, memory 606, or the non-transitory computer readable storage medium of memory 606, stores the following programs, modules, and data structures, or a subset or superset thereof:

- Operating system 616 including procedures for handling various basic system services and for performing hardware dependent tasks;
- Network communication module 618 for connecting the server system 114 (e.g., a game server 118) to other devices (e.g., other servers in the server system 114, the client device 102, and the media device 106) via one or more network interfaces 604 (wired or wireless) and one or more communication networks 112, such as the Internet, other wide area networks, local area networks, metropolitan area networks, and so on;
- User interface module 620 for enabling presentation of information (e.g., a graphical user interface for presenting application(s), widgets, websites and web pages thereof, and/or games, audio and/or video content, text, etc.) at the client device 102 and/or 104;
- Media device module 622 (optional) that is executed to provide server-side functionalities for device provisioning, device control, and user account management associated with media device(s) 106;
- Location determination module 624 for determining the location or proximity of the client devices 102 based on location or proximity information of any of the client devices 102 and the media device 106;
- Server-side game module 626 for providing server-side functionalities associated with one or more gaming titles at one or more game servers 118, including but not limited to setting up and authorizing gaming sessions via one or more game applications 628, assigning a GPU to execute a subset of sessions, storing session state data and other game-related data, processing gameplay inputs from the client devices 102, rendering gameplay outputs (e.g., sequences of image frames) in response to the gameplay inputs, and optimizing game rendering, where the server-side game module 626 includes at least a local profiling orchestrator module 630 for receiving a game profiling instruction from a profiling server 430 and a collection module 632 for collecting a plurality of data samples corresponding to the gaming sessions in response to the game profiling instruction while gaming sessions corresponding to a game instance are being executed;
- Media streaming server module 634 for hosting a media streaming site at a media streaming server 120, receiving concurrent supplemental media streams associated with an online gaming session, and providing the concurrent media streams to a client device 102 or a media device 106 for concurrent display with the online gaming session that is being executed on the game applications 732 of a client device 102 (optionally, the same client device 102 or a distinct client device 102);
- Game frontend module 636 executable at the gaming frontend server 402 for managing user accounts associated with the client devices 102 that have subscribed to gaming service of one or more gaming titles, where in some implementations, the game frontend module 636 further includes a game application platform 658 for providing a user interface that consolidates accesses to multiple game applications 628 that execute different gaming titles based on different gaming content (including third party gaming content);
- Gaming content module 638 executable at content servers 450 for providing gaming content to the client devices 102 and the game servers 118 to initiate online gaming sessions associated with one or more gaming titles and render image frames of the online gaming sessions;
- Game library module 640 executable at a game library server 422 for providing an executable gaming program (e.g., one or more modules in the server-side game module 626) and static data items required for execution of the executable gaming program;
- Shader library module 642 executable at a shader library server 418 for providing standard shader programs as needed by different gaming titles during the course of executing online gaming sessions associated with each gaming title;
- Pipeline optimizer module 644 executable at a pipeline optimizer server 420 for providing server-side optimization of compiled shaders used in a graphics pipeline process for rendering image frames of online gaming sessions associated with a gaming title, optionally concurrently while the server-side game module 626 is rendering gameplay outputs in response to gameplay inputs for the corresponding online gaming sessions;

Game profiling module 646 executable at a profiling server 430 for executing a game profiling application and providing a user interface to receive user inputs defining a game profiling request, sending out the game profiling request to instruct the game servers 118 to collect a plurality of data samples for a subset of game instances executed by the game servers 118 in association with a gaming title, and collecting the plurality of data samples from the game servers 118, where the profiling server module 646 includes a global profiling orchestrator module 648 configured to perform game profiling functions in conjunction with the local profiling orchestrator module 630 executed at the game servers 118;

Game analytics module 650 executable at an analytics server 440 for analyzing the collected data samples and enabling display of analysis results on a user interface;

Device/network assessment module 652 for assessing device and network capabilities of client device 102, including but not limited to assessing network bandwidth of the connection to the client device 102 and assessing whether the client device 102 has the needed module or application to play a game;

Data transmission module 654 for providing data (e.g., game controller configurations 688, software updates, etc.) to client devices 102; and Server system data 656.

Referring to FIG. 6B, in addition to the game applications 628, the local profiling orchestrator module 630 and the collection module 632, the server-side game module 626 includes the following programs, modules, or a subset or superset thereof:

GPU time sharing module 660 for allocating each processing slice of the GPUs 406 to a respective subset of online gaming sessions and dynamically sharing a duty cycle of a processing slice among two or more gaming sessions (i.e., executing the two or more gaming sessions simultaneously and in parallel during the duty cycle) according to real-time data processing need of the first and second gaming sessions;

Multi-stream generation module 662 for encoding both a low latency stream and a normal latency stream within time intervals corresponding to a predefined frame rate;

Parallel encoding module 664 for allocating encoder cores of the encoder 408 to process image tiles of an image and enabling the encoder cores to encode each individual block in a respective image tile as soon as data of the individual block and its corresponding boundary information are available;

Dynamic frame generation module 666 for dynamically generating a variable number of frames in response to a user command based on a predefined frame rate and corresponding communication and processing latencies associated with the user command during an online gaming session; and Resource assignment module 668 for determining target quality parameters of an online gaming session based on corresponding device and connection capabilities, associating resource of the server systems 114 (e.g., virtual machines therein) with the online gaming session based on the target quality parameters, and managing the online gaming session according to a resource profile of the associated resource.

Intent determination module 670 for comparing user input transit times (e.g., between the client device 102 and the server system 114) with display transit times (e.g., between the media device 106 and the server system 114), and determining the user's intent behind particular inputs by matching input events with respective trigger frames;

Latency adjustment module 672 for determining a number of intermediate frames for the GPU 406 to insert between (i) a current frame being processed at the time a user input is received and (ii) a response frame showing a result of the received input;

Resource tuning module 674 for determining latency tolerances for particular online gaming sessions;

Simulation module 676 for simulating gameplay inputs (e.g., in accordance with a particular player's in-game behavior) during network disruptions between a player's gaming controller 102 and the server system 114;

Disruption detection module 678 for detection disruptions in or of a network connection between the server system 114 and the game controller 102 and/or the media device 106, the network connection supporting a gaming session between or involving one or more of the aforementioned components; and State reconciliation module 680 for processing recovered inputs upon resumption of a network connection between the server system 114 and the game controller 102, and reconciling simulation-affected game states with user-intended game states.

Referring to FIG. 6C, in some implementations, the server system data 656 includes the following data items, or a subset or superset thereof:

Client device settings 682 for storing information associated with the client devices 102, including common device settings (e.g., service tier, device model, storage capacity, processing capabilities, communication capabilities, etc.);

Media device settings 684 for storing information associated with user accounts of the media device module 622, including one or more of account access information and information for device settings (e.g., service tier, device model, storage capacity, processing capabilities, communication capabilities, etc.);

Location/proximity data 686 including information associated with the presence, proximity or location of any of the client device 102 and the media device 106;

Game controller configurations 688 for storing controller configurations for various gaming titles; and User information 690 for storing information associated with user accounts of each of one or more gaming titles (e.g., game application 628, FIG. 6) that are hosted on the server system 114, including for example user account information (e.g., identification and passwords), membership type, preference, and activity history; and Game state data 508 for storing data associated with gaming sessions, including for example data for a first gaming session and data for a second gaming session, where the game state data for each gaming session includes, but is not limited to, game context data 508A (e.g., a game level, a weapon type and a costume, objects in a corresponding game scene, identifications of related sessions), game settings 508B (e.g., a sliding window frame rate, a frame resolution, a rendering specification, latency requirement, information of GPU allocation, information of encoder allocation), and image frame data 508C (e.g., texture pages, vertex page, constant pages and frame data) for a corresponding online gaming session;

Static data items 692 for storing data shared by a plurality of online gaming sessions, where the static data items 692 include, but are not limited to, one or more of texture objects, a vertex data buffer object, a constant data object, and sequences of compiled shaders that are optimized based on usage statistics 698 to satisfy different performance criteria;

Sequences of compiled shaders 694 for storing shaders that have been compiled and ready for execution in a graphics pipeline process, where the sequences of compiled shaders include, but are not limited to a default sequence of compiled shader that is used to render gaming content by default and multiple sequences of compiled shaders that are optimized based on usage statistics 698 to satisfy different performance criteria 696;

Performance criteria 696 and usage statistics 698 that are stored in association with the sequences of compiled shaders that are optimized, wherein each of the performance criteria 696 corresponds to one or more of total power consumption, a code size, an average latency, total cache usage, and total memory usage of a sequence of compiled shaders during the course of executing a plurality of online gaming sessions, and the usage statistics 698 characterize execution of each of a plurality of online gaming sessions;

Game instance traces 699 stored for each of a plurality of game instances corresponding to one or more gaming titles executed by the game servers 118, where the game instance traces 699 includes a sequence of ordered gaming events for which data samples are recorded; and System performance data 522 for storing data associated with performance of a processor, a memory, an operating system, one or more input/output ports and a data bus of the game servers 118, which are assigned to execute one or more gaming sessions of a game instance, where the system performance data 522 is stored in at least one of CPU performance counters 522A, GPU performance counters 522B, a stack trace, and architectural counters in association with timestamps 522C each of which indicates an instant of time when the corresponding data sample is collected.

In some implementations, the server system 114 further includes one or more memory controllers 416 that are coupled to the CPUs, GPUs, the main dynamic memory 410 and the static memory pool 414 using one or more communication buses 608. The one or more memory controller 416 optionally include a first memory controller 416A configured to manage the main dynamic memory 410 and a second memory controller 416B configured to manage the static memory pool 414. As shown above, a subset of elements 616-699 (e.g., game state data 508 and system performance data 522) are stored in the main dynamic memory 410, and are accessible via the first memory controller 416A. Static data items 692 are stored in the static memory pool 414, and accessible via the second memory controller 416B.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 606, optionally, stores a subset of the modules and data structures identified above. Furthermore, memory 606, optionally, stores additional modules and data structures not described above.

Figure 7:
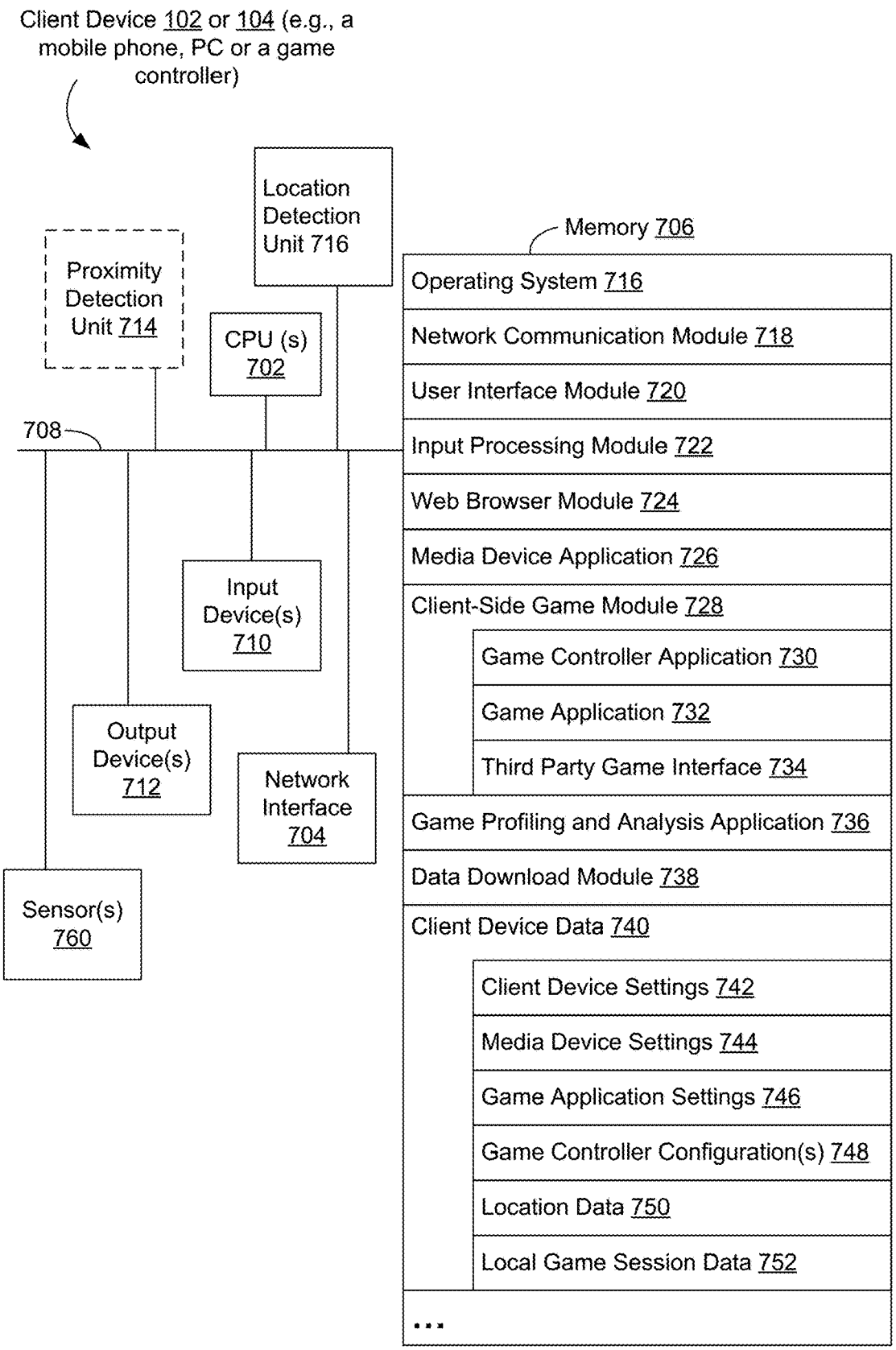
FIG. 7 is a block diagram illustrating an example client device in accordance with some implementations.

FIG. 7 is a block diagram illustrating an example client device 102 or 104 of the gaming environment 100 in accordance with some implementations. Examples of the client device 102 or 104 include, but are not limited to, a mobile phone, a tablet computer, a laptop computer, a desktop computer, a wearable personal device and a dedicated game controller device. The client device 102 or 104 includes one or more processing units (CPUs) 702, one or more network interfaces 704, memory 706, and one or more communication buses 708 for interconnecting these components (sometimes called a chipset). The client device 102 or 104 includes one or more input devices 710 that facilitate user input, such as a keyboard, a mouse, a voice-command input unit or microphone, a touch screen display, a touch-sensitive input pad, a gesture capturing camera, or other input buttons or controls. Furthermore, the client device 102 or 104 uses a microphone and voice recognition or a camera and gesture recognition to supplement or replace the keyboard. In some implementations, the client device 102 or 104 includes one or more cameras, scanners, or photo sensor units for capturing images, for example, of graphic series codes printed on electronic devices. The client device 102 or 104 also includes one or more output devices 712 that enable presentation of user interfaces and display content, including one or more speakers and/or one or more visual displays. Optionally, the client device 102 or 104 includes a location detection device, such as a GPS (global positioning satellite) or other geo-location receiver, for determining the location of the client device 102 or 104. The client device 102 or 104 may also include a proximity detection unit 714, e.g., an IR sensor, for determining a proximity of a media device 106 and/or of another client device. The client device 102 may also include one or more sensors 760 (e.g., accelerometer, gyroscope, etc.) for sensing motion, orientation, and other parameters of the client device 102 or 104, which may be used as input.

Memory 706 includes high-speed random-access memory, such as DRAM, SRAM, DDR RAM, or other random-access solid state memory devices; and, optionally, includes non-volatile memory, such as one or more magnetic disk storage devices, one or more optical disk storage devices, one or more flash memory devices, or one or more other non-volatile solid state storage devices. Memory 706, optionally, includes one or more storage devices remotely located from one or more processing units 702. Memory 706, or alternatively the non-volatile memory within memory 706, includes a non-transitory computer readable storage medium. In some implementations, memory 706, or the non-transitory computer readable storage medium of memory 706, stores the following programs, modules, and data structures, or a subset or superset thereof:

Operating system 716 including procedures for handling various basic system services and for performing hardware dependent tasks;

Network communication module 718 for connecting the client device 102 or 104 to other devices (e.g., the server system 114, the media device 106, and other client device 102 or 104) via one or more network interfaces 704 (wired or wireless) and the local network 110 and one or more networks 112, such as the Internet, other wide area networks, local area networks, metropolitan area networks, and so on;

User interface module 720 for enabling presentation of information (e.g., a graphical user interface for presenting applications, widgets, websites and web pages thereof, and/or games, audio and/or video content, text, etc.) at the client device 102 via one or more output devices 712 (e.g., displays, speakers, etc.);

Input processing module 722 for detecting one or more user inputs or interactions from one of the one or more input devices 710 and interpreting the detected input or interaction;

Web browser module 724 for navigating, requesting (e.g., via HTTP), and displaying websites and web pages thereof, including a web interface for joining the session 116;

Media device application 726 for interacting with a media device 106, including logging into a user account associated with the media device 106, controlling the media device 106 if associated with the user account, and editing and reviewing settings and data associated with the media device 106;

Client-side game module 728 for providing client-side functionalities associated with one or more gaming titles in a client device 102, including but not limited to setting up gaming sessions, locally storing session state data and other game-related data, receiving gameplay inputs from the input device 710, and providing gameplay outputs (e.g., sequences of image frames) in response to the gameplay inputs, where in some implementations the client-side game module 728 further includes a game controller application 730 that configures the client device to a game controller device, one or more game applications 732 corresponding to one or more gaming titles, and a third party game interface 734 that enables gameplay based on content provided by gaming content providers independent from a third party game platform;

Game profiling and analysis application 736 implemented at a client device 104 of an administrator or a game developer for receiving a game profiling or analysis request, sending the game profiling request to the profiling server 430, receiving analysis results from the analytics server 440, and presenting the results on the client device 104 while one or more gaming titles are being executed on client devices 102.

Data download module 738 for downloading data (e.g., game controller configurations 748, client-side game module 728 and other applications, updates to modules and applications and data in memory 706) from server system 114 and other content hosts and providers; and client data 740 storing at least data associated with the game application 732 and other applications/modules, including:

Client device settings 742 for storing information associated with the client device 102 itself, including common device settings (e.g., service tier, device model, storage capacity, processing capabilities, communication capabilities, etc.);

Media device settings 744 for storing information associated with user accounts of the media device application 726, including one or more of account access information, and information for device settings (e.g., service tier, device model, storage capacity, processing capabilities, communication capabilities, etc.);

Game application(s) settings 746 for storing information associated with user accounts of the game application(s), including one or more of account access information, in-game user preferences, gameplay history data, and information on other players;

Game controller configuration(s) 748 for storing information associated with configurations (e.g., received configurations from game controller configurations 688, FIG. 6) of client-side game module 728 for game application(s) 732;

Location data 750 including information associated with the presence, proximity or location of any of the client devices 102 and the media devices 106; and Local gaming session data 752 including information associated with online gaming sessions that are executed on the client device 102 in association with different gaming titles, e.g., latest status information, texture pages, vertex pages, constant pages, and frame data of one or more image frames associated with each of the online gaming sessions.

In some implementations not shown in FIG. 7, the client-side game module 728 includes a commands module for transmitting messages (e.g., setup commands) between the client device 102 and the media device 106 in a menu mode, a streaming module for transmitting gameplay commands between the client device 102 and the server system 114 (e.g., to the media streaming server 120) in a gameplay mode, and a controller module for providing a gameplay input interface to the gaming application. In some implementations, the client-side game module 728 is a part (e.g., a sub-module) of the media device application 726 or another application in memory 706. In some implementations, the client-side game module 728 is a part of the operating system 716. In some implementations, the client-side game module 728 is a distinct module or application.

In some implementations of the client device 102, the media device application 726 (and correspondingly media device settings 744) and game application 732 (and correspondingly game application settings 746) are optional. Depending on the particular game to which the client device 102 is invited to join, the media device application 726 and the game application 732 are not required to play. If any of these applications are needed for playing the game (e.g., the game uses a client-side game module within the media device application 726), and if the application is not in memory 706, the client device may be prompted to download the application.

In some implementations, the client device 102 is a dedicated game controller device. The game controller device includes one or more input devices 710 that facilitate user input, such as microphones (or a voice-command input unit), buttons, directional pad(s), and joystick(s). In some implementations, the game controller 102 further includes gesture recognition features. The game controller device 102 also includes one or more output devices that facilitate audio output and/or visual output, including speaker(s), LED(s), and/or optionally, a display.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 706, optionally, stores a subset of the modules and data structures identified above. Furthermore, memory 706, optionally, stores additional modules and data structures not described above.

Figure 8:
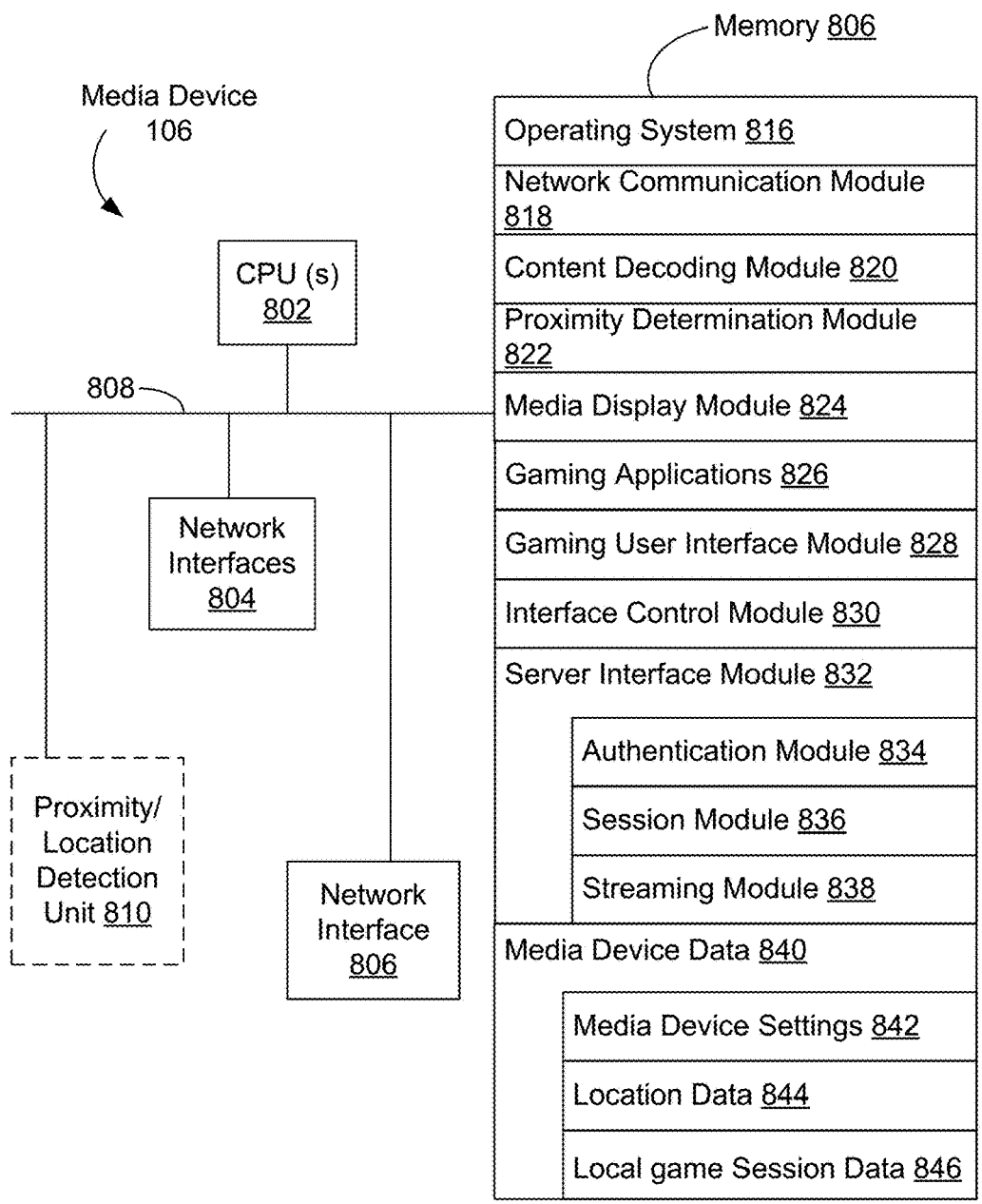
FIG. 8 is a block diagram illustrating an example media device of the gaming environment in accordance with some implementations.

FIG. 8 is a block diagram illustrating an example media device 106 of the gaming environment 100 in accordance with some implementations. The media device 106, typically, includes one or more processing units (CPUs) 802, one or more network interfaces 804, memory 806, and one or more communication buses 808 for interconnecting these components (sometimes called a chipset). Optionally, the media device 106 includes a proximity/location detection unit 810, such as an IR sensor, for determining the proximity of a client device 102.

Further, in some implementations, the media device 106 includes radios that enable one or more communication networks and allow the media device 106 to communicate with other devices (e.g., with the client device 102). In some implementations, the radios are capable of data communications using any of a variety of custom or standard wireless protocols (e.g., IEEE 802.15.4, Wi-Fi, ZigBee, 6LoWPAN, Thread, Z-Wave, Bluetooth Smart, ISA100.5A, WirelessHART, MiWi, Whispernet, Bluetooth low energy etc.), custom or standard wired protocols (e.g., Ethernet, HomePlug etc.), and/or other suitable communication protocol, including communication protocols not yet developed as of the filing date of this document.

Memory 806 includes high-speed random-access memory, such as DRAM, SRAM, DDR RAM, or other random-access solid state memory devices; and, optionally, includes non-volatile memory, such as one or more magnetic disk storage devices, one or more optical disk storage devices, one or more flash memory devices, or one or more other non-volatile solid state storage devices. Memory 806, optionally, includes one or more storage devices remotely located from one or more processing units 802. Memory 806, or alternatively the non-volatile memory within memory 806, includes a non-transitory computer readable storage medium. In some implementations, memory 806, or the non-transitory computer readable storage medium of memory 806, stores the following programs, modules, and data structures, or a subset or superset thereof:

- Operating system 816 including procedures for handling various basic system services and for performing hardware dependent tasks;
- Network communication module 818 for connecting the media device 106 to other computers or systems (e.g., the server system 114, and the client device 102) via one or more network interfaces 804 (wired or wireless) and one or more networks 112, such as the Internet, other wide area networks, local area networks, metropolitan area networks, cable television systems, satellite television systems, IPTV systems, and so on;
- Content decoding module 820 for decoding content signals received from one or more content sources (e.g., the server system 114 that provides game output from the gaming session 116) and outputting content in the decoded signals to an output device 108 coupled to the media device 106, where in some implementations, the outputted content includes two or more media streams 130 and 132 intended for use in gameplay and review, respectively;
- Proximity determination module 822 for determining the proximity of the client device 102 and based on proximity related information that is detected by the proximity detection unit 810 or provided by the server system 114;
- Media display module 824 for controlling media display; and
- Gaming applications 826 for controlling the lifecycle of all the gaming components on the media device 106, receiving messages (e.g., commands) from a game controller 102, and for relaying game controller inputs to the server system 114;
- Gaming user interface module 828 for accessing user content (e.g., profile, avatar, purchased games, game catalog, friends, messaging) and optimized images for display, and for receiving inputs from a client device 102 during gameplay;
- Interface control module 830 for interfacing communications between the gaming application 826 and the gaming user interface module 828, and for initiating a session pairing request with the server system 114 during a game launch;
- Server interface module 832 for communications with the server system 114 and an authentication system (if any), including:
  - Authentication sub-module 834 for communicating with the authentication system to authenticate a linked user of the game controller;
  - Session sub-module 836 for receiving gaming session information (e.g., session id, game server provisioning IP address, port etc.) from the server system 114, and for invoking a callback on the interface control module 830 providing this information; and
  - Streaming sub-module 838 for receiving and displaying, in real time during gameplay, gaming streams transmitted from the media streaming server 120 of the server system 114; and
- Media device data 840 storing at least data including:
  - Media device settings 842 for storing information associated with user accounts of a media device application, including one or more of account access information and information for device settings (e.g., service tier, device model, storage capacity, processing capabilities, communication capabilities, etc.);
  - Location data 844 including information associated with the presence, proximity or location of any of the client device 102 and/or 104, and the media device 106; and
  - Local gaming session data 846 including information associated with online gaming sessions that are executed on the client device 102 and/or 104 in association with different gaming titles, e.g., latest status information, texture pages, vertex pages, constant pages, and frame data of one or more image frames associated with each of the online gaming sessions.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

Distributed Real-Time Game Profiling and Analysis

Figure 9A:
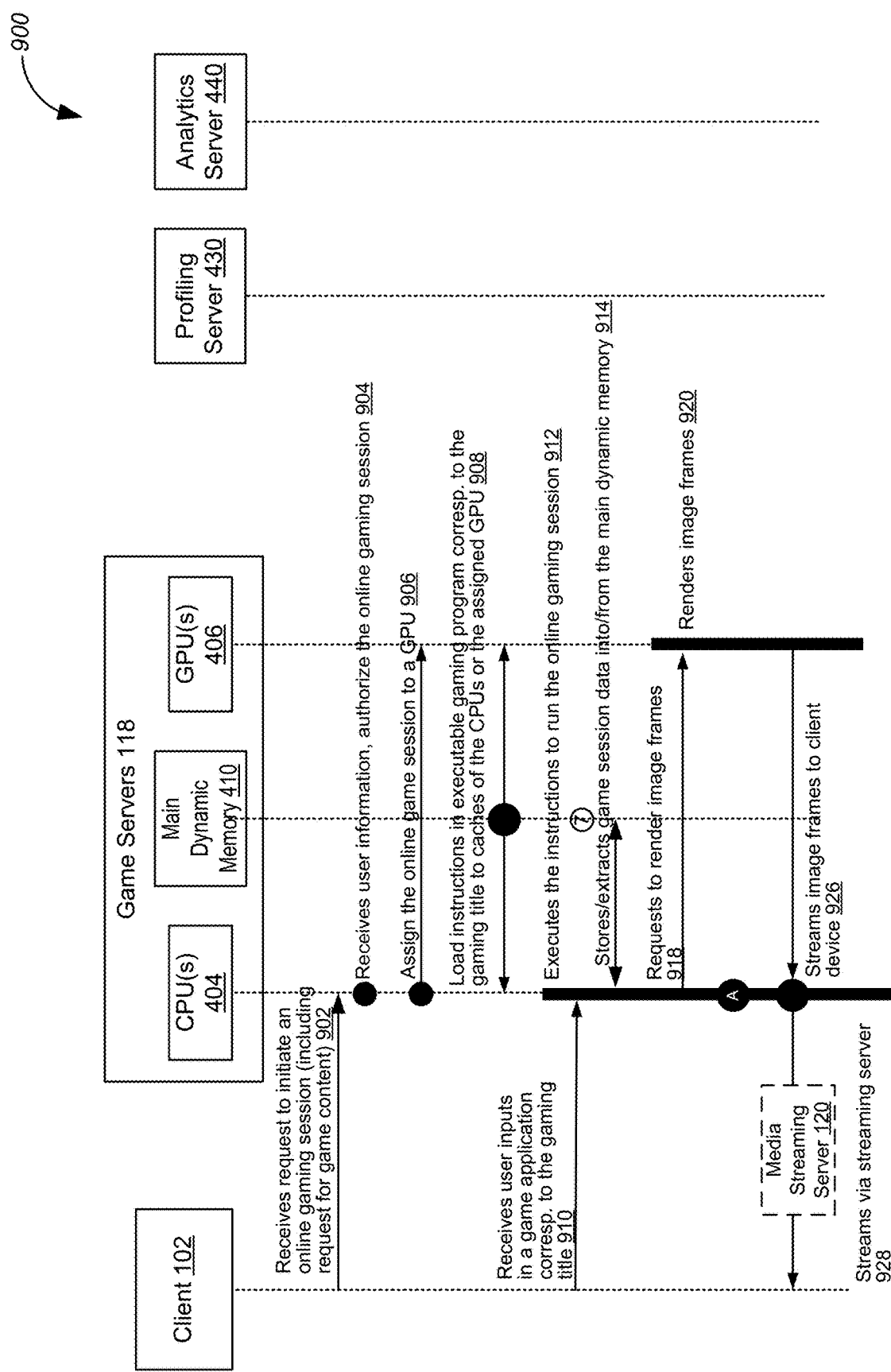
FIG. 9A is an example flow chart showing a process of executing an online gaming session on a server system in accordance with some implementations.
Figure 9B:
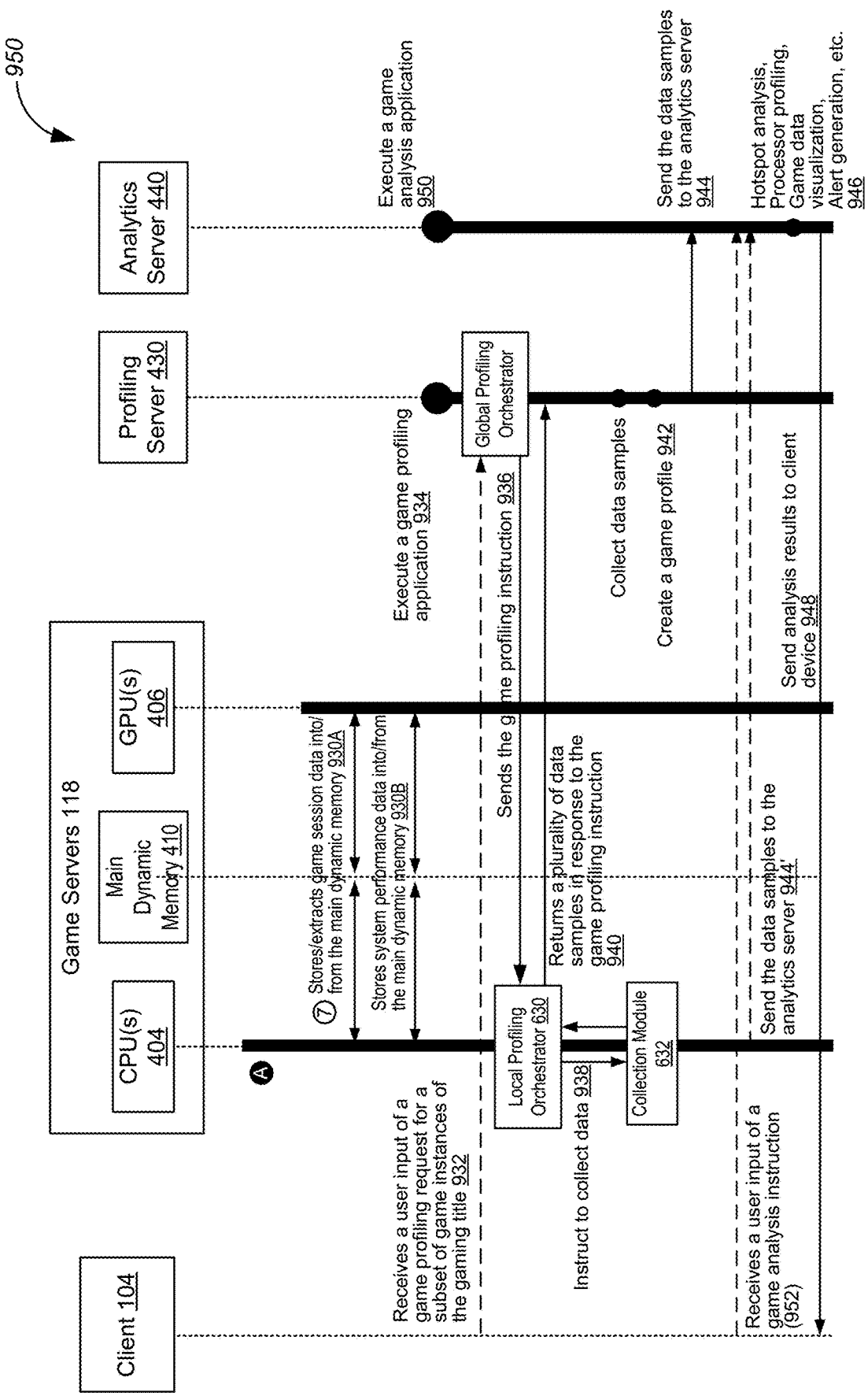
FIG. 9B is an example flow chart showing a real-time game profiling and analysis process implemented collaboratively by one or more game servers, a profiling server and/or an analytics server of a server system in accordance with some implementations.

FIG. 9A is an example flow chart showing a process 900 of executing an online gaming session on a server system 114 in accordance with some implementations. FIG. 9B is an example flow chart showing a real-time game profiling and analysis process 950 implemented collaboratively by one or more game servers 118, a profiling server 430 and/or an analytics server 440 of a server system 114 in accordance with some implementations. The game servers 118 include one or more CPUs 404 and a plurality of GPUs 406, and employ a multilevel storage scheme (e.g., FIG. 5), and are configured to host one or more gaming titles for users of client devices 102. The CPUs receives (422) a plurality of session requests to initiate a plurality of online gaming sessions under a gaming title selected from the plurality of client devices 102. Each client device 102 executes a real time user-interactive gaming application corresponding to the gaming title, and a respective session request is sent (902) from the gaming application of the respective client device 102. The respective session request includes user information of the requesting client device 102. After receiving the user information of the respective client device 102, the CPUs 404 authorize (904) a corresponding online gaming session based on the user information, and allocate (906) one of the GPUs 406 to execute the corresponding online gaming session. In some implementations, two or more of the plurality of online gaming sessions are allocated to the one of the GPUs 406. Stated another way, the two or more online gaming sessions have to share computational and storage resources of the one of the GPUs based on time-division multiplexing (TDM), spatial multiplexing or a combination thereof. More details of GPU allocation in gaming content rendering are explained in U.S. Provisional Patent Application No. 62/646,824, titled "Methods and Systems for Rendering and Encoding Content for Online Interactive Gaming Sessions," filed on Mar. 22, 2018, which is incorporated by reference herein in its entirety.

In response to each session request, the CPUs 404 copy (908) instructions of an executable gaming program of the gaming title from the main dynamic memory 410 to the local caches of the CPUs 404, and executes the instructions one by one. Likewise, if instructed by the CPUs 404, the respective GPU assigned to execute the respective online gaming session loads (908) related game rendering instructions in the executable gaming program to its local caches, and executes the game rendering instructions one by one.

In some implementations, each of the plurality of online gaming sessions is constantly refreshed, e.g., at a rate of 60 frames per second (fps). In some implementations, each of the plurality of online gaming sessions is refreshed in response to a user action inputted by the respective session itself or by a related session. For example, a subset of online gaming sessions are related and synchronized when they are in the same gaming scene of the gaming title, and gaming content delivered to each of the subset of online gaming sessions is updated at least when any one of the subset of online gaming sessions inputs a user action.

Specifically, for a specific online gaming session, the CPUs 404 receives (910) a user input entered via a gaming application of a first client device that is engaged in the online gaming session or another distinct gaming session sharing the same gaming scene with the online gaming session. In response, the CPUs 404 execute (912) the instructions of the executable gaming program corresponding to the gaming title to instruct (918) a GPU 406 assigned to execute the online gaming session to render a sequence of image frames according to the user input. During execution of this online gaming session, dynamic data items associated with this online gaming session are stored into or extracted from (914) the main dynamic memory 410. The assigned GPU 406 then executes (920) game rendering instructions received from the CPU 404 to render the image frames of the online gaming session based on the user input. The image frames rendered by the GPU 406 are encoded by the encoder 408, and streamed (926) to the client device 102 executing the online gaming session. In some implementations, the image frames rendered by the GPU 406 (e.g., of a normal latency stream intended for spectator review) are streamed (928) to the client device 102 via a media streaming server 120.

While the game servers 118 are executing the online gaming sessions sharing the same gaming scene of the gaming title in parallel, the game servers 118 are also instructed by the profiling server 430 to collect data samples related to the online gaming sessions. Some or all of the dynamic data items stored into the main dynamic memory 410 in association with the online gaming sessions have been stored in response to a game profiling request issued by the profiling server 430. That said, during execution of an online gaming session, game state data associated with the online gaming sessions are stored into or extracted from (930A) the main dynamic memory 410, and system performance data associated with the online gaming sessions are stored into or extracted from (930B) the main dynamic memory 410. More specifically, the game servers execute a plurality of game instances for the gaming title in parallel, and each of the plurality of game instances includes one or more synchronous gaming sessions. While the game servers 118 are executing the plurality of game instances, the profiling server 430 receives a game profiling request (932) for collecting a plurality of data samples for each of a subset of the game instances. In some implementations, a client device 104 of an administrator or game developer executes (934) a game profiling application 736, and the profiling server 430 enables display of a user interface on the game profiling application 736 to receive a user input of the game profiling request that defines the subset of game instances corresponding to the gaming title. The profiling server 430 includes a global profiling orchestrator module 648 that generates a game profiling instruction based on the received game profiling request and sends (936) the game profiling instruction to the game servers 118 to collect the plurality data samples in real time while the game servers 118 executes the plurality of game instances.

The game servers 118 include a local profiling orchestrator module 630 and a collection module 632. After receiving the game profiling instruction, the local profiling orchestrator module 630 instructs (938) the collection module 632 to collect the requested data samples while a game application 628 executes the corresponding game instances. The local profiling orchestrator 630 then sends (940) the collected data samples to the profiling server 430 periodically, according to a schedule or in response to a query. Locally, the collected data samples are stored as part of the dynamic data items that are dynamically stored in the main dynamic memory 410 in association with the online gaming sessions prior to being sent to the profiling server 430. The collected data samples include at least game state data 508 and system performance data 522 associated with the online gaming sessions corresponding to each of the subset of game instances that are identified in the game profiling request. In some implementations, the profiling server 430 receives the collected data samples from the game servers 118 and creates a game profile based on these data samples collected for each game instance in the identified subset of game instances.

In some implementations, after receiving the data samples collected by the game servers 118, the profiling server 430 performs analysis functions on the collected data samples by itself. Alternatively, in some implementations, the profiling server 430 sends (944) the collected data samples to the analytics server 440 that is distinct from the profiling server 430, and the analytics server 440 is configured to perform (946) analysis functions on the collected data samples and provide (948) analysis results to a client device 104 of an administrator or game developer. Examples of the analysis functions include, but are not limited to, hotspot analysis, processor profiling, game data visualization, and alert generation. The client device 104 of the administrator or game developer executes a game analysis application on the profiling server 430 or analytics server 440, which enables a user interface of the game analysis application on the client device for visualizing the collected data samples, receiving (952) user inputs of game analysis requests, and/or presenting analysis results in response to the game analysis requests. Optionally, the game profiling application and the game analysis application are integrated as a single application (e.g., game profiling and analysis application 736 in FIG. 7) or executed independently from each other as two applications. The game profiling application and the game analysis application, if independent from each other, are optionally running on the same client device 104 or two distinct client devices 104. That said, the game profiling instruction and the game analysis request are optionally sent from the same application running on the same client device 104 or from two distinct applications running on the same client device 104 or two distinct client devices 104.

In some implementations, the plurality of data samples collected by the collection module 632 of the game servers 118 are stored locally until receiving a query (e.g., in a game analysis request) from the analytics server 440. In response to the query, a subset or all of the plurality of data samples are sent (944') to the analytics server 440 for further analysis.

Figure 10A:
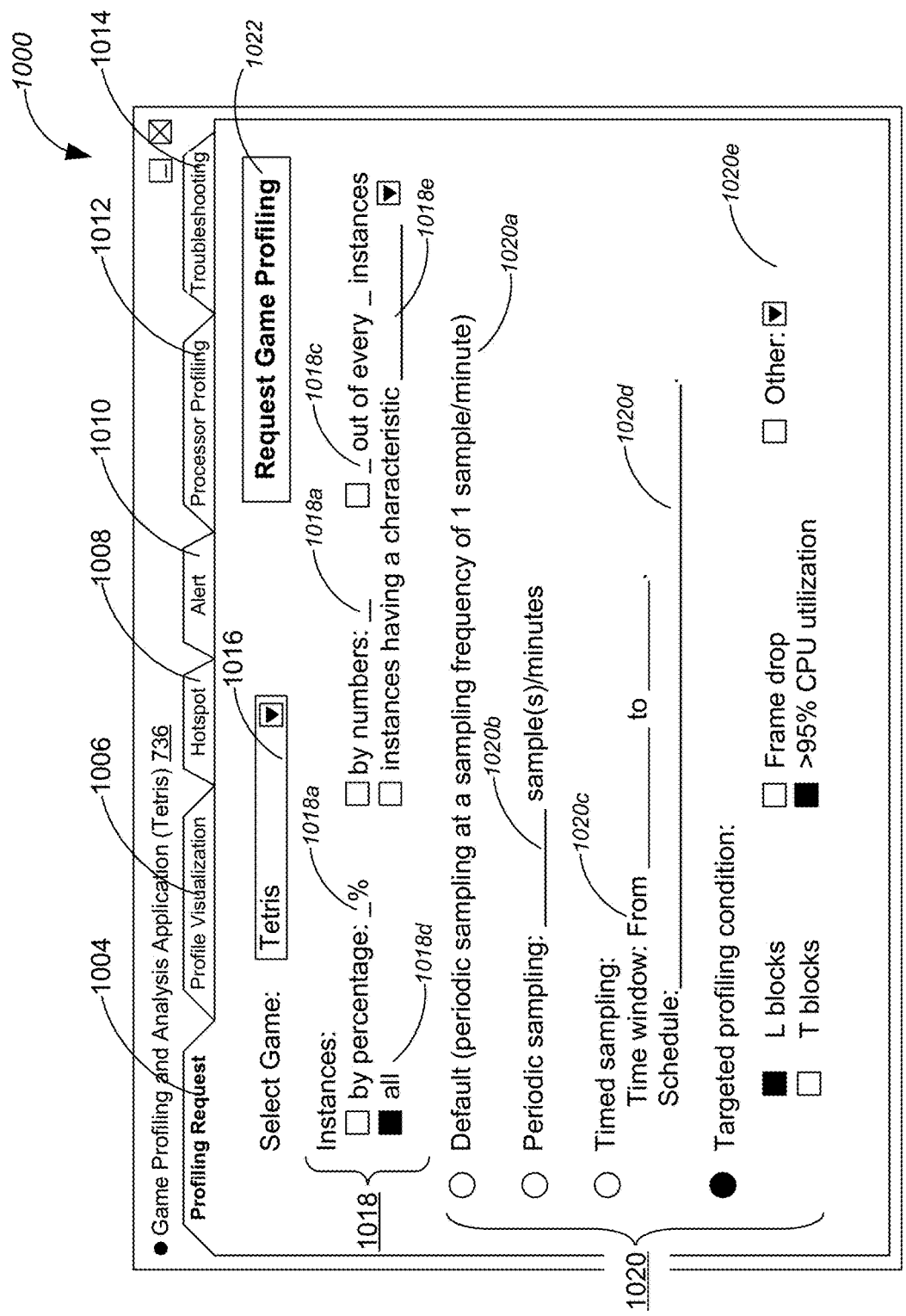
FIGS. 10A-10C are example graphics user interfaces (GUIs) enabled by a game profiling and analysis application that is executed on a client device in accordance with some implementations.
Figure 10B:
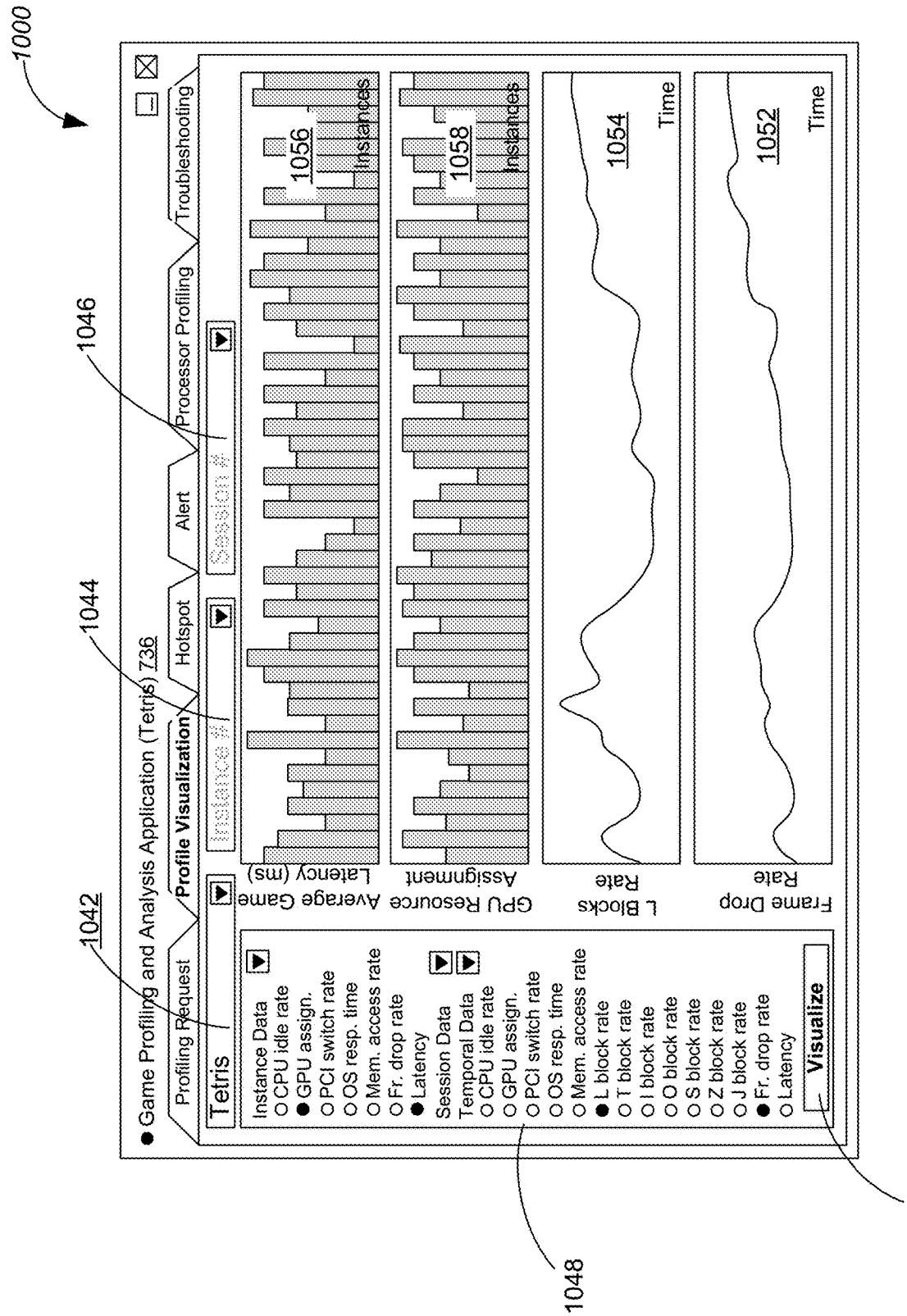
Figure 10C:
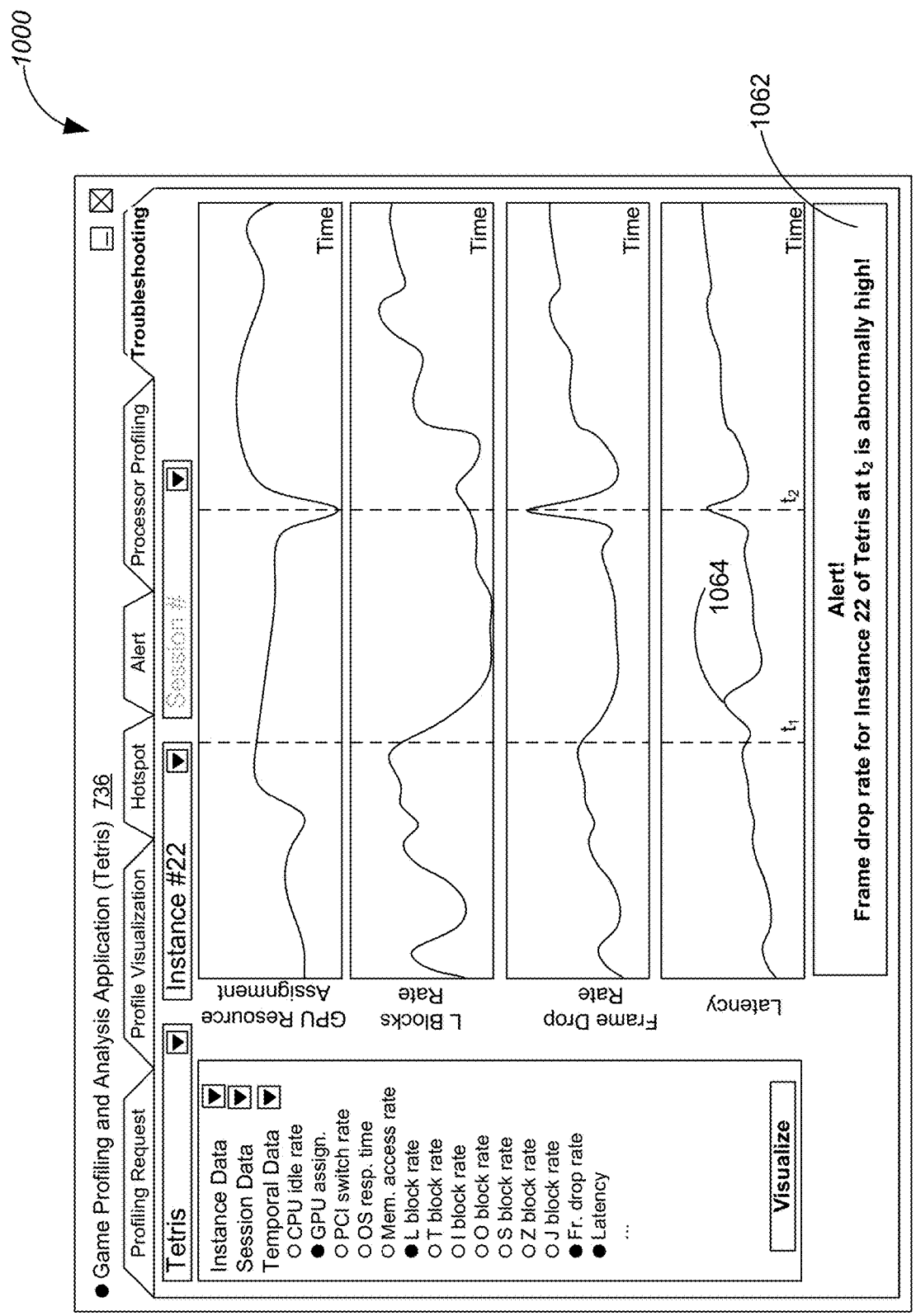

FIGS. 10A-10C are example graphics user interfaces (GUIs) 1000 enabled by a game profiling and analysis application 736 that is executed on a client device 104 in accordance with some implementations. The game profiling and analysis application 736 is a combination of a game profiling application and a game analysis application. Alternatively, in some implementations, the game profiling application and the game analysis application are executed as two independent applications. The game profiling and analysis application 736 performs both profiling and analysis functions that are available in the game profiling application and the game analysis application. Optionally, the GUIs 1000 of the game profiling and analysis application 736 have a plurality of tabs 1004-1014 including a first subset of tabs (e.g., a profiling request tab 1004) and a second subset of tabs (e.g., analysis tabs 1006-1014) that correspond to game profiling functions and game analysis functions, respectively. The game profiling and analysis application 736 is configured to receive user inputs defining a game profiling request on the first subset of tabs, generate the game profiling request for data samples of a subset of game instances, and send the game profiling request to the profiling server 430. The game profiling and analysis application 736 is also configured to receive user inputs defining a game analysis request on the second subset of tabs, generate the game analysis request, and present analysis results to a user of the game analysis application (e.g., a game administrator or developer) in response to the game analysis request. It is noted that in some implementations, the GUIs 1000 of the game profiling and analysis application 736 has a single page or multiple pages used for both game data collection and analysis and that each page are activated using a mechanism distinct from tab selection.

The profiling server 430 and the analytics server 440 are configured to perform the game profiling and analysis functions associated with the game profiling and analysis application 736. Thus, the GUIs 1000 of the game profiling and analysis application 736 are enabled by a server-side game profiling module 646 and a server-side gaming analysis module 650 that are provided by the profiling server 430 and the analytics server 440. It is noted that in some implementations, the server-side game profiling module 646 and the server-side gaming analysis module 650 are not implemented on the game servers 118 for the purposes of conserving computational, storage and communication capabilities for executing one or more gaming titles and rendering image frames for gaming sessions related to the gaming titles.

Referring to FIG. 10A, the GUIs 1000 of the game profiling and analysis application 736 are configured to receive user inputs that define the game profiling request on the profiling request tab 1004. Optionally, the profiling request tab 1004 of the GUIs 1000 includes a first field 1016 for selecting a gaming title from a plurality of gaming titles executed by the game servers 118, a second field 1018 for identifying a subset of game instances of the selected gaming title, and a third field 1020 for defining a sampling scheme for collecting data samples of the identified subset of game instances. After the gaming title is specified in the first field 1016, the profiling server 430 identifies a plurality of game instances running with the gaming title, and allows the user to define the subset of game instances for data sample collection on the GUI 1000. In some implementations, the subset of game instances is defined by a user-defined percentage $1018a$ (e.g., 20%), a user-defined number $1018b$ (e.g., 5), or a user-defined instance pitch $1018c$ (e.g., one out of every five) of the plurality of game instances running with the gaming title. In an example, the user-defined percentage or number of game instances are randomly selected from the plurality of game instances. In some implementations, the subset of game instances is defined in the field $1018d$ to include all of the plurality of game instances running with the gaming title. Alternatively, in some implementations, the subset of game instances is defined according to a characteristic $1018e$ which is optionally selected from a list of pre-predetermined characteristics (e.g., having more than 100 players, having 50% players reaching an advanced level, running a test game scene or feature, and being among the top 5 most power-consuming game instances).

In some implementations, the sampling scheme for collecting data samples of the identified subset of game instances is defined as a default scheme $1020a$, e.g., periodic sampling at a sampling frequency of one sample per minute. It is noted that one data sample includes at least a set of game state data and system performance data captured at a specific instant of time. In some implementations, the sampling scheme is periodic sampling with a user-defined sampling rate, and the GUIs 1000 includes a field $1020b$ configured to receive a user input of the sampling rate. In some implementations, the sampling scheme is timed sampling implemented during a user-defined time window and/or according to a user-defined schedule, and the GUIs 1000 includes fields $1020c$ and $1020d$ configured to receive user inputs of the time window and the schedule. Alternatively, in some situations, the user is interested in a targeted profiling condition, because performance of the corresponding gaming title is bottlenecked or desirable at the targeted profiling condition. The GUIs 1000 includes a list of targeted profiling conditions $1020e$ from which the user is prompted to select one or more targeted profiling conditions, such that data samples can be collected when the one or more targeted profiling conditions occur to the selected subset of game instances corresponding to the gaming title. The GUIs 1000 optionally includes a field (not shown) to define a custom condition into the list of targeted profiling conditions. In a specific example related to a Tetris Game, the list of targeted profiling conditions includes at least occurrence of a L block, occurrence of a T block, a frame drop, and >95% CPU utilization.

After the gaming title, the subset of instances and the sampling scheme are defined according to the user inputs in the fields 1016-1020, the game profiling and analysis application 736 sends to the profiling server 430 the game profiling request generated based on the gaming title, the subset of instances and the sampling scheme. Specifically, the game profiling and analysis application includes a user affordance 1022, and the game profiling request is generated and sent to the profiling server 430 in response to receiving a user action on the user affordance 1022. In this example, the user defines a game profiling request to collect data samples for all game instances experiencing a target profiling condition related to L blocks (i.e., when L blocks drop) in a gaming title of Tetris. When the user of the game profiling and analysis application 736 clicks on the user affordance 1022, this specific game profiling request is generated based on the user inputs in the fields 1016-1020, and sent to the profiling server 430.

The game profiling request includes information concerning one or more types of the plurality of data samples to be collected by the profiling server 430 from the game servers 118. In some implementations, the information concerning the types of the plurality of data samples is pre-defined, and for example, includes all data in CPU performance counters, GPU performance counters, a stack trace, and architectural counters. In some implementations not shown here, the GUIs 1000 includes a field configured to receive user inputs that define the information concerning the types of the plurality of data samples. The user inputs may select a subset or all data in the CPU performance counters, the GPU performance counters, the stack trace, and the architectural counters.

Referring to FIG. 10B, the GUIs 1000 of the game profiling and analysis application 736 are configured to receive user inputs for defining a game analysis request on the analysis tab 1006, and present analysis results to the user of the corresponding game analysis application 1002 in response to the game analysis request on the analysis tab 1006. In some implementations not shown, the GUIs 1000 includes two separate tabs for defining the game analysis request and presenting the analysis results, respectively. At the time of loading the analysis tab 1006, a plurality of data samples has been collected from the game servers 118 by the profiling server 430. In some situations, information of the plurality of data samples are displayed on the analysis tab 1006 to allow the user to select a subset of the data samples for visualization or analysis. The analytics server 440 enables the GUIs 1000 to visualize the plurality of data samples collected by the profiling server 430 directly. In some situations, after the information of the plurality of data samples is analyzed, analysis results are visualized on the analysis tab 1006, and the user is prompted to select one or more results from a plurality of analysis results for visualization and further analysis. Conversely, in the background, the analytics server 440 receives the game analysis request from the client device, analyzes the plurality of data samples remotely in the background, and sends the analysis results to the client device for display on the GUIs 1000. Specifically, the analytics server 440 is configured to conduct hotspot analysis of processors of the game servers 118, profile performance of the processors, and profile the plurality of game instances and the one or more synchronous gaming sessions corresponding to each game instance.

The profiling server 430 stores data samples collected for different gaming titles, instances and sessions in a game profiling database. The game analysis request identifies one or more of a gaming title, a game instance, a gaming session, and a subset of the plurality of data samples, and the subset of the plurality of data samples associated with the gaming title, instance and/or session are extracted from the game profiling database for visualization or analysis. The GUIs 1000 includes a title field 1042, an instance field 1044 and a session field 1046 to receive user selections or inputs of the gaming title, instance and session, respectively. In some situations, the instance field 1044 and the session field 1046 are left blank, when general analysis results is presented and compared for the subset of instances for which data samples are collected. In some situations, the instance field 1044 is filled and the session field 1046 is left blank, when general analysis results is presented and compared for online gaming sessions corresponding to an instance in the instance field. Further, the GUIs 1000 includes a list of data samples 1048, e.g., CPU idle rate, GPU resource assignment, PCI switch rate, OS response time, memory access rate, frame drop rate and average game latency. A subset of the data samples 1048 can be selected for visualization on the GUIs 1000. The game profiling and analysis application includes a user affordance 1050, and the game analysis request is generated and sent to the analytics server 430 in response to receiving a user action on the user affordance 1050. In this example, the user defines a game analysis request to visualize the GPU resource assignment and the average game latency corresponding to the subset of instances for which data samples are collected in a gaming title of Tetris, a temporal variation of the L block rate, and a temporal variation of the frame drop rate. When the user of the game profiling and analysis application 736 clicks on the user affordance 1050, this specific game analysis request is generated based on the user inputs in the fields 1042-1048, and sent to the analytics server 430.

Alternatively, in some implementations, the plurality of data samples collected by the collection module 632 of the game servers 118 are stored locally until the game servers 118 receive a query (e.g., in a game analysis request) from the analytics server 440 directly or indirectly. That said, only after the user action on the user affordance 1050, a subset or all of the plurality of data samples are obtained from the game servers according to the selection in the fields 1042-1048, and sent to the analytics server 440 for further analysis.

The plurality of data samples or the analysis results are presented on the GUIs in one of a temporal diagram, an instance diagram, or a session diagram. In accordance with the temporal diagram, the plurality of data samples or analysis results are plotted in a time domain. For example, a frame drop rate is plotted in a time domain in a temporal diagram 1052, and a L block rate (a percentage of sessions that are operating on L blocks) is plotted in a time domain in a temporal diagram 1054. In accordance with the instance diagram, the plurality of data samples or analysis results are plotted with respect to the subset of instances for which the plurality of data samples are collected. For example, an average game latency is obtained and plotted for a subset of instances selected for Tetris Game in the instance diagram 1056, and a GPU resource assignment is plotted for the subset of instances in the instance diagram 1058. In accordance with the session diagram, one of the subset of game instances is selected, e.g., in a field 1048, and the plurality of data samples or analysis results are plotted for all sessions of the selected one of the subset of game instances.

Referring to FIG. 10C, the GUIs 1000 of the game profiling and analysis application 736 visualizes a set of data samples (e.g., GPU resource assignment, an L blocks rate, a frame drop rate and a game latency) for a specific game instance, instance #22, in the temporal domain. The set of data samples includes two data samples that are captured at two distinct instants of time $t_1$ and $t_2$. Each data sample includes one or more of a GPU resource assignment, an L blocks rate, a frame drop rate and a game latency corresponding to its respective instant $t_1$ or $t_2$. In some implementations, the analytics server 440 receives the set of data samples from the profiling server 430, and compares each data sample with a respective threshold level. In accordance with a comparison result, the analytics server 440 identifies an anomalous profile event (e.g., a frame drop rate larger than a threshold value of 50%) and generates an alert message indicating occurrence of the anomalous profile event. The alert message 1062 is sent to the client device and presented on the GUIs 1000 to remind the user of the client device of the anomalous profile event.

Alternatively, in some implementations, the analytics server 440 receives the set of data samples from the profiling server 430, and compares the two data samples captured at the instants $t_1$ and $t_2$. In accordance with a comparison result, the analytics server 440 identifies an anomalous profile event (e.g., a frame drop rate increase of 50%) and generates an alert message indicating occurrence of the anomalous profile event. The alert message 1062 is sent to the client device 104 and presented on the GUIs 1000 to remind the user of the client device 104 of the anomalous profile event. In this specific example, a frame drop rate increase is identified based on game state data of the two data samples corresponding to the instants $t_1$ and $t_2$. A processor error (e.g., a GPU resource assignment drop of >50%) is determined based on the system performance data of the two data samples that correspond to the online gaming sessions of the corresponding game instance. The frame drop rate increase is associated with the processor error. Thus, it is determined that the root cause of the anomalous profile event is the processor error.

In another example not shown, an increase of a frame drop rate and a game action rate of a specific game action are identified at an instant $t_2$ based on the game state data of the two data samples, and the increase of the frame drop rate is associated with the specific game action as being probably caused by the specific game action. For example, in the Tetris game, the increase of the frame drop rate is determined to be caused by L blocks, because a corresponding L block rate is substantially high (e.g., a percentage of sessions that are operating on L blocks exceeds a block rate threshold).

In some implementations not shown, the analytics server 440 compares values of one of the plurality of data samples (e.g., values of one of the game state data and system performance data in the plurality of data samples) at the first instant $t_1$ and the second instant $t_2$ subsequent to the first instant $t_1$. The analytics server 440 determines and/or visualizes a difference between the values of the one of the plurality of data samples at the first and second instants. Further, in some implementations, a game profiling request is sent to set forth a profile criterion at a third instant $t_3$ that is subsequent to the first time $t_1$ and preceding to the second instant $t_2$. The determined/visualized difference is thereby associated with the profile criterion. Under some circumstances, the profile criterion includes a change of type, compilation, or version of a shader program used to render the one or more synchronous gaming sessions corresponding to the respective game instance.

In some implementations, after one or more of the plurality of data samples are displayed on the GUI 1000, the game profiling and analysis application 736 receives from the GPU a user input identifying an anomalous profile event in the subset of the plurality of game instances from which the data samples are collected. For example, the GUI 1000 may receive a user input at a peak 1064 of the average latency to indicate an anomalous profile event. Further, in some implementations, a first game profiling instruction enables a periodic data sample collection, and a subset of the plurality of collected data samples are visualized in FIG. 10C. An anomalous profile event (e.g., the peak 1064 of the average latency) is identified in the plurality of data samples collected in response to the game profiling instruction that enables the periodic data collection. Then, the profiling server 430 obtains a game profiling request including a target profiling condition associated with the anomalous profile event, and generates a second game profiling instruction to collect a second plurality of data samples according to the target profiling condition. Optionally, the profiling server 430 automatically determines the target profiling condition based on the anomalous profile event and generates the second game profiling instruction. Optionally, the GUIs 1000 receives a first user input in the field 1020e to define the target profiling condition based on the anomalous profile event, and a second user input on the user affordance 1022 to generate the game profiling request.

Figure 11:
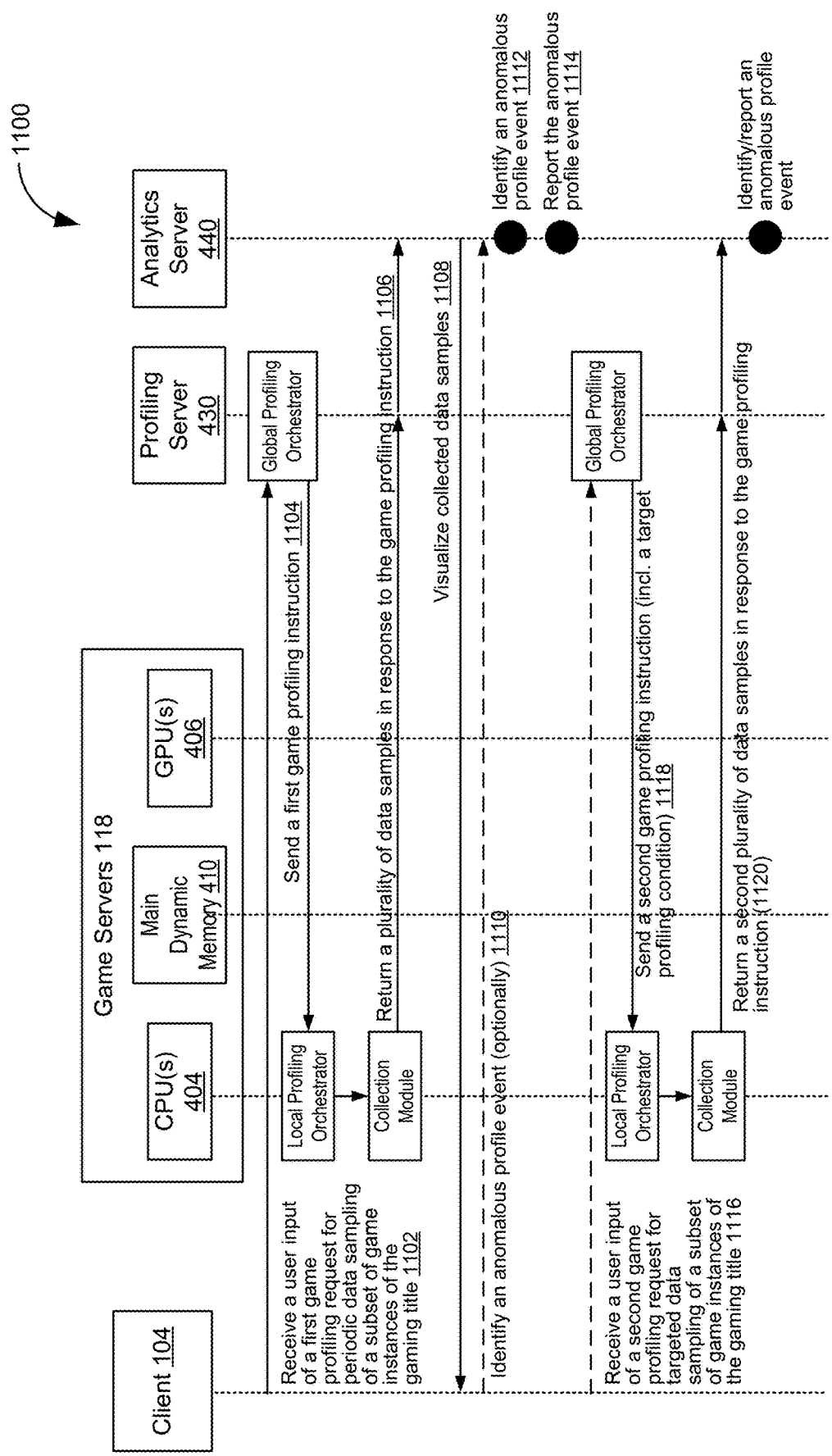
FIG. 11 is an example flow chart showing a game profiling and analysis process in accordance with some implementations.

FIG. 11 is an example flow chart showing a game profiling and analysis process 1100 in accordance with some implementations. In accordance with the game profiling and analysis process 1100, while the game servers 118 are executing a plurality of game instances of a gaming title, a game profiling and analysis application is executed concurrently on a client device 104 of a game administrator or developer to receive (1102) user inputs corresponding to a first game profiling request on the GUIs 1000 for collecting data samples of a subset of the game instances of the gaming title periodically. The first game profiling request for periodic data sampling is sent to the profiling server 430, which has a global profiling orchestrator module 648. The global profiling orchestrator module 648 then generates and sends (1104), to the game servers 118, a first game profiling instruction for collecting a plurality of data samples for each of the subset of the game instances at the game servers 118 concurrently while the game servers 118 are executing the plurality of game instances. In some implementations, the first game profiling instruction is received by a local profiling orchestrator module 630 of the game servers 118, and sent to a collection module 632 for collecting the plurality of data samples for each of the subset of the game instances. In response to the first game profiling instruction, the collection module 632 of the game servers 118 collects the plurality of data samples for each of the subset of the game instances periodically. The collected data samples are optionally sent (1106) to the profiling server 430 or the analytics server 440 periodically, according to a predefined schedule or in response to a query (e.g., in a game analysis request).

In some implementations, the analytics server 440 enables the game profiling and analysis application 736 to visualize (1108) a subset of the collected data samples on the GUIs 1000. The administrator or game developer identifies (1110)

the anomalous profile event from the visualized subset of the data samples, e.g., the peak 1064 of the average latency in FIG. 10C. Alternatively, in some implementations, the analytics server 440 identifies (1112) an anomalous profile event (e.g., a frame drop rate larger than a threshold value of 50%) and generates (1114) an alert message indicating occurrence of the anomalous profile event. The alert message is reported to the client device and presented on the GUIs 1000 to remind the user of the client device of the anomalous profile event. Stated another way, the analytics server 440 identifies one or more abnormal game, processor, or system states based on the plurality of data samples, and associates the target profiling condition with the identified one or more game, processor, or system states. The alert message is generated to indicate the target profiling condition has occurred and is caused by the one or more game, processor, or system states.

In some circumstances, after the anomalous profile event is identified in the plurality of data samples collected in response to the game profiling instruction that enables the periodic data collection, the profiling server 430 receives (1116) a second game profiling request including a target profiling condition associated with the anomalous profile event, and generates (1118) a second game profiling instruction to collect a second plurality of data samples according to the target profiling condition. The second game profiling request is generated by the game profiling and analysis application 736 when user inputs are received on the GUIs 1000 defining the targeted profiling condition and the subset of game instances of the gaming title. In some implementations, the target profiling condition includes one or more of a frame drop, a register overflow, a drop of a frame rate, an increase in a game latency, an increase in power consumption of a processor, an increase in a memory occupancy rate, and a change of utilization rate of a processor.

In some implementations, the second game profiling instruction is received by the local profiling orchestrator module 630 of the game servers 118, and sent to the collection module 632 for collecting a second plurality of data samples for each of the subset of the game instances in accordance with the targeted profiling condition. In response to the second game profiling instruction, the collection module 632 of the game servers 118 collects the second plurality of data samples for each of the subset of the game instances according to the targeted profiling condition, and returns (1120) the collected data samples to the profiling server 430 or the analytics server 440 periodically, according to a schedule or in response to a query. Specifically, while the game servers 118 are executing the plurality of game instances, the local orchestrator module of the game servers 118 automatically detects the target profiling condition occurs to a first game instance, and sends a command to the collection module 632 to collect the plurality of data samples in association with the target profiling condition. The collection module 632 of the game servers 118 collects the second plurality of data samples corresponding to the detected target profiling condition. Each of the second plurality of data samples includes at least game state data and system performance data associated with the one or more synchronous gaming sessions corresponding to each of the subset of the game instances.

FIG. 12 is an example trace 1200 recorded for a game instance in accordance with some implementations. In some implementations, while the game servers 118 execute the plurality of game instances for the gaming title in parallel, the game servers 118 creates a trace of gaming events for each of the plurality of game instances. The trace of gaming events 1200 includes a sequence of ordered gaming events occurring to the one or more synchronous gaming sessions corresponding to the respective game instance. The trace 1200 is configured to include a plurality of timestamps each of which indicating an instant of time at which game state data and system performance data are recorded. In this example, the trace 1200 records two data samples, three data samples and four data samples for three consecutive game events including the first game event (Game Event 1), the second game event (Game Event 2) and the third game event (Game Event 3), respectively. Examples of the game events includes a user action (e.g., a jump by a game player), a change of game settings (e.g., a costume change of a game player), and a change of a shader program used to render image frames of the online gaming sessions of the game instance.

More specifically, a first data sample 1202 corresponding to Game Event 1 includes game state data (Game State 1 and Game State 2) recorded for two of the one or more synchronous online gaming sessions of the corresponding game instance at an instant corresponding to a first instant $t_1$ (Timestamp 1). This game instance may include other online gaming sessions in addition to the two online gaming sessions corresponding to Game States 1 and 2. For brevity, game state data of the other online gaming sessions of this game instance are not included in FIG. 12. Also, the first data sample 1202 corresponding to Game Event 1 includes two system performance data (System Performance 1 and System Performance 2) recorded for two of a plurality of system characteristics at the first instant $t_1$. This game instance may include other system performance data in addition to System Performances 1 and 2. For brevity, the other system performance data of this game instance are not included in FIG. 12. In some implementations, the first data sample 1202 is recorded when the first game event is triggered or initiated.

Further, in some implementations, the game servers 118 receives a game profiling instruction corresponding to a plurality of target profiling conditions (e.g., those corresponding to Tags 1, 2 and 3) from the profiling server 430. The game profiling instruction includes a profiling metadata call configured to add tags (e.g., Tags 1, 2 and 3) indicating the plurality of target profiling conditions in the trace 1200 of game events when the trace 1200 of game events is recorded at the time of executing the game instance. Examples of the plurality of target profiling conditions include, but are not limited to, an occurrence of an L block (Tag 1), an occurrence of a T block, a GPU idle state (Tag 2) and a frame drop (Tag 3). Optionally, a target profiling condition is consistent with a game event. Optionally, a target profiling condition is associated with a value of one of the game state data and the system performance data recorded for the corresponding gaming instant. In response to the predefined profiling metadata call, a subset of the plurality of data samples in the trace 1200 is recorded and tagged when the plurality of target profiling conditions occur during execution of the game instance. For example, referring to FIG. 12, data samples 1202, 1204 and 1206 are tagged with Tag 1, Tag 2 and Tag 3 to indicate that they are associated with three different predefined target profiling conditions.

Subsequently, in response to a query (e.g., in a game analysis request), the game servers 118 identifies in the trace a subset of the recorded data samples (e.g., data sample 1206) corresponding to the subset of the target profiling conditions based on one or more corresponding tags (e.g., Tag 3), and provides the subset of data samples to the profiling server 430 or analysis server 440. In some implementations, in response to the query, a single data sample (e.g., data sample 1206) corresponding to each tag indicating a respective one of the subset of the target profiling conditions is provided to the profiling server 430 or analysis server 440. Further, in some implementations, in response to the query, a single data sample (e.g., data sample 1206) corresponding to each tag indicating a respective one of the subset of the target profiling conditions is provided to the profiling server 430 or analysis server 440 with a predefined first number of data samples preceding to the respective tag (e.g., data sample 1208) and/or a predefined second number of data samples following the respective tag (e.g., data sample 1210).

As explained above, in some implementations, the game state and system performance data include a plurality of hardware properties of the game server, a game version of the gaming title, and a kernel/driver version running on the game server. Specifically, the game state data corresponding to an online gaming session includes game context data, e.g., a game level, a weapon type, a costume of a game roll and a number of objects in a corresponding game scene (e.g., a number of leaves on a tree), and is optionally stored as metadata of the online gaming session. The game state data optionally includes one or more of game settings, e.g., a sliding window frame rate and a frame resolution. Further, for each game instance, the system performance data includes performance data of a CPU 404, a GPU 406, a memory (e.g., a cache or register), an operating system, one or more input/output ports and/or a data bus, which are assigned to execute each of the one or more gaming sessions of the respective game instance. The performance data of the CPU 404 or GPU 406 includes a processor utilization rate and power consumption at a time corresponding to each of the plurality of data samples. In some implementations, the system performance data is stored in at least one of CPU performance counters, GPU performance counters, a stack trace, and architectural counters. In some implementations, the system performance data further includes performance information concerning a PCI express switch. The CPU performance counters includes a set of special-purpose registers built into the CPUs 404 to store counts of hardware-related activities within the CPUs 404. The GPU performance counters includes a set of special-purpose registers built into the GPUs 406 to store counts of hardware-related activities within the GPUs 406. The CPU or GPU performance counters record processor utilization rate (e.g., 10% usage) and power consumption. The stack trace includes a report of active stack frames at an instant of time during the execution of the game instance.

In an example, game metadata is interleaved with CPU counters according to a timeline. The analytics server 440 determines that a number of CPU is idle when a T block come based on the game metadata and CPU counters, and therefore, infers that the CPUs are underload when a scene includes T or L blocks. Thus, the GPUs cannot keep up with the CPUs, and additional processing power is needed from the GPUs. In another example, the analytics server 440 determines that a high-speed serial computer expansion bus (e.g., a bus complying with a peripheral component interconnect (PCI) express) functions properly while a memory block coupled to the bus has an issue (e.g., a register overflow).

Figure 13:
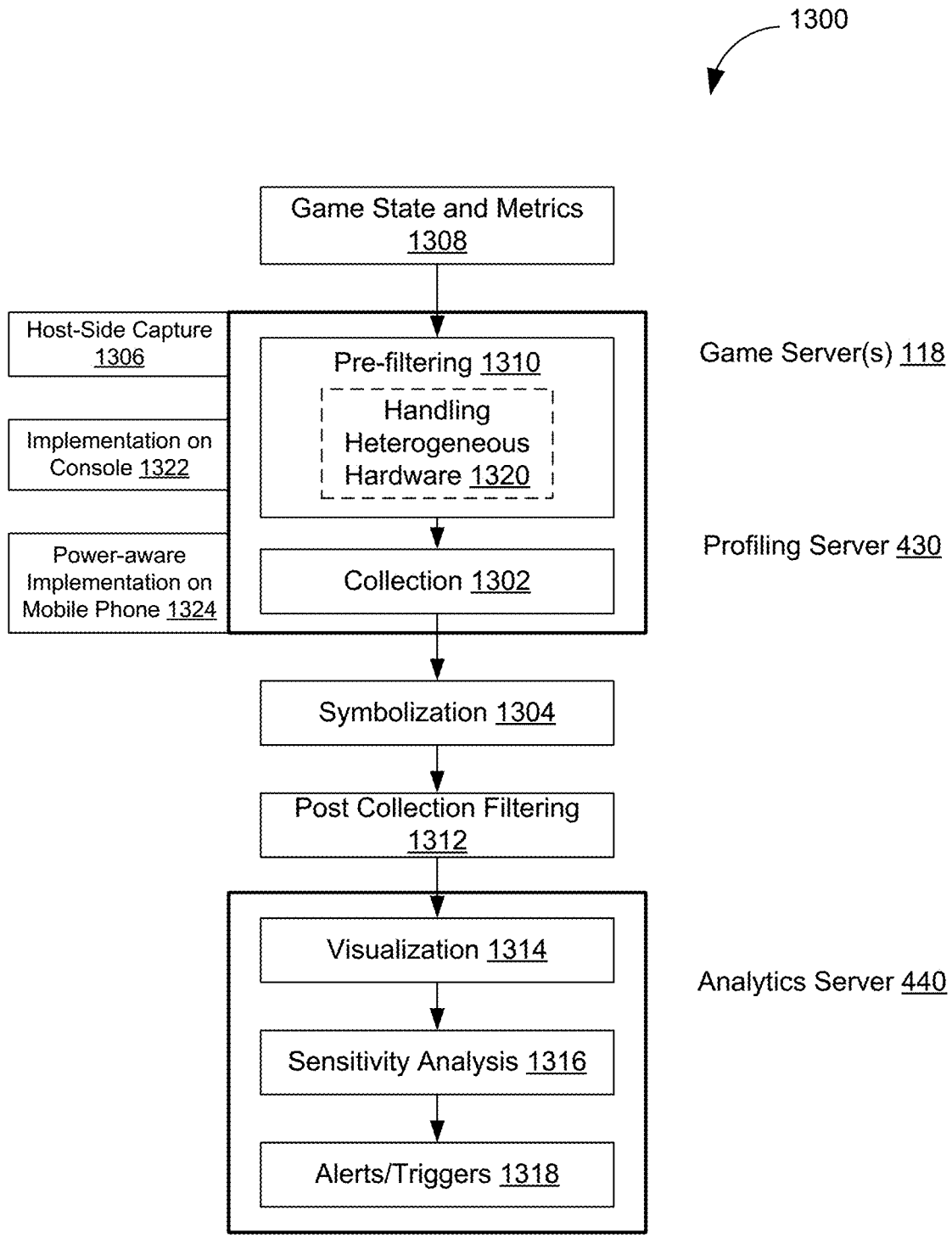
FIG. 13 is a flow diagram illustrating an example method for profiling and analyzing a gaming title at a distributed real-time game profiling system in accordance with some implementations.
Figure 14A:
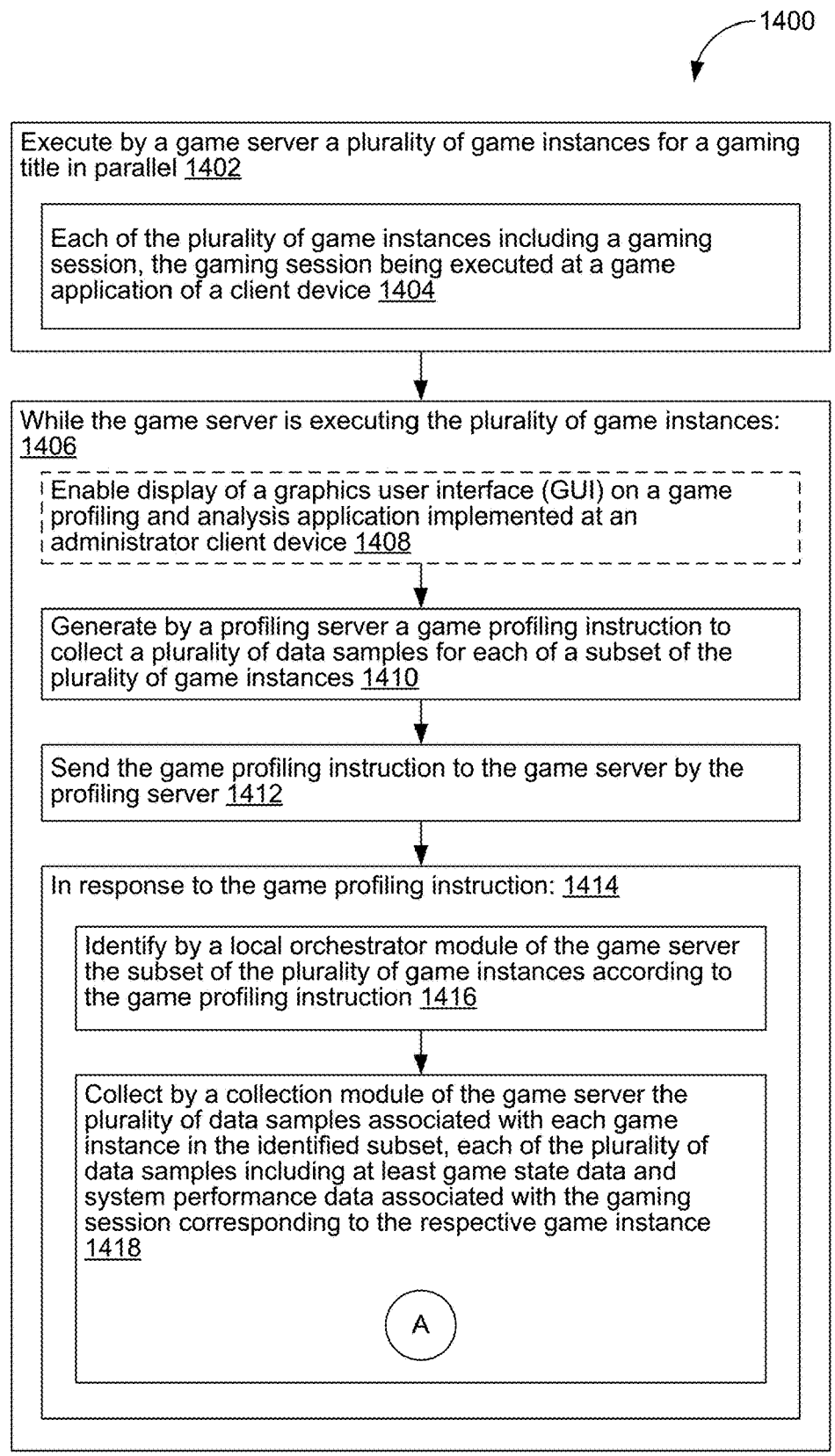
Figure 14B:
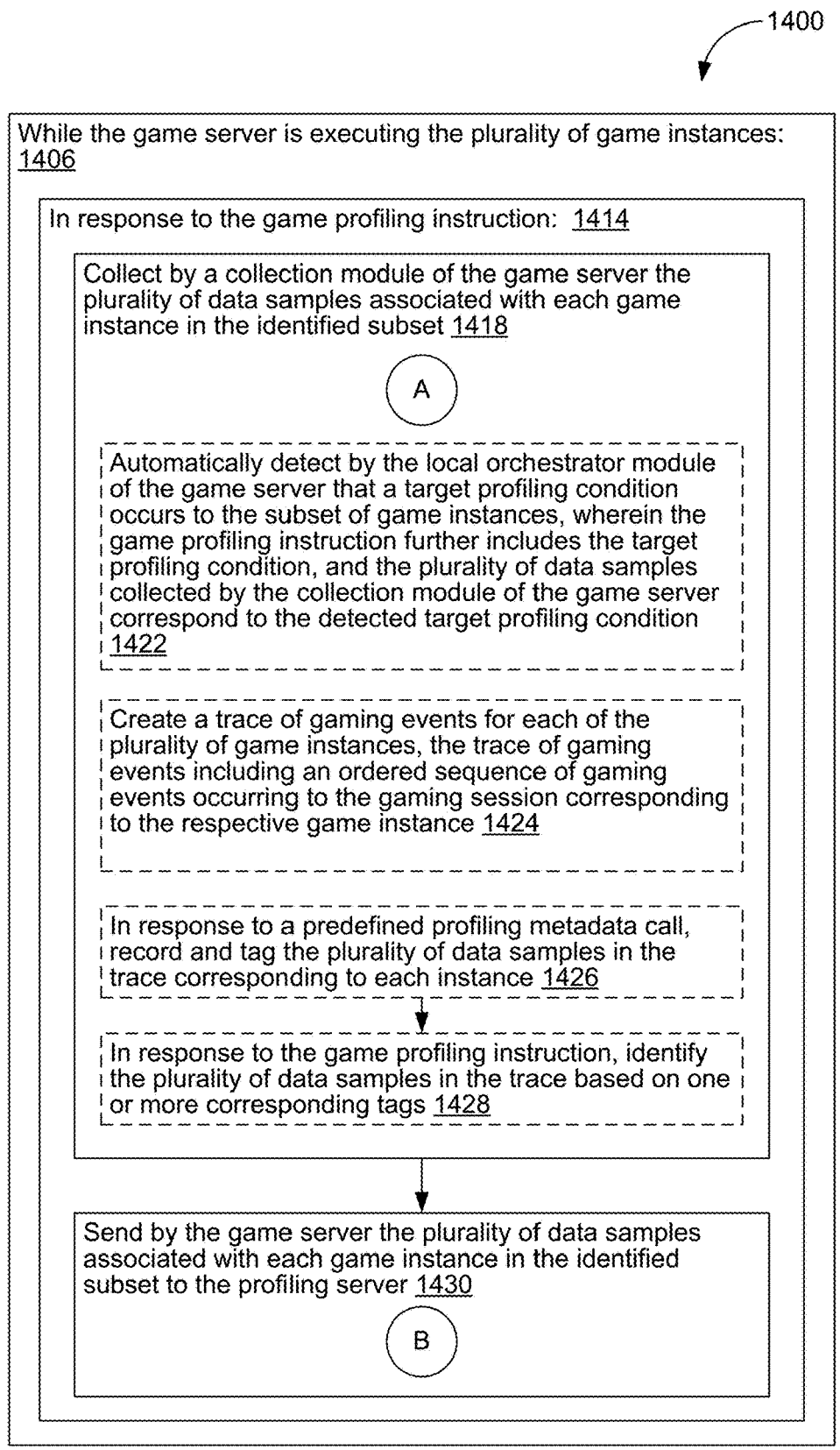
Figure 14C:
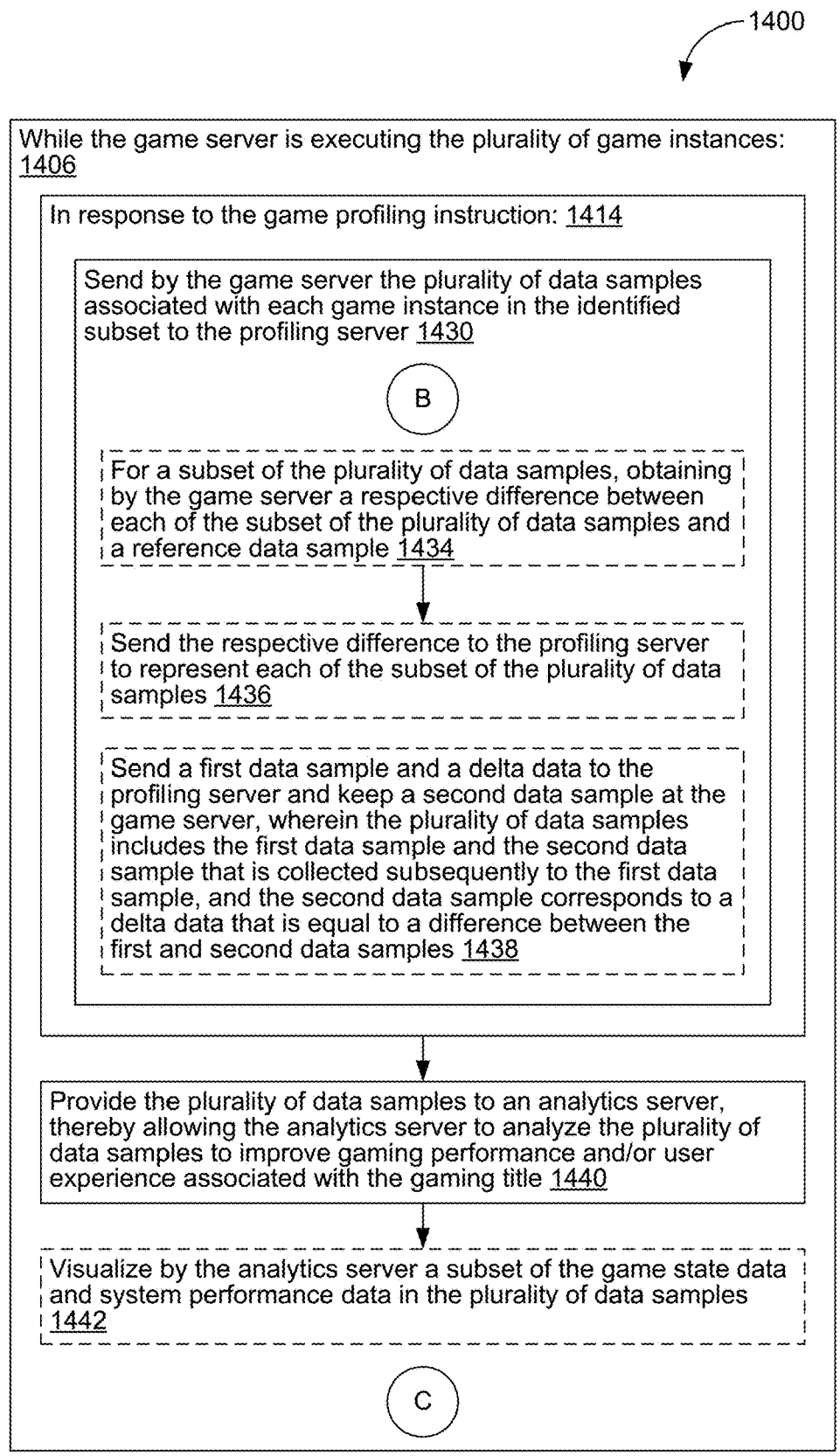
Figure 14D:
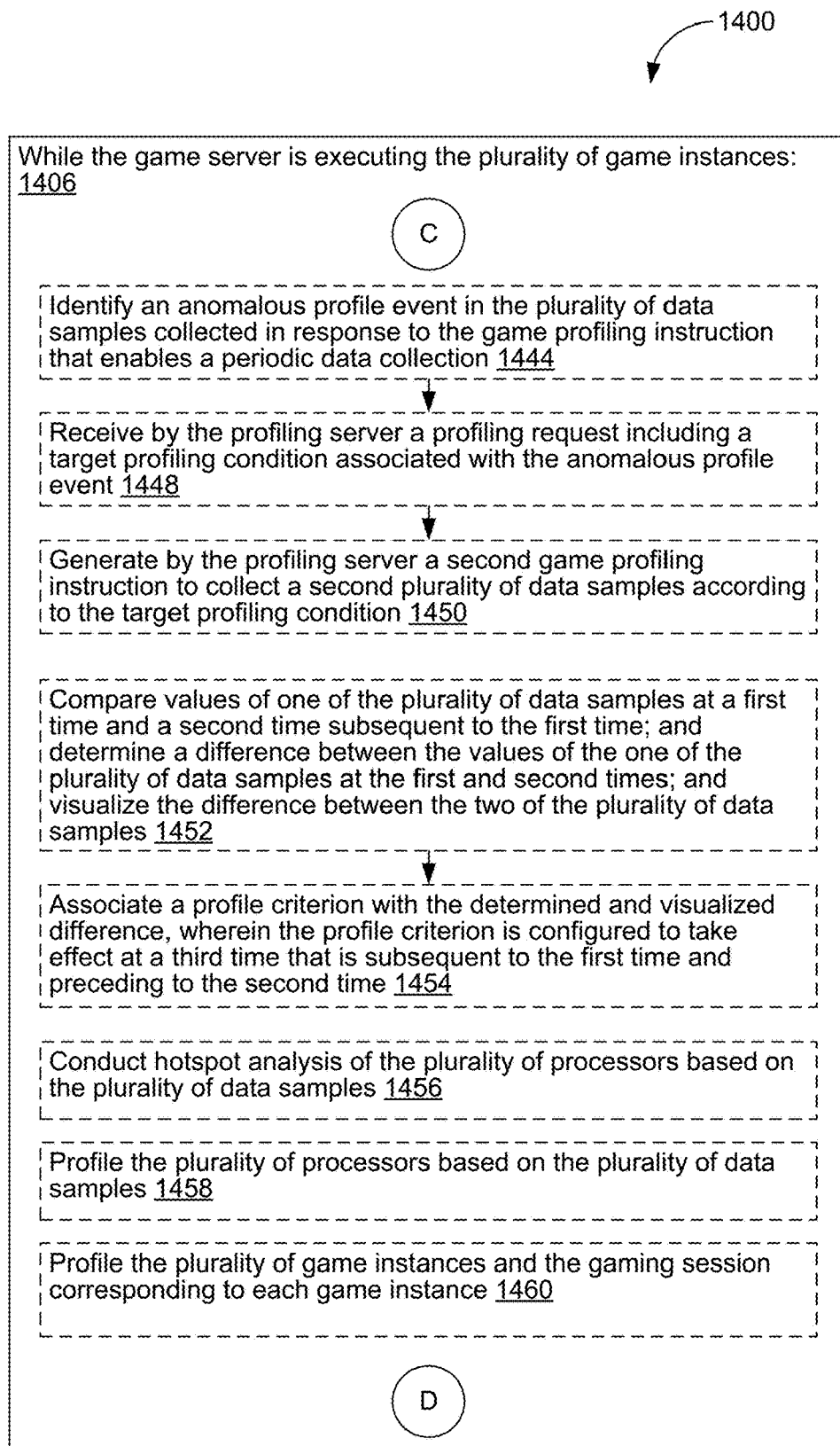

FIG. 13 is a flow diagram illustrating an example method 1300 for profiling and analyzing a gaming title at a distributed real-time game profiling system in accordance with some implementations. In some implementations, a distributed real-time game profiling system includes a cloud collection orchestrator located at a profiling server 430, and a local collection daemon located at one or more game servers 118. The cloud collection orchestrator tells (1302) the local collection daemon running on each cloud-based game instance whether and/or when to collect data related to the respective game instance. The cloud collection orchestrator asks for collection of data samples on a subset of or all cloud-based game instances of a running gaming title (e.g., Tetris and Super Mario). Each data sample collected by the local daemon is a snapshot of state of a corresponding game instance at a corresponding moment. The snapshot includes CPU state (e.g., program counter; stack trace and architectural counters), system state (e.g., PCI express switch data), and GPU state variables. A frequency of sampling for capturing the data samples depends on a tolerance (e.g. whether sample capturing causes any momentary frame stutter) and the amount of data to collect. These data samples are then streamed (possibly batched first) to a collection server/backend (e.g., the profiling server). In some implementations, the collected data samples are also tagged with information about the corresponding game instance (e.g. hardware properties, game version, kernel/driver version). The collected data samples can then be queried and merged across one or more game instances to constitute a program profile.

Symbol data is applied to convert (1304) the captured program counter and stack traces into human-readable data. In some implementations, data samples are captured on a guest side, and the captured data samples is stored and symbolized on the guest side. Alternatively, in some implementations, data samples are captured (1306) and available on the host side, for example, at an operating system of a host (e.g., a server system) in a virtualized system, allowing runtime spent on the host to be inspected. Memory addresses on the host side are converted back to addresses on the guest side in order to determine where a program counter is for a given data sample.

While the game instance is being executed, the server system stores (1308) metadata of interest (e.g. a game level, a weapon type, a costume worn by a character) in a location in-memory that is captured as part of a sample event. The server system uses the same mechanism (or a data-tuned implementation) to store engine-level metrics (e.g., a sliding window frame rate, an instantaneous frame time, a number of objects in a scene, a number of leaves on trees). In some situations, upon sampling, a callback is triggered to fetch relevant key value pairs. Optionally, a callback state is captured alongside the CPU, GPU and System data at each data sample. Optionally, the callback state is captured at a slower sample rate if a corresponding sampling rate is very high and data changes slowly. In some implementations, game state or game metrics are captured without corresponding hardware-related data samples (e.g., CPU performance data) to monitor overall game health in the fleet. A game developer can subsequently increase hardware performance sampling across the game instances for specific game-states to zoom in on a target problem area if detected.

In some implementations, the collection orchestrator daemon of the game server supports (1310) filters the captured data samples in accordance with (a) which game instances are of interest and (b) which game state is of interest. Such pre-collection filtering avoids collecting data samples from uninteresting game instances, and reduces costs for data collection and processing. Optionally, a game state filter prevents the collection orchestrator daemon from capturing an undesirable sample. Optionally, the undesirable sample is captured, e.g., to minimize impact on run-time of the game, and, discarded prior to being transmitted to the profiling server. For example, a game developer learns chatter on a web forum concerning problems on Level 27 of Version 1.2 of a gaming title, and decides to increase a data collection rate of the game instances executed on Level 27 of Version 1.2 of the gaming title for the purposes of obtaining a fine-grained resolution on the CPU profiles.

In some implementations, post-collection filtering is applied (1312) after the collected data samples are obtained by the profiling server and/or the analytics server. The collected data samples are optionally combined based on a number of variables. A user may explore the collected data samples and determine trends. For example, in accordance with filtering on game state and game metrics, the collected data samples are zoomed into one or more subsets of the data samples to facilitate resulting hotspot analysis and CPU profiling.

In some implementations, a subset of collected data samples are visualized (1314). The subset of collected data samples is identified based on one or more sample criteria. Differences among the subset of collected data samples are visualized in real-time. A game profiling application presents a GUI on a game administrator's client device 104, and the GUI visualizes the difference between two program profiles captured at different times. The two program profiles are optionally associated with slightly different shader compilations or game versions, which requires best-effort matching between the run-time program profiles. The two program profiles are optionally associated with two different profile criteria, and for example, the two program profiles compare hotspot analysis between Level 27 and all Levels to see what aspect of run-time has increased.

In some implementations, sensitivity analysis is implemented (1316) on the collected data samples by a visualization tool or ingestion pipeline. In an example, variables are analyzed to automatically flag which game-state conditions correlate most with degradation of a frame rate. In another example, game-state variables are analyzed and/or visualized to identify one of the game-state variables has the greatest impact on a given function.

In some implementations, alerts and triggers are generated (1318) based on the collected data samples. A game publisher or developer sets alerts for one or more anomalous profile events, thereby allowing the game publisher or developer to proactively identify client-side glitches in the game similar to what they often monitor on the server system (e.g., in multiplayer games). Alerts for one or more anomalous profile events allows the game publisher or developer to attach a trace-based profiler to a game instance of interest and/or trigger more complete logging/streaming of data from one or more of the participating game instances.

In some implementations, the collected data samples are used to handle (1320) heterogeneous hardware. In an example, a set of Android phones are coupled to game servers with differing hardware A pre-filter is optionally used to target a set of equivalent devices. A post-collection filter is optionally executed to scale/adjust the collected data samples according to hardware settings.

In some implementations, sample-based profiling is executed on consoles of the game servers (1322). The collected samples are stored locally in a memory of the game servers, filtered locally based on criteria sent from the cloud collection orchestrator, de-duped/compressed, and then sent/bundled when a corresponding network is quiescent or the corresponding game instance is finished. Optionally, the amount of data that could be collected is reduced.

In some implementations, data sample collection is adjusted (1324) according to a power level of a client device, e.g., to minimize impact on gameplay on the client device. For example, data samples are collected for a gaming session of a game instance in accordance with a determination that a battery level of a mobile device is beyond 50% or that the mobile device is plugged onto a power supply.

In summary, sampled data collection of both game state data and system performance data enables powerful analysis of resulting data samples. Such sample-based profiling and analysis is implemented not only during a game development phase, but also in real time while the corresponding game instance is being executed. A game developer can therefore readily determine how world-state, player-state, and new additions/changes to the corresponding game instance impact performance and experience of game players.

FIGS. 14A-14E are a flow diagram illustrating another example method 1400 for profiling and analyzing a gaming title at a distributed real-time game profiling system in accordance with some implementations. Method 1400 is, optionally, governed by instructions that are stored in a non-transitory computer readable storage medium and that are executed by one or more processors of a distributed real-time game profiling system. Each of the operations shown in FIGS. 14A-14E may correspond to instructions stored in a computer memory or non-transitory computer readable storage medium (e.g., memory 606 of a server system 114 in FIG. 6A). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1100 may be combined and/or the order of some operations may be changed.

In the distributed real-time game profiling system, a game server 118 executes (1402) a plurality of game instances for a gaming title in parallel (e.g., by game application 628 in FIG. 6A). Each of the plurality of game instances includes (1404) one or more synchronous gaming sessions, and each of the one or more gaming sessions is executed at a game application of a client device.

In some implementations, while the game server 118 is executing (1406) the plurality of game instances, a profiling server 430 enables (1408) display of a GUI on a game profiling and analysis application 736 implemented at a client device 104 of an administrator or a game developer. The GUI is configured to receive from a user a game profiling request, send the game profiling request to the profiling server 430, receive analysis results from the analytics server 440, and present the results on the GUI of the client device 104 of the administrator or game developer.

The profiling server 430 generates (1410) a game profiling instruction to collect a plurality of data samples for each of a subset of the plurality of game instances. The profiling server 430 is coupled to the game server 118 over one or more wireless communication networks. The profiling server 430 sends (1412) the game profiling instruction to the game server 118. Optionally, the game profiling instruction includes a data type of the plurality of data samples to be collected. Optionally, the game profiling instruction defines one or more of a data collection schedule, a target profiling condition and a time window. In an example, the game profiling instruction is generated to collect data samples related to a frame drop for the next hour or to collect data samples periodically at a sampling frequency. Optionally, the game profiling instruction selects the subset of the plurality of game instances randomly, according to an instance pitch, or according to one or more instance characteristics.

In response to the game profiling instruction (1414), a local orchestrator module of the game server 118 identifies (1416) the subset of the plurality of game instances according to the game profiling instruction, and a collection module 632 of the game server 118 collects (1418) the plurality of data samples associated with each game instance in the identified subset of the plurality of game instances. Each of the plurality of data samples includes at least game state data and system performance data associated with the one or more synchronous gaming sessions corresponding to the respective game instance. In some implementations, the game profiling instruction further includes a target profiling condition (e.g., a frame drop, a drop of a frame rate, an increase in a game latency, an increase in power consumption of a processor, an increase in a memory occupancy rate, and a change of utilization rate of a processor). In some situations, the profiling server 430 receives a user input defining the target profiling condition. While the game server 118 is executing (1414) the plurality of game instances, the local orchestrator module 630 of the game server 118 automatically detects (1422) that the target profiling condition occurs to the subset of game instances. The plurality of data samples collected by the collection module 632 of the game server 118 correspond to the detected target profiling condition.

In some implementations, while the game server 118 is executing (1414) the plurality of game instances, the game server 118 creates (1424) a trace of gaming events for each of the plurality of game instances, and the trace of gaming events includes an ordered sequence of gaming events occurring to the one or more synchronous gaming sessions corresponding to the respective game instance. Further, in some implementations, the game profiling request includes a predefined profiling metadata call, and in response to the predefined profiling metadata call, the game server 118 records and tags (1426) the plurality of data samples in the trace corresponding to each instance. Then, in response to a query, the game server 118 identifies (1428) a subset of the plurality of data samples in the trace based on one or more corresponding tags. More details on recording and tagging a trace are discussed above with reference to FIG. 12.

After collecting the plurality of data samples, the game server 118 sends (1430) the plurality of data samples associated with each game instance in the identified subset of game instances to the profiling server 320. In some implementations, for a subset of the plurality of data samples, the game server 118 obtains (1434) a respective difference between each of the subset of the plurality of data samples and a reference data sample, and sends (1436) the respective difference to the profiling server 430 to represent each of the subset of the plurality of data samples. Optionally, the plurality of data samples include the reference data sample, and the reference data sample is sent to the profiling server 320, such that an analytics server may recover each of the subset of the plurality of data samples by combining the respective difference and the reference data sample. Alternatively, in some implementations, the plurality of data samples includes a first data sample and a second data sample that is collected subsequently to the first data sample, and the second data sample corresponds (1438) to a delta data that is equal to a difference between the first and second data samples. The first data sample and the delta data are sent to the profiling server 430 while the second data sample is kept at the game server 118.

In some implementations, the collected plurality of data samples are tagged with additional information that is not included in the system performance data, e.g., game version, operating system version. These data samples can be queried and merged across one or more game instances, and constitute a game profile. That said, in some situations, the profiling server 430 is configured to create a game file based on the plurality of data samples collected for each game instance in the identified subset of plurality of game instances.

The profiling server 430 provides (1440) the plurality of data samples to an analytics server 440, thereby allowing the analytics server to analyze the plurality of data samples to improve gaming performance and/or user experience associated with the gaming title. Optionally, the analytics server 440 is located remotely from the game server 118 and the profiling server 430. Optionally, the analytics server 440 is configured to operate offline. In some implementations, the analytics server 440 visualizes (1442) a subset of the game state data and system performance data in the plurality of data samples.

In some implementations, the game profiling instruction enables a periodic data sample collection. The analytics server 440 identifies (1444) an anomalous profile event in the plurality of data samples collected in response to the game profiling instruction that enables the periodic data collection. The profiling server 430 receives (1448) an updated profiling request including a target profiling condition associated with the anomalous profile event, and generates (1450) a second game profiling instruction to collect a second plurality of data samples according to the target profiling condition. Specifically, in some implementations, the analytics server 440 enables display of the plurality of data samples on a GUI of a game profiling and analysis application implemented at a client device 104 of an administrator or game developer. The analytics server 440 receives from the GUI a user input identifying an anomalous profile event in the subset of the plurality of game instances. Alternatively, in some implementations, the analytics server 440 automatically identifies the anomalous profile event.

In some implementations, the analytics server 440 compares (1452) values of one of the plurality of data samples at a first time and a second time subsequent to the first time, determines a difference between the values of the one of the plurality of data samples at the first and second times, and visualizes the difference between the two of the plurality of data samples. Further, in some situations, the game profiling instruction includes a profile criterion configured to take effect at a third time that is subsequent to the first time and preceding to the second time, and the profile criterion (1454) is then associated with the determined and visualized difference. An example of the profile criterion includes a change of type, compilation, or version of a shader program used to render the one or more synchronous gaming sessions corresponding to the respective game instance.

In some implementations, the game server 118 includes a plurality of processors. Generally, the analytics server 440 is configured to implement at least one operation of conducting (1456) hotspot analysis of the plurality of processors based on the plurality of data samples, profiling (1458) the plurality of processors based on the plurality of data samples, and profiling (1460) the plurality of game instances and the one or more synchronous gaming sessions corresponding to each game instance.

In some implementations, the analytics server 440 compares (1462) two of the plurality of data samples corresponding to a first time and a second time subsequent to the first time, and identifies an anomalous profile event in accordance with a comparison result. An alert message is generated to indicate an occurrence of the anomalous profile event. Further, in some implementations, the analytics server 440 identifies (1464) a frame drop rate increase based on the game state data of the two of the plurality of data samples, and a processor error based on the system performance data of the two of the plurality of data samples. A root cause of the frame drop rate increase is associated with the processor error. Additionally, the analytics server 440 identities (1466) an increase of a frame drop rate and a game action rate of a specific game action based on the game state data of the two of the plurality of data samples, and associates the increase of the frame drop rate with the specific game action. For example, the gaming title includes a Tetris game. The analytics server 440 determines (1468) that the increase of the frame drop rate is caused by L blocks in the Tetris game based on the plurality of data samples.

In some implementations, the plurality of data samples are collected in response to a game profiling instruction including a target profiling condition. The analytics server 440 determines that one or more game, processor or operating system states are abnormal based on the plurality of data samples, and associates the target profiling condition with the determined one or more game, processor or operating system states. The analytics server 440 generates an alert message indicating the target profiling condition has occurred and is caused by the one or more game, processor or operating system states.

In some implementations of this application, the distributed real-time game profiling system includes a plurality of servers having distinct response times, and the plurality of servers are assigned to game management, profiling orchestration and data analysis based on the distinct response times. The game server 118 corresponds to a first game latency, and the profiling server 430 is configured to respond to the game profiling instruction with a profiling latency that is larger than the first game latency. The analytics server 440 is configured to respond to a game analysis request with an analysis latency that is larger than the profiling latency. A majority of computational, storage and communication resources of the game server 118 can be conserved for latency-sensitive game rendering, thereby providing desirable user experience with substantially low game latencies to multiple remote game players.

The distributed real-time game profiling system dedicates the profiling server 430 and the analytics server 440 to game profiling and analysis in real time while one or more corresponding gaming titles are being executed by the game server 118. Once a defect is identified in a hardware unit (e.g., a CPU or GPU) or in a software program (e.g., an OS program or a shader program), the hardware unit can be reassigned, and the software program can be debugged in real time without interrupting the execution of the gaming titles. In addition, the profiling server 430 and the analytics server 440 provide a unified solution (e.g., a unified game profiling and analysis GUI) to profile and analyze performance of different gaming titles, thereby allowing game profiling and analysis to be implemented efficiently without being limited to different gaming titles.

It should be understood that the particular order in which the operations in FIGS. 14A-14E have been described are merely exemplary and are not intended to indicate that the described order is the only order in which the operations could be performed. One of ordinary skill in the art would recognize various ways to collect data from game servers 118 as described herein. Additionally, it should be noted that details of other processes described herein with respect to method 1300 (e.g., FIG. 13) are also applicable in an analogous manner to method 1400 described above with respect to FIGS. 14A-4E. For brevity, these details are not repeated here.

Gaming API Platform Supporting Third-Party Content

Implementations described in this specification are directed to providing a gaming application programming interface (API) and cloud platform to enable efficient, portable, low latency hosting of third party gaming content. Some implementations dynamically allocate cloud gaming hardware resources and monitor and utilize network bandwidth available to individual end users to provide an optimal cloud gaming experience. Some implementations provide multiple performance tiers, including a tier that supports high performance, real time gaming sessions with high definition video/media output/end user streams (e.g., gameplay streams 130 and spectator review streams 132). Some implementations support different subscription models and/or are configured to provide one or more concurrent real time gameplay and/or instructional media streams that correspond with little or no latency to one or more actual gaming streams (e.g., a video stream output to a client device 102 of a user participating in an online/cloud gaming session via either a mobile app or a browser-based program). In some implementations, concurrent gameplay and/or instructional videos are provided with little or no latency via a media streaming site, such as YouTube, to one or more users, in particular, using a multi-stream generation module 662.

Some implementations enable the hosting of public events in conjunction with gaming competitions. For example, in conjunction with a multi-player gaming event or competition based on a hosted game, in some implementations a cloud gaming site can broadcast or stream to specific spectators: (a) one or more concurrent ancillary or supplemental media streams, including associated commentary tracks/streams, (b) gaming streams from different competitor points of view, a highlights stream showing particularly compelling gaming action based on cloud server analysis and/or scoring of multiple gaming sessions associated with the gaming event, (c) one or more game point of view streams reflecting gameplay sessions of one or more active gamers, and/or (d) instructional tracks from one or more active gamers and/or commentators, possibly including real time picture-in-picture (PIP) video sent by the active gamers to the cloud gaming server system 114 along with their corresponding gameplay responses.

Some implementations provide content hosting and/or end user gameplay API's that enable developers of gaming content to focus on new gameplay features without the need to address programming related to infrastructure tuning issues, such as network and server performance optimization, that ensure an optimal gaming experience for end users. This also enables developers of gaming content to take advantage without additional programming of advances in hardware and/or network resources that are provided by the hosting organization.

Examples of third party content that can be effectively hosted in a cloud-based gaming system/environment in accordance with some implementations include, without limitation, sports games, racing games, role playing games (RPG) and first person shooter (FPS) games. Different instances of these games may have widely varying cloud hardware requirements and network (e.g., to ensure an optimal user gaming experience—consistent in some instances with different subscription performance tiers) based on different associated latency requirements and expectations, output video resolution, and gaming server computational workload and video encoding/streaming resources, and network bandwidth.

Some implementations provide account management APIs and/or software modules that monitor gameplay activity and related requests of subscribers (e.g., requests by end users to invite other players to participate in a gaming session, upgrade their in-game tools, and/or gaming performance) and transmit or make available by APIs associated information to the third party content provider to enable the content provider to track settings (including but not limited to billing information, in-game credits, subscription level, etc.) of their subscribers and/or followers. In some implementations, a content provider of hosted content can provide via the same hosting platform one or more different subscription models for the hosted content. In some implementations, a user (e.g., a subscriber to a gaming service) is granted unlimited access and gameplay to all games offered by the content provider on the hosting platform. In some implementations, a user (e.g., a subscriber to a gaming service) is granted unlimited access and gameplay to one or more specific gaming franchises (e.g., a specific football or first person shooter franchise) offered by the content provider on the hosting platform. In some implementations, the subscriptions are for limited participation by a user—where the participation can be limited based on gameplay time, level of hardware resources committed to the end user, or end user device type/location. The account APIs and modules provided in some implementations configure and monitor gameplay sessions, and enable the content providers to track, gaming activity of respective subscribers in accordance with their most current subscription information—even during active gameplay.

The gaming API platform includes cloud features that allow a user to move around, e.g., suspending a first game stream of a first gaming session executed on a first client device 102, and restarting the first game stream on a second gaming session of a second client device 102 to continue the first game session. The gaming API platform also supports multiple players on a massive scale, and provides richer more persistent cloud-based worlds. The gaming API platform uses a cloud-based system to store information related to different gaming sessions of the same user, or different gaming sessions of different users.

The gaming API platform renders gaming content on a plurality of client devices 102, including but not limited to, mobile phones, tablet computers, desktop computers, and televisions. Optionally, the gaming content is dynamically adjusted to comply with the specifications of these client devices 102. In some implementations, the client devices 102 have a limited or no storage capability.

In addition to gaming content, the gaming API platform also streams to the client devices add-on content, e.g., new league rosters, statistics, and preview access to early titles, which is optionally updated regularly (e.g., readily updated, upgraded every day or every hour). In some implementations, the add-on content includes search result of an Internet search or a database search.

In some implementations, the gaming API platform includes a live online community. Users (e.g., subscribers of a service) participate in live events, tournaments or activities on the gaming API platform throughout the day. Examples of the live events, tournaments or activities include spectating live gaming sessions played by other users, posting your accomplishments to a public domain (e.g., YouTube), and getting live tips and coaching videos. For example, in response to a user action, the gaming API platform provides two or more live streams. While keeping a first gaming stream on a first gaming session of the first client device for a game player, the gaming API platform also broadcasts a second live YouTube stream to one or more other client devices 102 (e.g., of subscribers). The second live stream allows the user to share gaming experience with audience. Optionally, the second live stream is a reproduction of a screen of the first client device of the player. The gaming API platform may capture an audio stream with the player explaining the first gaming session, or a video stream of the player playing and explaining the first gaming session. The audio stream is optionally played for the audience while the second live YouTube stream is played for the audience. The video stream is optionally played in an embedded window in the second live YouTube stream.

In some implementations, a method is implemented at a server system 114 for providing media streams (e.g., a first gaming stream and a second live YouTube stream that are optionally related to an online gaming session) concurrently. Encoders of the server system 114 identifies frame data of an image frame associated with an online interactive session that optionally includes high definition media content, and generates a plurality of media streams corresponding to the online interactive session. The plurality of media streams include a low latency stream and a normal latency stream. The low latency stream has a faster "response rate" and lower transmission latency than the normal latency stream. The server identifies a predefined frame rate for encoding a sequence of image frames of the low latency stream. For each image frame in the first sequence of image frames of the low latency stream, the server determines a first time interval corresponding to the predefined frame rate, and encodes the image frame during the first time interval. After encoding the image frame, the server determines a remaining time left in the first time interval. In accordance with a determination that the remaining time left in the first time interval satisfies a normal latency requirement associated with the normal latency stream, the server generates a subset of the second sequence of image frames during the remaining time of the first time interval. Alternatively, in accordance with a determination that the remaining time left in the first time interval does not satisfy the normal latency requirement, the server aborts generating any image frame of the second sequence of image frames during the remaining time of the first time interval.

Some implementations provide true on-the-go gaming, allowing the user to take their most desired games to any location or client device. For example, a user can start a gaming session on a mobile device on his or her commute, then seamlessly resume the gaming session at his or her destination on a laptop. Also, in some implementations, based on the different client device resources available to a user as the gaming session is handed off between different devices, the gaming/hosting server 114 can dynamically deploy a different set of hardware resources to optimize the user's gaming experience based on the different end user current device resources (e.g., client hardware capability and network bandwidth).

Some implementations provide Instant access and require no or little user device storage. For example, a user can start playing in 5 seconds and save approximately 250 GB of console hard drive space.

Some implementations provide regular content drops (e.g., DLC downloadable content), roster updates, live events, tournaments and more gaming exclusives to platform provider integrated with gaming content provider.

The flexibility inherent to implementations of an API-based game hosting platform described herein also provides at least one or more of the following technical advantages and features to content developers who port their content to the platform and the content provider's associated users, potential users or fans:

In some implementations, the gaming platform is configured to add new games over time (particularly, new front-line games), thereby increasing value to content providers.

In some implementations, the gaming platform is configured to provide "Viral Trial" invitations to users in accordance with directions from a content provider. For example, gaming content provider subscribers might receive 5 invitations per month included in their subscription (monitored by the gaming platform provider and/or the content provider via the account API and/or modules). In some implementations, these invitations can provide one or more of the following technical features to recipients and/or senders of invitations and content and platform providers. Senders can send to any friend on the internet a quick link to a game session. That user (i.e., invitation recipient) can play a multiplayer game with their friend.

In some implementations, at the end of an invite-triggered gaming session, the invited user (invitee) is offered the opportunity to subscribe to either the gaming platform as a whole and/or to content offered by the content provider on the provider's gaming platform.

Depending on available hardware capacity/gaming loads and/or policies defined by the platform provider and/or content provider, trial invites could be restricted to certain time of day or specific trial events (e.g., trial events planned in conjunction with public competitions, new releases for particular franchises or games offered by the content provider, or updates to the gaming platform and associated end user gaming application).

In some implementations, the gaming platform can configure its service according to a predetermined criterion and/or a subscription. For example, for whole service users, the gaming platform offered free access to a certain game for a weekend.

In some implementations, the gaming platform provides Live events integrated with YouTube or another media streaming and/or broadcast platform. For example:

Specific live community events (e.g., a Field Goal challenge associated with a specific content provider football game franchise) programmed to coincide in time with specific events broadcast on YouTube (e.g., the Super Bowl).

In some implementations, the live events are hosted on the gaming platform and/or on an online platform provided by the content provider, and affordances are provided on user portals for those platforms/hosted events to allow view participation or to convert viewers to subscribers (i.e., to allow viewers to participate in the live event if they are subscribers or to subscribe to the gaming platform (including different subscription levels and/or content packages) and/or to hosted content offered by the content provider ((including different subscription levels and/or content packages).

Figure 15:
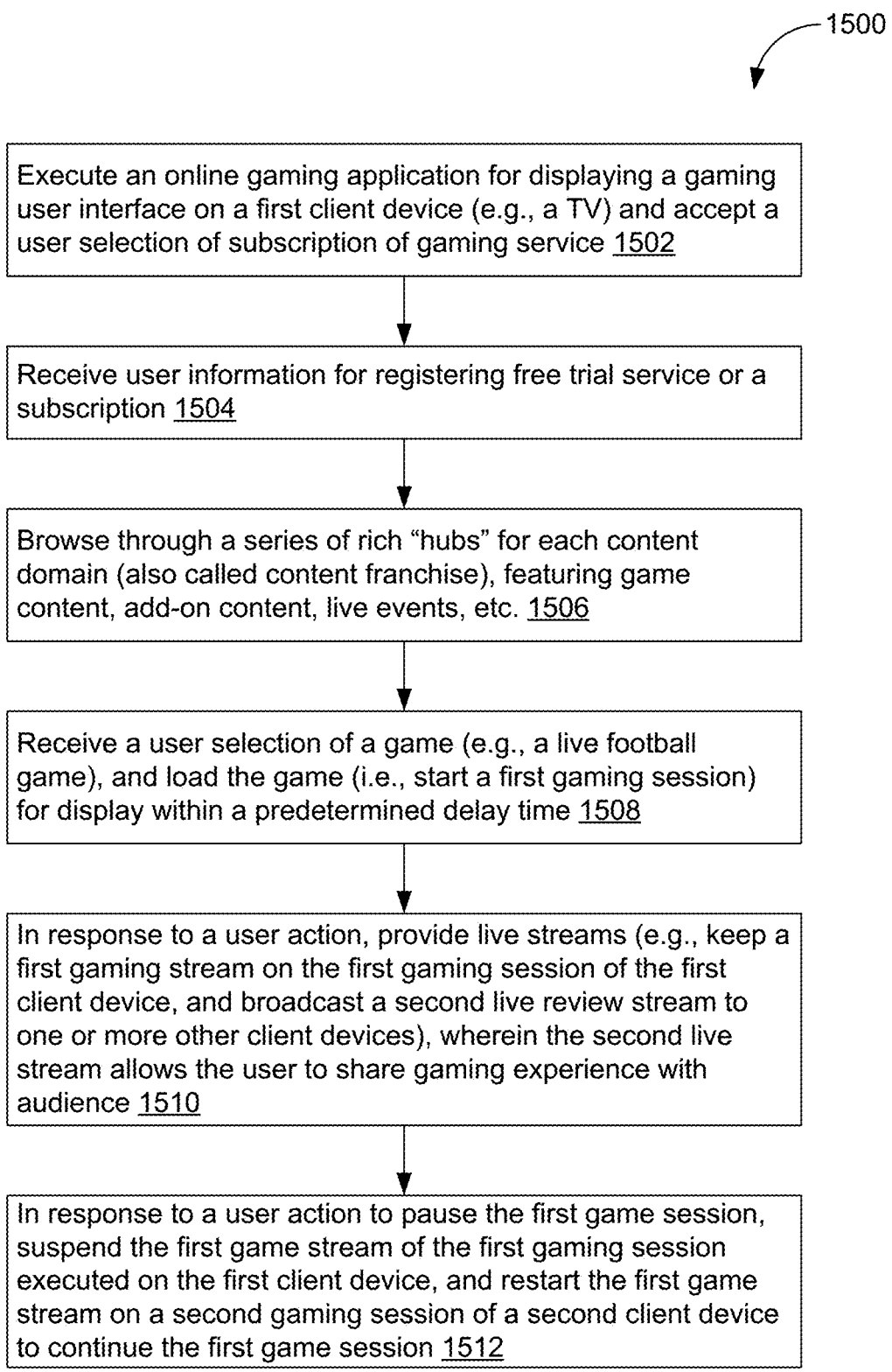
FIG. 15 is an example flow chart of a method of executing a gaming session on a gaming API platform in accordance with some implementations.

FIG. 15 is an example flow chart of a method 1500 of executing a gaming session on a gaming API platform in accordance with some implementations. As shown in FIG. 4, the gaming API platform is created by/hosted at least by an API Platform server (e.g., game servers 118) and enables the gaming session in conjunction with a gaming frontend server 402 and content servers 450. The gaming frontend server 402 is configured to provide service to a user of the gaming session, and to manage accounts for users. Optionally, the users have to subscribe to a gaming service via the gaming frontend server 402. The content servers 450 provide gaming content related to the gaming session. The API Platform server (e.g., game servers 118) executes (1502) gaming applications to enable the gaming session based on the gaming content. In some implementations, the gaming frontend server 402 and the API Platform server (e.g., game servers 118) are owned and managed by distinct entities. Specifically, an online gaming application is executed for displaying a gaming user interface on a first client or media device (e.g., a television). A user selection is received (1502) at the user interface for subscribing to gaming service. In relation to the user's request to subscribe to the gaming service, the server system 114 receives (1504) user information, thereby allowing a user of the first client device 102 to register for one of different types of services (e.g., a free trial service or a regular subscribed service) for each individual gaming title. On the user interface, the user of the client device 102 may browse (1506) through a series of rich hubs for each content domain (also called content franchise). The user interface is configured to display game content, add-on content (e.g., news, statistics) and live events (e.g., gaming broadcast from another user, live chat messages).

In some implementations, a user selection of a game (e.g., a live football game) is received (1508) at the user interface. In response to the selection, the game application 732 is loaded (1508) for the first client device 102 within a predetermined delay time, and a gaming environment is displayed for the user. Alternatively, in some implementations, in response to a user action, the server system 114 provides (1510) live streams to the user of the first client device 102. For example, the server system 114 provides a first gaming stream 130 on the first gaming session of the first client device 102, and concurrently broadcasts (1510) a second live YouTube stream 132 to one or more other client devices 102. The second live stream 132 allows the user to share gaming experience with audience. Optionally, the second live stream includes an audio feed or a video feed provided by the user of the first client device 102 while the user is playing the gaming based on the first gaming stream.

In some implementations, the user of the first client device 102 may need to use a distinct client device 102 (e.g., due to moving to a different location. In response to a user action to pause the first game session, the server system 114 suspends (1512) the first game stream of the first gaming session executed on the first client device 102, and records latest status information concerning the first gaming session. The user of the first client device 102 may restart (1512) the first game stream on a second gaming session of a second client device 102 to continue the first game session. The latest status information (e.g., stored in the game state data 508) is transferred to the second gaming session to allow seamless gaming experience for the user of the client device 102.

Referring to FIG. 15, a server system 114 includes a frontend server 402 and a gaming platform server (e.g., game servers 118) each of which may have a respective user account system. In an example, the user account system for the frontend server 402 is used to manage subscription to specific gaming content and service, and the user account system for the gaming platform (e.g., a YouTube or Google account) is used for managing gaming experience (e.g., rendering gaming content to satisfy specific gaming criteria) and many other purposes. In some implementations, these two user account systems share customer and usage data (e.g., social, friends, presence, authentication, account information, billing information). Information of the user account system is stored in user information 690 in association with one or more game applications 628 to which each user has subscribed.

In some implementations, the content servers 450 provide a service layer that sits on top of a technology layer provided by the gaming API Platform server (e.g., game servers 118). In some implementations, gaming content server(s) 450 manage additional user account systems for accessing their content. Optionally, the additional user account systems for gaming content are integrated with the user account system for the gaming frontend server 402 that manages user subscription (e.g., using a game application platform 658 in game frontend module 636).

In some implementations, the gaming platform provider maintains cloud platform, infrastructure, streaming reliability, etc. (e.g., the software modules, data structures and storage, and computing infrastructure shown on FIGS. 6A-C) and allowed the content provider to focus on gaming-related features of particular hosted gaming titles.

In some implementations, the cloud gaming platform provides APIs, data structures and modules (i.e., software modules) that support cross-play between cloud and PC versions for select gaming titles (e.g., a game that is executing on a server system 114 as shown in FIGS. 6A-6C or a client device 102 as shown in FIG. 7). A user can transition between his or her PC version of a particular gaming title offered by a content provider; or a subscriber to an online version of a title who also owns the PC version of the same title can play the PC version and concurrently interact with an online session for the same title, or an online subscriber can interact with PC players of the same title (perhaps subject to special invitation to the PC gamers if they are not already subscribers).

Technical advantages to content providers of hosting content on gaming platforms (and in some cases to providers of hosted gaming platforms) in accordance with implementations described herein include but are not limited to:
  providing content providers with an optimized, hosted gaming platform on which optimization and gaming resources and programming are managed by the platform provider;
  shifting programming tasks related to content hosting and optimization from content providers to gaming platform providers in hosted gaming platform implementations;
  enabling content providers to offer multiple multi-franchise subscriptions and multiple subscription tiers based on APIs and modules provided by the platform provider;
  enabling party studio relationships;
  enabling exclusive games to be offered;
  providing a technology/engine partnership between content providers and platform providers; and
  enabling a previously unprecedented level of live programming in association with hosted gaming services—with very little or no programming burden for the content provider.

In some implementations, the application/gaming session is associated with an online, multi-player game developed by a content provider that is hosted in a cloud gaming environment provided by a gaming platform provider as described herein. The gaming session is configured in some implementations to execute on the gaming platform and interact with end users in accordance with hosting modules and APIs provided by the gaming platform provider. In some implementations, the gaming platform and/or APIs described herein enable different hosted online games to be optimized for gameplay on different hardware and in view of different client device resources and network bandwidth with minimal programming requirements on the part of the content provider. In some implementations, the gaming user is a subscriber to gaming content offered by the content provider. As described herein, in some implementations, the gaming platform provider provides account management modules and APIs that support multiple subscription tiers. For example, in some implementations the account management modules and APIs monitor and collect gameplay statistics/information for individual users based on associated subscription information for that user, enable relevant subscriber gameplay information to be provided to the content provider, enforce (sometimes in conjunction with the content provider) subscription limits associated with individual users (e.g., limits on subscribed content, level of play, time of play, etc.). In some implementations, the gaming platform also provides social and public services related to multiplayer or individual player gaming events or competitions—for example, the gaming platform can be configured to provide (e.g., stream or broadcast) with no programming burden on content providers one or more of: real time gameplay streams, instructional streams, and/or commentary streams, in real or near-real time based on concurrent active gaming sessions. Any of the features described herein for providing cloud-based gaming services can be implemented in conjunction with content provided by content providers that is hosted on a gaming platform provided by a gaming platform provider.

In some implementations of this application, the gaming API platform created by the server system 114 enables real-time game profiling and analysis for third-party content. As explained above, the server system 114 includes a profiling sever 430 and an analytics server 440. While a game server 118 is executing a plurality of game instances for a gaming title (which is enabled using third party content provided by a third party content server 450) in parallel, the profiling server 430 generates a game profiling instruction to collect a plurality of data samples for each of a subset of the plurality of game instances, and sends the game profiling instruction to the game server 118. In response to the game profiling instruction, a local orchestrator module 630 of the game server 118 identifies the subset of the plurality of game instances according to the game profiling instruction, and a collection module 632 of the game server 118 collects the plurality of data samples associated with each game instance in the identified subset. Each of the plurality of data samples includes at least game state data and system performance data associated with the one or more synchronous gaming sessions corresponding to the respective game instance. The game server 118 sends the plurality of data samples associated with each game instance in the identified subset to the profiling server 430. The profiling server 430 provides the plurality of data samples to the analytics server 440, thereby allowing the analytics server to analyze the plurality of data samples to improve gaming performance and/or user experience associated with the gaming title supported by third party game content.

Figure 16:
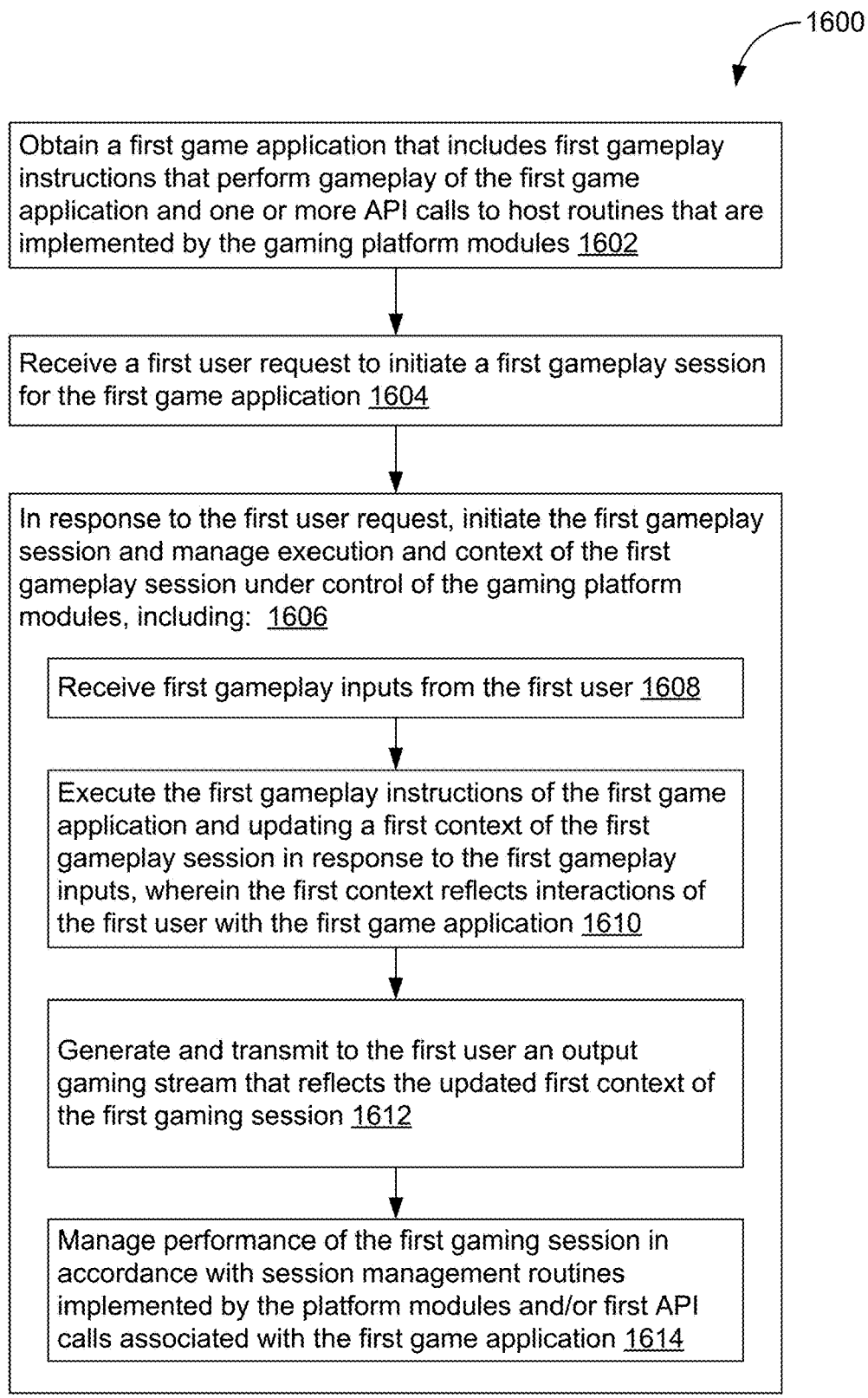
FIG. 16 is an example flow chart of another distributed method of hosting electronic games on a gaming API platform in accordance with some implementations.

FIG. 16 is an example flow chart of another distributed method 1600 of hosting electronic games on a gaming API platform in accordance with some implementations. The method 1600 is implemented at an Internet-connected game server (e.g., game server 118 in FIG. 4) including one or more processing units and memory storing programs that are executable by the game server. The programs include a plurality of game applications (e.g., 628 in FIG. 6A) and a plurality of gaming platform modules (e.g., modules 630-655 and 658 in FIG. 6A and modules 660-680 in FIG. 6B) that manage execution of the game applications. In some implementations, each of the plurality of game applications is associated with a user frontend, e.g., a third-party developer interface that is optionally enabled by a developer interface module 655. That said, the third-party developer interface is provided to a third-party game developer to develop a game application without being heavily involved in gaming implementation and resource management, because the plurality of gaming platform modules are provided by the Internet-connected game server to provide these services in the background. The game server obtains (1602) a first game application (e.g., a game application 628) that includes first gameplay instructions that are executed by the game server to perform gameplay of the first game application and one or more API calls to host routines that are implemented by the gaming platform modules 630-655 and 658-680. Specifically, in an example, the first game application is obtained from the third-party developer interface 655 associated with the third-party developer. In some implementations, the host routines include instructions that, when executed by the game server, implement one or more performance management features (e.g., GPU time sharing, multi-stream generation and parallel game encoding enabled by the modules 660, 662 and 664, respectively) of the game server transparently to the first game application. In some situations, the instructions implement the management features of the game server on behalf of the first game application.

The game server receives (1604), e.g., via the user frontend 636, a first user request to initiate a first gameplay session for the first game application, and in response to the first user request, initiates (1606) the first gameplay session and manages execution and context of the first gameplay session under control of the gaming platform modules. It is noted that "gameplay session" is also called "gaming session" in this application. In some implementations, a game application platform 658 is implemented by a game frontend module 636 for providing a user interface that consolidates accesses to multiple game applications 628 that execute different gaming titles based on different gaming content (including third party gaming content). Optionally, the first gameplay session is a multiple gameplay session, the game server can provide profile information for the first game application based on services requested by the first user. To manage execution and context of the first gameplay session, the game server receives (1608) first gameplay inputs, e.g., via the user frontend, executes (1610) the first gameplay instructions of the first game application and updates a first context of the first gameplay session in the game state data 508 in response to the first gameplay inputs. The first context reflects interactions of a first user with the first game application, for example, from a point of view of the first user. Optionally, the first context includes one or more of status in the first game application of the first user, scene/environment of the first game application and interactions with other participants in the gaming session.

The game server generates (1612) and transmits to the first user, e.g., via the user front end, an output gaming stream 130 that reflects the updated first context of the first gaming session, which has been stored in the game state data 508. In some implementations, the output gaming stream is transmitted with parallel social streams 132, e.g. an instructional video or audio stream and a social media message stream. In some implementations, the output gaming stream 130 is provided in near real-time to reflect the updated first context of the first gaming session. In some implementations, the gaming stream 130 is displayable by a user display device 108.

The game server manages (1614) performance of the first gaming session in accordance with session management routines implemented by the platform modules and/or first API calls associated with the first game application, e.g., using a latency adjustment module 672, a resource tuning module 674, a disruption detection module 678 and a state reconciliation module 680.

In some implementations, the first user request to initiate the first gameplay session is received at the game server via a first developer interface 655 that is configured to enable users to initiate gaming sessions with one or more game applications 628, including the first game application, provided by a first developer of the first game application 628 for execution on the game server. In some implementations, the first developer is associated with an organization different from the organization that operates and implements the game server.

In some implementations, the first developer is logged onto the game server via the first developer interface 655. Further, in some implementations, an online marketplace (e.g., a game application platform 658) is provided to users to purchase one-time and/or subscribe access to one or more second game applications provided by a plurality of distinct third party game developers, including the first developer, for execution on the game server. The game server further provides to each of the second game applications access to the API calls to host routines implemented by the gaming platform modules 630-655 and 658-680.

Optionally, the first developer interface is implemented on the game server 118. Optionally, the first developer interface is implemented on a third-party server 402 that is distinct from and communicatively coupled to the game server 118.

In some implementations, the game server provides login services to subscribers to the one or more game applications provided by the first developer of the first game application for execution on the game server.

In some implementations, the game server obtains hosting specifications from the first developer for the first game application, wherein the hosting specifications relate to one or more of: quality of service of hosted gameplay sessions for the first game application, logging and/or reporting of user interactions with the first game application, multiplayer capabilities of gameplay sessions for the first gaming application, collection and/or reporting of performance profiling data for the first gaming application, gameplay levels of the first gameplay application, and social features for gameplay sessions of the first game application. The social features include availability of streams for viewers of the gameplay sessions, and in some implementations, the availability of streams includes permission of gaming users whose streams are shared to a social site, such as YouTube. Further, in some implementations, the quality of service comprises one or more of: maximum output latency of output gaming streams delivered to gaming users, a predefined range of display resolutions of the output gaming streams, a predefined range of output frame rates of the output gaming streams, a maximum frame drop rate of the output gaming streams, and maximum display skew for multiplayer game sessions. The above hosting specifications are optionally stored in game context 508A and game settings 508B of the game state data 508 in association with the hosted gameplay sessions.

In some implementations, the game server provides to the first developer game play information of the first user (e.g., user information 690 and game state data 508) sufficient to enable the first developer to manage account information of the first user.

In some implementations, the game server collects performance information for the first game application (e.g., usage statistics 698, game instance traces 699 and system performance data 522), and reports the performance information for execution of the first game application to the first developer. Further, in some implementations, the performance information includes one or more performance parameters of game server hardware and the game application collected concurrently and associated with a gameplay state of the first game sessions, wherein the gameplay state includes one or more of gameplay actions of the first user and associated gameplay context of the first game session. More details on game related information generated and stored by the game server are discussed above with reference to at least FIGS. 5 and 6C.

In some implementations, the game server obtains game performance specifications for the first game application, and manages interactions of the first user with the first game application in accordance with performance specifications of the first game application. Further, in some implementations, the game performance specifications include gaming performance options, at least some of which are indicated via the API calls. In some implementations, the game performance specifications further include branding guidelines associated with a first developer of the first game application.

In some implementations, managing the performance of the first game application includes one or more of: managing GPU time sharing, managing multi-stream generation, managing parallel encoding of video streams and gaming streams, managing dynamic frame generation, and managing assignment of computing resources of the game server to gaming sessions for the first game application. Each of the gaming sessions is associated with one or more users who are playing the first gaming application. Referring to FIG. 6B, the modules 660, 662, 662 and 668 are configured to implemented the aforementioned performance management functions.

In some implementations, the game server is part of a gaming system associated with a plurality of gaming users, each having a gaming controller (e.g., 102B in FIG. 1), a network connection to the gaming system, and a display unit (e.g., 108 in FIG. 1) that enable each gaming user to play the electronic games that are hosted by the gaming system (e.g., based on a media stream 130). The gaming system includes a developer backend, a user frontend, a game server (e.g., 118 in FIG. 4), and a streaming server (e.g., 120 in FIG. 4). Further, in some implementations, the game server is associated with a plurality of spectator users each having a gaming controller, a network connection to the gaming system, and a display unit that enable each spectator user to view in near-real time video streams 132 corresponding to the hosted electronic games being played by the gaming users. The game applications show game play of gaming, and optionally provide one or more of account management services (e.g., by game application platform 658), application repository (e.g., by game applications 628) and gaming profiling services (e.g., by local and global profiling orchestrator module 630 and 648).

Referring to FIG. 5, in some implementations, the obtaining the first game application further includes receiving via a developer interface that is accessible to third-party developers a hosting request 526 to host the first game application 628, and obtaining in conjunction with the hosting request executable code 528 for the first game application and performance specifications. The performance specifications are selected from a plurality of predefined game performance options provided by the gaming platform and relate to one or more of a plurality of performance parameters managed by the gaming platform. The operation of obtaining the first game application further includes configuring the first game application for execution by the game server in accordance with the performance specifications provided via the third party developer interface. Optionally, the selected performance specifications are stored in the user information 690 in association with the first game application.

In some implementations, in conjunction with the generating and transmitting to the first user the output gaming stream 130, the game server generates in parallel one or more social streams 132 for the gameplay of the first application, and each of the social streams is viewable by spectators who are not playing the first game application 628.

In some implementations, the game server executes a plurality of game instances for a gaming title in parallel. Each of the plurality of game instances includes one or more synchronous gaming sessions, and each of the one or more gaming sessions is executed at a game application of a client device 102. Further, in some implementations, while the game server is executing the plurality of game instances, a profiling server 430 generates a game profiling instruction 538 to collect a plurality of data samples for each of a subset of the plurality of game instances, and sends the game profiling instruction 538 to the game server. The profiling server 430 is coupled to the game server 118 over one or more wireless communication networks. Specifically, in response to the game profiling instruction 538, a local orchestrator module 630 of the game server identifies the subset of the plurality of game instances according to the game profiling instruction 538, and a collection module 632 of the game server collects the plurality of data samples associated with each game instance in the identified subset. Each of the plurality of data samples includes at least game state data 508 and system performance data 522 associated with the one or more synchronous gaming sessions corresponding to the respective game instance. The game server sends the plurality of data samples associated with each game instance in the identified subset to the profiling server 430, and provides the plurality of data samples to an analytics server 440, thereby allowing the analytics server 440 to analyze the plurality of data samples to improve gaming performance and/or user experience associated with the gaming title.

In some implementations, the output display stream 130 delivered to the first user represents one or more of: point of view of the first user, status in the first game application of the first user, scene/environment of the first game application, and interactions with other participants in the gaming session.

A distributed real-time game hosting system includes one or more processors (e.g., 406, 408 and 602), and memory (e.g., 606) coupled to the one or more processors. The memory stores one or more programs configured to be executed by the one or more processors, the one or more programs including instructions for performing any of the above operations as described with reference to FIG. 16. A non-transitory computer-readable storage medium (e.g., 606) stores one or more programs. The one or more programs include instructions, which when executed by a distributed real-time game hosting system, cause the system to perform any of the above operations as described with reference to FIG. 16.

Reference have been made in detail to various implementations, examples of which are illustrated in the accompanying drawings. In the above detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

It will be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, without changing the meaning of the description, so long as all occurrences of the first device are renamed consistently and all occurrences of the second device are renamed consistently. The first device and the second device are both device, but they are not the same device.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A distributed method for hosting electronic games at a game server, comprising:
    obtaining a first game application that includes first gameplay instructions that perform gameplay of the first game application and one or more API calls to host routines that are implemented by a plurality of gaming platform modules, wherein the game server includes a plurality of game applications and a plurality of gaming platform modules that manage execution of the game applications;
    receiving a first user request to initiate a first gaming session for the first game application;
    in response to the first user request, initiating the first gaming session and managing execution and context of the first gaming session under control of the gaming platform modules; and
    managing performance of the first gaming session in accordance with session management routines implemented by the gaming platform modules,
    wherein the first user request to initiate the first gaming session is received at the game server via a first developer interface that is configured to enable users to initiate gaming sessions with one or more game applications, including the first game application, provided by a first developer of the first game application for execution on the game server.

2. The method of claim 1, wherein the host routines include instructions that, when executed by the game server, implement one or more performance management features of the game server transparently to the first game application.

3. The method of claim 1, wherein managing performance of the first gaming session in accordance with the session management routines implemented by the gaming platform modules further comprises:
    performing first API calls to a subset of the host routines associated with the first game application.

4. The method of claim 1, wherein the session management routines include one or more of:
    providing server-side optimization of compiled shaders;
    executing a game profiling application and providing a user interface for profiling the game applications;
    assessing device and network capabilities associated with the first gaming session;
    analyzing data samples and enabling display of analysis results on a user interface;
    encoding both a low latency stream and a normal latency stream within time intervals corresponding to a predefined frame rate;
    determining a number of intermediate frames to insert between a current frame being processed at a time of receiving a user input and (ii) a response frame showing a result of the received user input;
    allocating encoder cores of an encoder to process image tiles of an image of the first gaming session in parallel;
    managing the first gaming session according to a resource profile of an associated virtual machine resource;

comparing user input transit times with display transit times, and determining a user's intent behind user inputs by matching input events with respective trigger frames;

determining a latency tolerance for the first gaming session;

detecting disruptions in or of a network connection between the game server and a game controller or media device associated with the first gaming session; and processing recovered inputs upon resuming a network connection between the game server and the game controller or media device and reconciling simulation-affected game states with user-intended game states.

5. The method of claim 1, wherein the first developer is logged onto the game server via the first developer interface, further comprising:

providing an online marketplace from which users can purchase one-time and/or subscribe access to one or more second game applications provided by a plurality of distinct third party game developers, including the first developer, for execution on the game server, including providing, at the game server, login services to subscribers to the one or more game applications provided by the first developer of the first game application for execution on the game server; and providing, to each of the second game applications, a respective access to the one or more API calls to host routines implemented by the gaming platform modules;

wherein the first developer interface is implemented on the game server or on a third-party server that is distinct from and communicatively coupled to the game server.

6. The method of claim 1, further comprising, obtaining hosting specifications from the first developer for the first game application, wherein the hosting specifications relate to one or more of:

quality of service of hosted gaming sessions for the first game application;

logging and/or reporting of user interactions with the first game application;

multi-player capabilities of gaming sessions for the first gaming application;

collection and/or reporting of performance profiling data for the first gaming application;

gameplay levels of the first game application; and social features for gaming sessions of the first game application, wherein the social features include availability of streams for viewers of the gaming sessions.

7. The method of claim 6, wherein the quality of service comprises one or more of:

maximum output latency of output gaming streams delivered to gaming users, a predefined range of display resolutions of the output gaming streams, a predefined range of output frame rates of the output gaming streams, a maximum frame drop rate of the output gaming streams, and maximum display skew for multiplayer game sessions.

8. The method of claim 1, further comprising:

collecting performance information for the first game application; and reporting the performance information for execution of the first game application to the first developer;

wherein the performance information includes one or more performance parameters of game server hardware and the first game application collected concurrently and associated with a gameplay state of the first gaming session, wherein the gameplay state includes one or more of gameplay actions and associated gameplay context of the first gaming session.

9. The method of claim 1, further comprising:

obtaining game performance specifications for the first game application, wherein:

the game server manages interactions of the first gaming session with the first game application in accordance with performance specifications of the first game application;

the game performance specifications include gaming performance options, at least some of which are indicated via the one or more API calls; and the game performance specifications further include branding guidelines associated with a first developer of the first game application.

10. A distributed real-time game hosting system, comprising:

one or more processors, wherein the distributed real-time game hosting system includes a game server; and memory coupled to the one or more processors, the memory storing one or more programs configured to be executed by the one or more processors, wherein the programs include a plurality of game applications and a plurality of gaming platform modules that manage the execution of the game applications, the one or more programs including instructions for performing operations comprising:

obtaining a first game application that includes first gameplay instructions that perform gameplay of the first game application and one or more API calls to host routines that are implemented by the gaming platform modules;

receiving a first user request to initiate a first gaming session for the first game application;

in response to the first user request, initiating the first gaming session and managing execution and context of the first gaming session under control of the gaming platform modules; and managing performance of the first gaming session in accordance with session management routines implemented by the gaming platform modules, wherein the first user request to initiate the first gaming session is received at the game server via a first developer interface that is configured to enable users to initiate gaming sessions with one or more game applications, including the first game application, provided by a first developer of the first game application for execution on the game server.

11. The distributed real-time game hosting system of claim 10, wherein managing the performance of the first gaming session includes one or more of:

managing GPU time sharing;

managing multi-stream generation;

managing parallel encoding of video streams and gaming streams;

managing dynamic frame generation; and managing assignment of computing resources of the game server to gaming sessions for the first game application, wherein each of the gaming sessions is associated with one or more users who are playing the first game application.

12. The distributed real-time game hosting system of claim 10, wherein the game server is associated with a plurality of gaming users, each having a gaming controller, a network connection to the game hosting system, and a display unit that enable each gaming user to play the plurality of game applications that are hosted by the game hosting system.

13. The distributed real-time game hosting system of claim 12, wherein the game server is associated with a plurality of spectator users each having a gaming controller, a network connection to the game hosting system, and a display unit that enable each spectator user to view in near-real time video streams corresponding to the hosted game applications being played by the gaming users.

14. The distributed real-time game hosting system of claim 10, wherein the obtaining the first game application further includes:
- receiving via a developer interface that is accessible to third-party developers a hosting request to host the first game application;
- obtaining, in conjunction with the hosting request, executable code for the first game application and performance specifications, wherein the performance specifications are selected from a plurality of predefined game performance options provided by the game hosting system and relate to one or more of a plurality of performance parameters managed by the game hosting system; and
- configuring the first game application for execution by the game server in accordance with the performance specifications provided via the developer interface.

15. A non-transitory computer-readable storage medium storing one or more programs, wherein the programs include a plurality of game applications and a plurality of gaming platform modules that manage execution of the game applications, the one or more programs comprising instructions, which when executed by a distributed real-time game hosting system including a game server, cause the game hosting system to perform operations comprising:
- obtaining a first game application that includes first gameplay instructions that perform gameplay of the first game application and one or more API calls to host routines that are implemented by the gaming platform modules;
- receiving a first user request to initiate a first gaming session for the first game application;
- in response to the first user request, initiating the first gaming session and managing execution and context of the first gaming session under control of the gaming platform modules; and
- managing performance of the first gaming session and in accordance with session management routines implemented by the gaming platform modules,
- wherein the first user request to initiate the first gaming session is received at the game server via a first developer interface that is configured to enable users to initiate gaming sessions with one or more game applications, including the first game application, provided by a first developer of the first game application for execution on the game server.

16. The non-transitory computer-readable storage medium of claim 15, further comprising:
- generating and transmitting to a first user of the first gaming session an output gaming stream; and
- generating in parallel one or more social streams for the gameplay of the first game application, wherein each of the social streams is viewable by spectators who are not playing the first game application.

17. The non-transitory computer-readable storage medium of claim 15, wherein the one or more programs further comprise instructions for:
- executing by the game server a plurality of game instances for a gaming title in parallel, each of the plurality of game instances including one or more synchronous gaming sessions, each of the one or more gaming sessions being executed at a respective game application of a client device.

18. The non-transitory computer-readable storage medium of claim wherein the one or more programs further comprise instructions for:
- while the game server is executing the plurality of game instances:
  - generating by a profiling server a game profiling instruction to collect a plurality of data samples for each of a subset of the plurality of game instances, wherein the profiling server is coupled to the game server over one or more wireless communication networks;
  - sending the game profiling instruction to the game server by the profiling server;
  - in response to the game profiling instruction:
    - identifying by a local orchestrator module of the game server the subset of the plurality of game instances according to the game profiling instruction;
    - collecting by a collection module of the game server the plurality of data samples associated with each game instance in the identified subset, each of the plurality of data samples including at least game state data and system performance data associated with the one or more synchronous gaming sessions corresponding to the respective game instance; and
    - sending by the game server the plurality of data samples associated with each game instance in the identified subset to the profiling server; and
  - providing the plurality of data samples to an analytics server, thereby allowing the analytics server to analyze the plurality of data samples to improve gaming performance and/or user experience associated with the gaming title.

19. The non-transitory computer-readable storage medium of claim 15, wherein managing execution and context of the first gaming session further comprises:
- receiving first gameplay inputs;
- executing the first gameplay instructions of the first game application and updating a first context of the first gaming session in response to the first gameplay inputs, wherein the first context reflects interactions of a first user with the first game application; and
- generating an output gaming stream that reflects the first context of the first gaming session, and transmitting the output gaming stream to the first user, wherein the output gaming stream delivered to the first user represents one or more of: point of view of the first user, status in the first game application of the first user, scene/environment of the first game application, and interactions with other participants in the gaming session.

* * * * *

UNITED STATES PATENT AND TRADEMARK OFFICE
CERTIFICATE OF CORRECTION

PATENT NO. : 11,684,849 B2
APPLICATION NO. : 16/844937
DATED : June 27, 2023
INVENTOR(S) : Jack Buser et al.

Page 1 of 1

It is certified that error appears in the above-identified patent and that said Letters Patent is hereby corrected as shown below:

In the Claims

At Column 60 Line 62, please delete "(ii)"

At Column 63 Line 12, please delete "the" before "obtaining the first game"

At Column 64 Line 11, please insert --17-- after "claim" and before "wherein"

Signed and Sealed this
Fifth Day of December, 2023

Katherine Kelly Vidal
*Director of the United States Patent and Trademark Office*